United States Patent [19]
Tullos et al.

[11] 4,437,049
[45] Mar. 13, 1984

[54] STEPPER MOTOR CONTROLLER
[75] Inventors: Robert N. Tullos; Arthur Ostroff, both of Woodland Hills, Calif.
[73] Assignee: Minnesota Mining and Manufacturing Company, St. Paul, Minn.
[21] Appl. No.: 372,384
[22] Filed: Apr. 27, 1982
[51] Int. Cl.³ ............................................. H02K 29/04
[52] U.S. Cl. .................................... 318/696; 318/685
[58] Field of Search ................... 360/78; 318/696, 685
[56] References Cited
U.S. PATENT DOCUMENTS
4,157,577  6/1979  Porter et al. ........................ 360/77

Primary Examiner—G. Z. Rubinson
Assistant Examiner—Saul M. Bergmann
Attorney, Agent, or Firm—Donald M. Sell; James A. Smith; William D. Bauer

[57] ABSTRACT

A method of sequentially moving a stepper through a plurality of positions (steps) and current states associated with each of these positions from an initial step to a final step. When the direction of sequential movement is in a first direction, the number of steps is incremented before the current state associated with the final step is reapplied to the stepper motor. In a preferred embodiment, a shortened period of time is allowed immediately before the current state associated with the final step is applied to the stepper motor. The method diminishes the magnetic hysteresis by always electrically and magnetically approaching the final position (step) from the same direction whether or not the stepper motor physically approaches the final position from the same direction.

5 Claims, 9 Drawing Figures

STEPPER MOTOR CONTROLLER

BACKGROUND OF THE INVENTION

Present invention relates generally to stepper motors and more particularly to stepper motor controllers.

Stepper motors are often utilized as mechanical positioning means. An example of equipment in which stepper motors are utilized in this manner are electronic disk drive units. Disk drive units have at least one magnetic record media rotated around a central pivot. One or more transducers are then positioned with respect to a plurality of parallel tracks on the record media. Stepper motors, along with linkage translating the rotational position of the stepper motor to a linear position along the record media surface, have been used for this purpose.

Positioning accuracy of the transducer along the record media surface is extremely important. The degree to which the positioning accuracy is achieved to select a given predetermined track on the record media surface is one of the factors that determines the density of recording that can occur on the record media. The positioning of the transducer with respect to a track on the record media surface must not only be accurate but repeatable. A move of the transducer to a particular track on the record media (disk platter), or a particular step of the stepper motor, must accurately repeat the position obtained in a prior move to that particular track. This is necessary to ensure the accurate writing and subsequent reading of data recorded on the record media surface. The positioning must be accurate no matter what the intervening positions or movements of the transducer have been. The transducer must get to the same accurate position if coming from a long distance along the record media surface or from the adjacent track. Further, the positioning must be accurate when the given track is approached from either side, i.e. approached with either an outer movement of the transducer or an inner movement of the transducer.

In many stepper motor positioning applications, the number of positions available exceeds the number of steps available in the stepper motor. In this case it is not sufficient just to specify the step number of the stepper motor to get to a particular position number (or track number). This is because more than one position exists for each step number of the stepper motor. Thus, the stepper motor must be sequenced through a number of steps in a particular order to move in a particular direction cycling through the set of steps of the stepper motor (or a partial set) in order to reach the desired final position (or track). Controllers to perform this sequencing function are well known in the art. Such controllers know which track (or position) of the record media at which the transducer is located. The controller then can accept a request to move to a new track (position). The controller then is able to calculate the number of steps in the requested move, the direction of move and sequence the stepper motor through the proper number and sequence of steps in order to reach the requested track (position).

It is known that with certain mechanical linkages or positioning systems that mechanically approaching a particular position (or step) from one direction may yield a slightly different position than approaching from the opposite direction. This is sometimes due to the mechanical viscosity and internal friction of the positioning system. With systems with such mechanical hysteresis, a vibration or a slight jarring of the positioning mechanism of the transducer can overcome this internal friction of the mechanical elements and eliminate the positioning differences.

With a disk drive unit having a transducer positioned with a stepper motor, it has been found that positioning differences exist from the direction of approach even after mechanical hysteresis is eliminated from the system. These positioning errors detract from the recording density otherwise achievable in the record media.

Other attempts have been made to solve this positioning problem. First, a track-following servo system has been utilized. These systems use a feedback from the recorded track to adjust the position of the transducer to follow that track. While this system solves the problem, it is only through the use of an expensive, sophisticated positioning system. A second solution to solve the positioning error problem is to simply overpower the hysteresis positioning problem by using a larger, more powerful stepper motor. This method is also successful in overcoming hysteresis but has other drawbacks. For example, a larger motor requires a larger power supply which in turn creates more heat and a greater heat differential. The greater heat differential creates differing thermal expansions of the mechanical components linking the transducer positioning system and also affects the positioning accuracy of the transducer.

SUMMARY OF THE INVENTION

The method of the present invention moves a stepper motor from an initial position to a final position by means of sequentially stepping the stepper motor through a plurality of sequential operations. The stepper motor is capable of being positioned at a plurality of positions, has a plurality of steps and an associated current state for each of the plurality of positions and each of the plurality of positions are associated with one of the plurality of steps. The method first determines the direction of movement from the initial position to the final position and determines the number of steps from an initial step associated with the initial position to a final step associated with the final position. Only if the direction of movement is in a first direction the method then increments the number of steps to be moved or sequenced through. The method then applies to the stepper motor the current state associated with the next of the plurality of steps in the direction of movement and repeats this operation until the calculated number of stepes have been applied. If the direction of movement is in the first direction, the method then applies to the stepper motor the current state associated with the final step and allows the stepper motor to settle into the final position. Thus the magnetic hysteresis of the stepper motor is diminished by always electrically and magnetically approaching the final position from the second direction even though the direction of movement from the initial position to the final position may be in the first direction. In a preferred embodiment, the incrementing of the number of steps is by one. Also in a preferred embodiment, a shortened period of time is allowed between the operation of applying to the stepper motor the current state associated with the next of the plurality of steps in the direction of movement and the operation of applying to the stepper motor the current state associated with the final step. In another preferred embodiment, the first direction is reverse and the second direction is forward since most sequential incremental track addressing occurs in the forward direction and the second direction requires a shorter settling time.

It has been discovered that the transducer positioning accuracy of a disk drive system depends not only on the mechanical hysteresis of the positioning system but also on the magnetic hysteresis of the stepper motor. To overcome this magnetic hysteresis the present invention always magnetically approaches the final position from the same direction. It does not matter if the final position is physically approached from one direction as long as it is magnetically approached from that one direction. Thus the solution is a method of moving the stepper motor such that when the move is in a second direction a normal move is made. However, when the move is in a first direction an additional step is magnetically added to the sequence following what would have been the final step and then magnetically coming back to the final step. Note that it is only necessary to magnetically add the step, it is not necessary to physically move to that step, it is not necessary to physically move to that step. While the additional step is applied to the stepper motor, it is not necessarily allowed for the motor to physically move there. Instead the normal final step may be applied to the stepper motor before the stepper motor can mechanically fully react, the point being that the stepper motor has already magnetically stepped to that position so that the direction of magnetic approach is constant no matter which physical direction of approach is used.

Of course, it could also be allowed for the stepper motor to settle into that extra step position and then move one step (track) back. This would ensure the elimination of mechanical hysteresis also but involves a penalty of requiring more move time.

It has been shown that the use of the method of the present invention can make a stepper motor having a three percent magnetic hysteresis perform as well as a stepper motor having a one percent magnetic hysteresis not using the method of the present invention. This is a three to one improvement ratio and is very significant in attaining higher recording densities in disk drive units having a transducer positioned with a stepper motor.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENTS

The stepper motor controller of the present invention may be utilized in differing types of the positioning mechanism utilizing a stepper motor. The method of the present invention will be illustrated in a disk drive environment. A transducer typically would be coupled to a movable arm with a stepper motor controlling the movement or position of the arm with respect to a plurality of tracks or the record media surface. However, it is understood that the stepper motor controller method of the present invention is equally applicable to other types of positioning apparatus utilizing stepper motors whether or not they utilize magnetic record media, including but not limited to magnetic tapes and magnetic drums.

An example of a disk drive environment in which the method of the present invention may be utilized is illustrated in U.S. Pat. No. 4,395,742, Ostroff, Home Apparatus, filed Oct. 15, 1980, issued July 26, 1983. The Ostroff Patent is hereby incorporated by reference.

Figure 1:
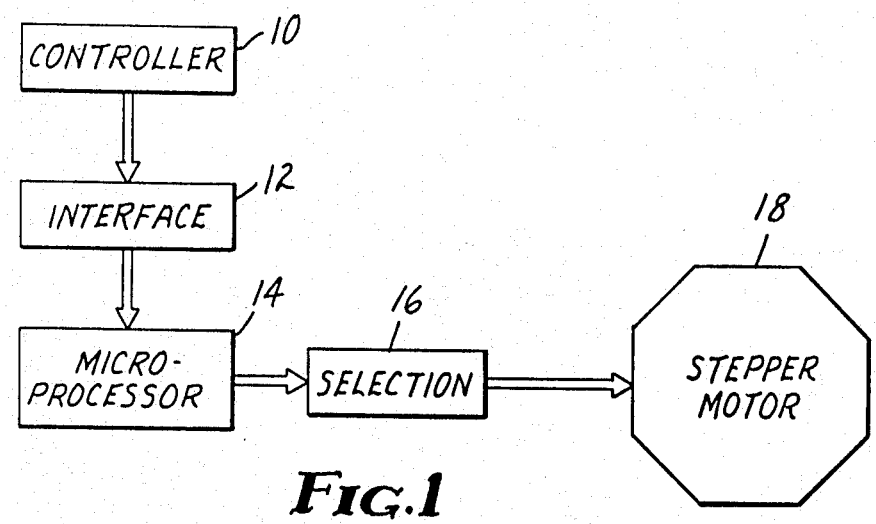
FIG. 1 is a block diagram of a prior art stepper motor control system.

FIG. 1 illustrates in block diagram format of a positioning system utilizing a stepper motor such as may be utilized in a disk drive record media system. A controller 10 is shown interfaced through an interface module 12 with a microprocessor 14. The controller 10 is responsible for accepting requests for the disk drive unit, or positioning system to which the stepper motor is coupled, and issuing commands through the interface 12 to the microprocessor 14 for the stepper motor 18 to move the transducer of the disk drive unit from its initial track location to a final track. The microprocessor 14 then issues commands through the selection network 16 to the stepper motor 18 to sequence the stepper motor 18 through the proper number of and sequence of steps so that the transducer is moved from the initial track to the requested final track. The system disclosed in FIG. 1, utilizing contemporary sequencing methods, is well known in the art.

Figure 2:
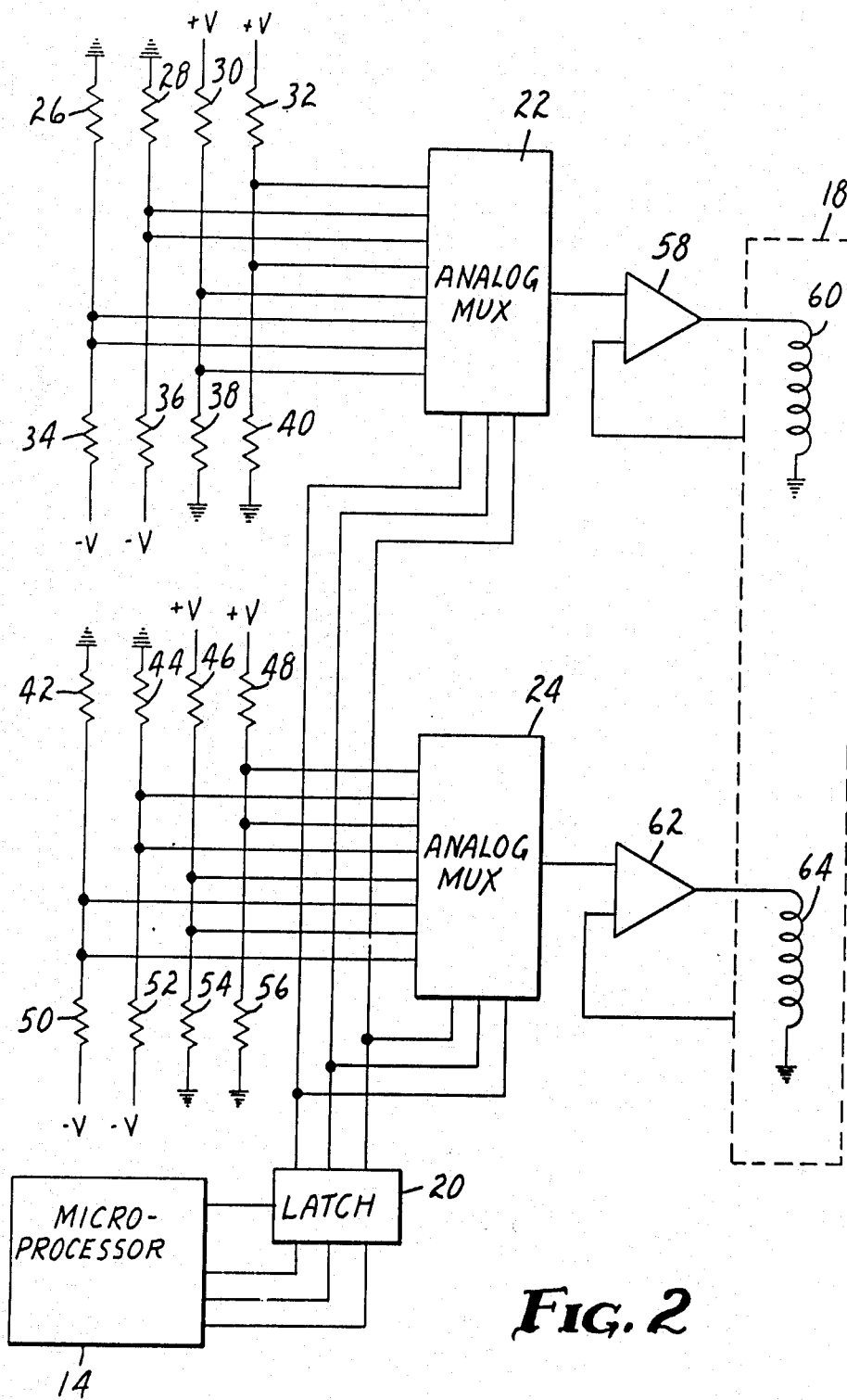
FIG. 2 is a schematic diagram of a step selection hardware for a stepper motor.

FIG. 2 is a schematic diagram of the selection network 16 of FIG. 1 also showing the interconnection between the selection network 16 and the stepper motor 18 and between the microprocessor 14 and the selection network 16. The microprocessor 14, in performing its sequencing function, supplies to latch 20 information corresponding to the current state associated with the step of the stepper motor through which the stepper motor is currently being sequenced. The information contained in latch 20 is coupled selectively to the selection inputs of analog multiplexers 22 and 24. Analog multiplexers 22 and 24 translate the data contained in latch 20 to a particular voltage to be applied to the windings (60 and 64) of the stepper motor 18. Analog multiplexer 22 has data inputs selectively coupled to a resistor network consisting of resistors 26, 28, 30, 32, 34, 36, 38 and 40. Resistors 26, 28, 38, and 40 are coupled to signal ground. Resistors 30 and 32 are coupled to a positive voltage potential while resistors 34 and 36 are coupled to a negative voltage potential. Similarly the data inputs for analog multiplexer 24 are coupled to a resistor network consisting of resistors 42, 44, 46, 48, 50, 52, 54 and 56. Resistors 42, 44, 54 and 56 are coupled to signal ground. Resistors 46 and 48 are coupled to a positive voltage potential while resistors 50 and 52 are coupled to a negative voltage potential. The output of analog multiplexer 22 is coupled through amplifier 58 to phase winding 60 of the stepper motor 18. Similarly the output of analog multiplexer 24 is coupled through amplifier 62 to phase winding 64 of the stepper motor 18.

In a preferred embodiment the stepper motor 18 has two phase windings; namely, phase winding 60 and phase winding 64. Analog multiplexers 22 and 24 can supply either a positive potential, a zero potential, or a negative potential, selectively, to each of the phase windings 60 and 64. These potentials applied to the phase windings 60 and 64 create a particular current state associated with each of the combinations of potentials supplied.

Each of the analog multiplexers 22 and 24 have eight data inputs and three binary selection inputs capable of uniquely selecting one of the eight data inputs. As previously mentioned, since only three different conditions are being supplied to phase windings 60 and 64, individually, that strictly speaking only three data inputs to analog multiplexers 22 and 24 are required. In a preferred embodiment multiple sets of those three conditions are available, each set being uniquely utilized for specific conditions during operation of the disk drive. Particularly, one set of three conditions could be utilized for normal operation while another set of three unique selections could be utilized for or during an initialization process. See, for example, the Ostroff Application.

Figure 3:
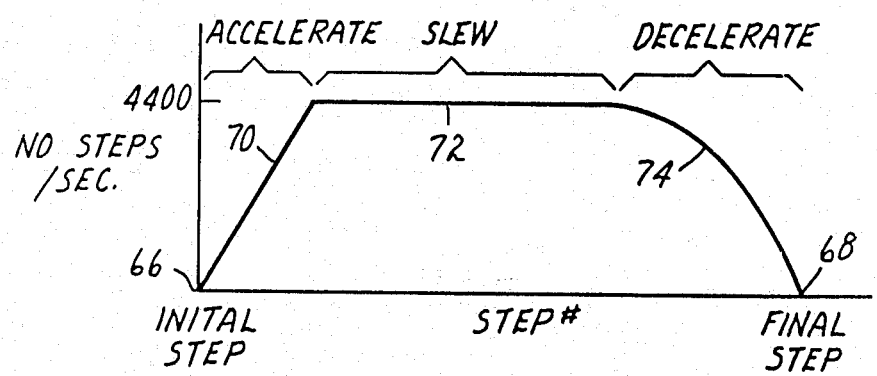
FIG. 3 is a graph showing the acceleration/deceleration profile of a transducer being moved, having reached full speed.

The microprocessor 14 then supplies the appropriate current states to the phase windings 60 and 64 of the stepper motor 18 in order to sequence motor 18 through the sequence of steps to move the stepper motor 18 from an initial position, and an initial step, and a final position, and a final step. In order to efficiently, randomly access any particular track on the record media surface, it is desirable to move as quickly as possible from the initial step to the final step without sacrificing the final accuracy of the position. Since the stepper motor and the positioning mechanism have mechanical inertia it is preferable to accelerate the sequencing of the stepper motor 18, overcoming the mechanical inertia, slewing through the sequence of steps once a predetermined sequence rate is reached and then decelerating the stepper motor as the final step is approached. This accelerating, slewing, and deceleration sequence is illustrated in FIG. 3. FIG. 3 illustrates a graph showing an initial step 66 and a final step 68 along the horizontal axis. The vertical axis of the graph shows the number of steps per second or the rate of sequencing of the stepper motor 18. As can be seen in the figure the rate of sequencing of the stepper motor 18 is divided into three distinct regions. First, an acceleration region 70 is performed through which the number of steps per second of the stepper motor sequencing is increased, a slewing region 72 during which the number of steps per second remains relatively constant, and a deceleration region 74 during which the number of step per second decreases until the final step 68 is reached. This acceleration, slewing, deceleration profile is used to provide the best possible response time for moving the stepper motor from the initial step 66 to the final step 68 and also minimizing any possible overshoot of the final step 68.

Figure 4:
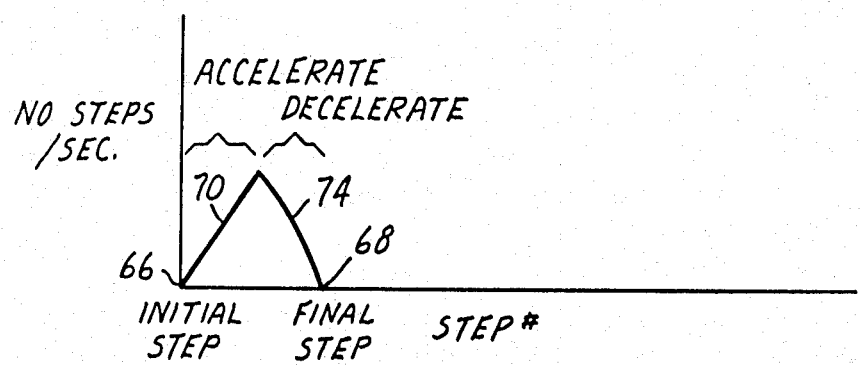
FIG. 4 is a graph showing the acceleration/deceleration profile of a transducer being moved, having not reached full speed.

While the acceleration, slewing, deceleration profile illustrated in the graph of FIG. 3 is a normal preferred mode of operation, it is to be recognized that if the initial step 66 is relatively close to the final step 68, that the rate of sequencing associated with the slewing region 72 may not be achieved before deceleration must occur. This acceleration, deceleration profile is illustrated in FIG. 4. Again, the stepper motor is sequenced from an initial step 66 to a final step 68. As contrasted with FIG. 3, however, only an acceleration region 70 and a deceleration region 74 are performed. Again, the acceleration, deceleration profile is used to provide the fastest possible response time for the stepper motor 18.

FIGS. 3 and 4 illustrate that the sequencing provided by the microprocessor 14 and the current states sequentially applied to the phase windings 60 and 64 of the stepper motor 18 do not necessarily occur in a fixed rate sequence. Rather, the sequencing of the steps may accelerate, slew and decelerate as illustrated in FIGS. 3 and 4.

Figure 5:
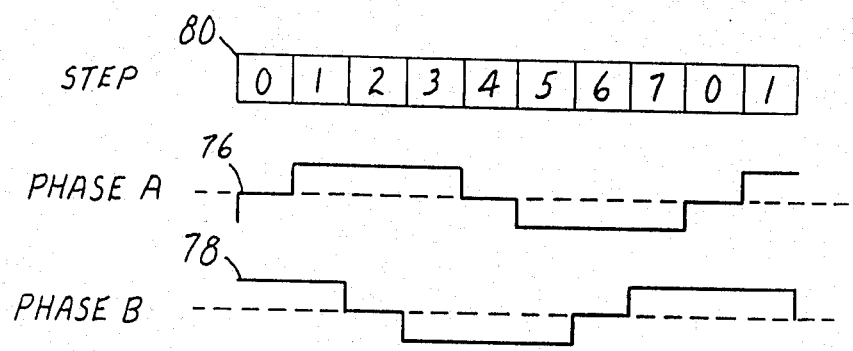
FIG. 5 is a diagram showing the current states associated with each "step" of a stepper motor.

FIG. 5 illustrates the relationship between the steps 80 of the stepper motor 18 and the current state supplied to phase winding 60 and phase winding 64 in FIG. 2. The diagram illustrates the current state 76 supplied to phase winding 60 and the current state 78 supplied to phase winding 64. As illustrated, current state 76 and 78 each have three unique states. All of the combinations of these three unique states create eight possible steps 80 for the stepper motor 18. For illustration purposes, step "0" is illustrated by a zero current in current state 76 (phsae A) and a positive current in current state 78 (phase B). Similarly, step "1" has associated with it a positive current in current state 76 and a positive current in a current state 78 and step "2" has a positive current in current state 76 and a zero current in current state 78. Notice in the diagram illustrated in FIG. 5, that sequencing between any two adjacent steps involves the change in the current state in only one of the phase windings 60 and 64. The microprocessor 14 by sequentially applying the associated current states 76 and 78 in a sequential manner, can move the stepper motor through a series of steps 80. Each step 80, of course, is related to particular position of the stepper motor 18. The particular position of the stepper motor 18 in turn determines at which track the transducer in the magnetic disk drive is positioned. By providing the proper sequencing to the current states (76 and 78) supplied to the stepper motor 18, the microprocessor 14 can move the stepper motor 18 from one position to another. It is to be recognized that the stepper motor 18 can, of course, be moved more than eight positions merely by repeating the sequence cycle of all or part of eight steps.

Figure 6:
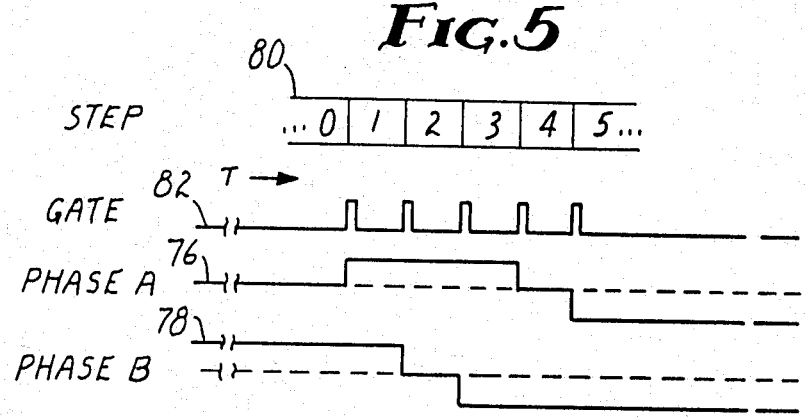
FIG. 6 is a sequential current state diagram showing a sequencing of a stepper motor in one direction.
Figure 7:
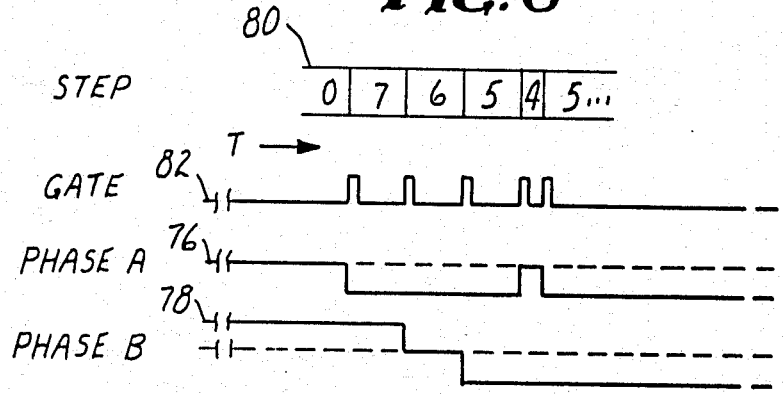
FIG. 7 is a sequential current state diagram showing sequencing of a stepper motor in the opposite direction than the direction of movement in FIG. 6.

FIGS. 6 and 7 illustrate the sequencing and current state application to the phase windings (60 and 64) of the stepper motor 18 for the method of the present invention. In both FIGS. 6 and 7 the stepper motor 18 is being sequenced through a number of steps finally ending in step number "5". The diagrams can be understood by the illustration of the current state 76 associated with phase winding 60 and current state 78 associated with phase winding 64 of the stepper motor 18. The step 80 illustrates the particular step selected for the stepper motor 18 at a particular instant of time. Time in the diagrams in both FIGS. 6 and 7 is increasing to the right. The diagrams also include a gate pulse 82 which illustrates when the particular current state (76 and 78) is supplied to the phase windings 60 and 64.

FIG. 6 illustrates the normal sequence of magnetically and phsycially approaching step "5" from one direction, in this case from a direction from a lower numbered step to a higher numbered step. That is, in FIG. 4, step number "5" is reached by sequencing from step "0" through step "1", through step "2", through step "3", through step "4", and finally to step "5". To do this the microprocessor 14 sequentially applies to the stepper motor 18 the current states 76 and 78 associated with the particular individual steps ending in a current state 76 of a negative value and a current state 78 of a negative value. This sequencing through steps "0", "1", "2", "3", "4", and finally to step "5" is normal. It is the sequencing which would occur in the prior art, and will position a stepper motor exactly as in the prior art.

FIG. 7 illustrates the sequencing for the method of the present invention where step "5" is approached from a direction from a higher numbered step to a lower numbered step. As illustrated in FIG. 7, step "5" is illustrated sequencing from step "0" through step "7" and through step "6". As illustrated in the diagram, however, instead of ending with step "5" immediately after step "6" an additional step is added to the sequencing method; namely, step "4". The current state associated with step "4", namely a zero value in current state 76 and a negative value in current state 78, is applied to the phase windings 60 and 64 of the stepper motor 18. After the application of step "4" the current state associated with the final step, namly step "5", is again applied to the phase windings (60 and 64) of the stepper motor 18. This current state is namely current state 76 having a negative value and current state 78 having a negative value. In a preferred embodiment, the time period of applying the current state associated with step "4" to the stepper motor 18 is relatively brief as indicated by the shortened spacing between gate pulses 82. The current state associated with step "4" is applied in order to magnetically approach final step "5" from the same magnetic direction as in FIG. 6. That is, it is important that the phase windings 60 and 64 have the current state associated with step "4" previously applied to them rather that the current state associated with step "6". This will ensure that no magnetic hysteresis exists within the stepper motor 18 to alter its final position and hence, the final position of the transducer with respect to a track on the surface of the record media. The current state associated with step "4" need only be briefly applied. This is because it is not necessary to actually move the stepper motor 18 to the position determined by step "4". It is only necessary to apply the current state associated with step "4" to the phase windings 60 and 64 to eliminate magnetic hysteresis. The shortened period of applying the current state associated with step "4" shortens or minimizes the movement time until step "5" is finally reached. In an alternative embodiment, of course, step "4" could be allowed a normal gate pulse 82 spacing and hence, the physical position of step "4" could be assumed by the stepper motor 18. However, it is emphasized that this is not necessary according to the preferred method of the present invention.

Notice that in the diagrams illustrated in FIGS. 6 and 7 the sequencing in approaching the final step in one direction is normal. The sequencing in approaching the final step from the other direction involves the addition of a step in the sequence and after application of that step, then reapplying the previously determined final step.

The sequencing for applying the current states 76 and 78 to the phase windings 60 and 64 of the stepper motor 18 is, of course, determined by the sequence supplied by the microprocessor 14.

The method of the present invention may be more particularly illustrated by reference to FIGS. 8A and 8B which provide a flow chart of the mthod of the present invention in its preferred environment of a magnetic disk drive. The method is described as a sequence of performing a series of operations. It is presumed at block 100 that the controller 10 has supplied the microprocessor 14 with the track number ("TRCKNUM") and the track to which the stepper motor is to move ("TRCKDEM"). The method, at operation 102, determines whether the move is in the forward ("FWD") direction 104, or in the reverse ("REV") direction 106. If the move is in the forward direction 104, the method sets the direction of movement in the forward direction at operation 108 and then determines the track difference ("TRCKDIF") by subtracting the track demand ("TRCKDEM") from the track number ("TRCKNUM") at operation 110 and stores this information for future reference. If the direction of movement, as determined at operation 102, is in the reverse direction 106, the method sets the direction of movement to the reverse direction at operation 112 and determines the track difference ("TRCKDIF") by subtracting the track number ("TRCKNUM") from the track demand number ("TRCKDEM") and then by incrementing the track difference ("TRCKDIF") by one at operation 114 and again, storing that information for future reference.

In a preferred embodiment of the present invention and in a preferred emodiment of the stepper motor with which the present method is designed to operate, the stepper motor may operate in a "current" mode and in a "voltage" mode. If the stepper motor for which the method of the present invention is designed to operate has this feature, it is preferred that the mode of operation of moving the stepper motor be changed to a "current" mode at operation 116.

At operation 118 the original track difference ("TRCKDIF") is saved in a separate storage location called move size ("MOVSIZ"). The microprocessor 14 then determines the acceleration and deceleration profiles as determined by its standard prior art movement techniques. This occurs at operation 120. The microprocessor 14 then moves the stepper motor 18 one increment as determined by the selection network 16 previously described. This operation occurs at operation 122. The method then nquires as to whether the movement of the stepper motor is at an end, i.e. is the remaining track difference ("TRCKDIF") greater than zero. This inquiry is accomplished at operation 124. If the move is not at end, the method returns to operation 120 to again determine the acceleration and deceleration profiles and to move the stepper motor at operation 122 and again iinquire as to the end of the move with the inquiry at operation 124.

If the move is at an end, it is a preferred embodiment of the present method that the mode of operation of the stepper motor 18 is then changed to a "voltage" mode at operation 16. The method then determines, at operation 128, whether the move was in the forward ("FWD") direction 130 or in the reverse ("REV") direction 132.

If the move was in the forward direction 130 the method then could jump directly to operation 132 to update the current track number to the current track address and, preferably, accomplish whatever housekeeping methods are required in oepration 134 before ending.

However, in a preferred embodiment, if the move is in the forward direction 130, the stepper motor 18 will require a differing amount of mechanical and magnetic settling time depending upon whether the move was a one track move or a multitrack move. In general, a multitrack move requires a longer settling time. An inquiry is made at operation 136 to determine whether the move is one track 138 or multitrack 140. The appropriate delays are inserted at operations 142 or 144, respectively, depending upon the particular move. The method then can pass to operation 130 to update the track number to the current address and, preferably, take care of housekeeping duties in operation 134.

If at operation 128 the move was in the reverse direction 132, it is to be remembeed that an additional step was magnetically introduced to the sequence due to the incrementing of the track difference ("TRCKDIF") at operation 114. Because of this the stepper motor 18 is now positioned one step, or one track, beyond its final desired destination or position. For this reason the method then requires that the directio of movement be changed to forward ("FWD") at operation 146. A short delay is taken in the method at operation 148 before at operation 150 the final step is reapplied to the stepper motor 18. The delay occurred in operation 148 preferably does not allow a full step time to occur. Instead, it is preferred that the delay inserted at operation 148 be that shortened time period illustrated in FIG. 7 for the time between gate pulses 82 and stepping between step "4" and between step "5". As previously mentioned, it is not necessary to hold the additional step incurred in the method for a full normal step time. Rather, it is preferred that the additional step be applied only so long as to allow the stepper motor 18 to magnetically approach the final step (in FIG. 5, step "5") from the same direction as a forward ove. After applying the new, final step to the stepper motor 18, at operation150, a delay is inserted at operation 152 to allow the stepper motor 18 to settle into the final step or position. The track number may then be updated to the current track address at operation 132 and, preferably, housekeeping chores performed at operation 134.

Figure 8A:
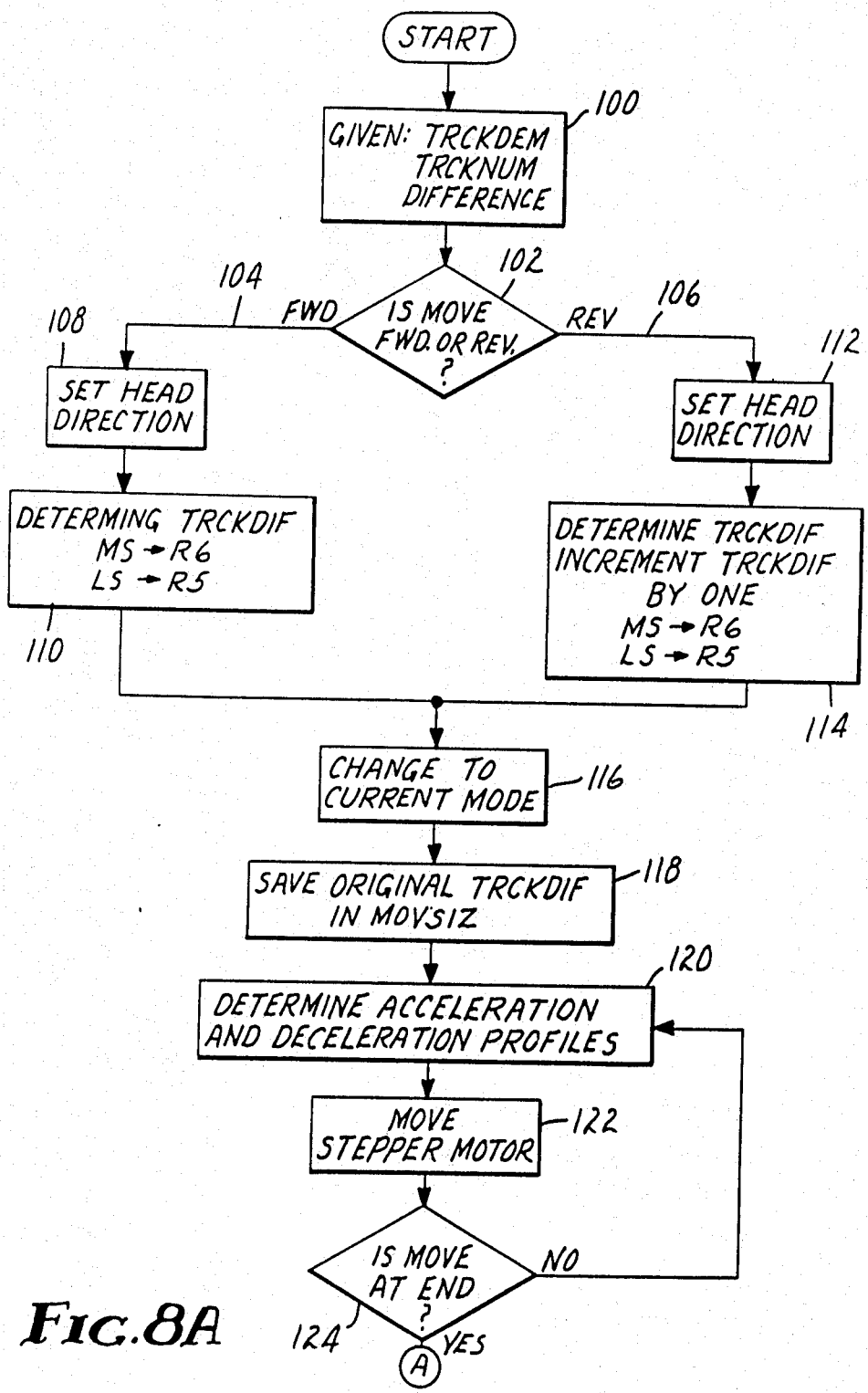
FIGS. 8a and 8b illustrate a flow chart of sequencing according to the method of the present invention.
Figure 8B:
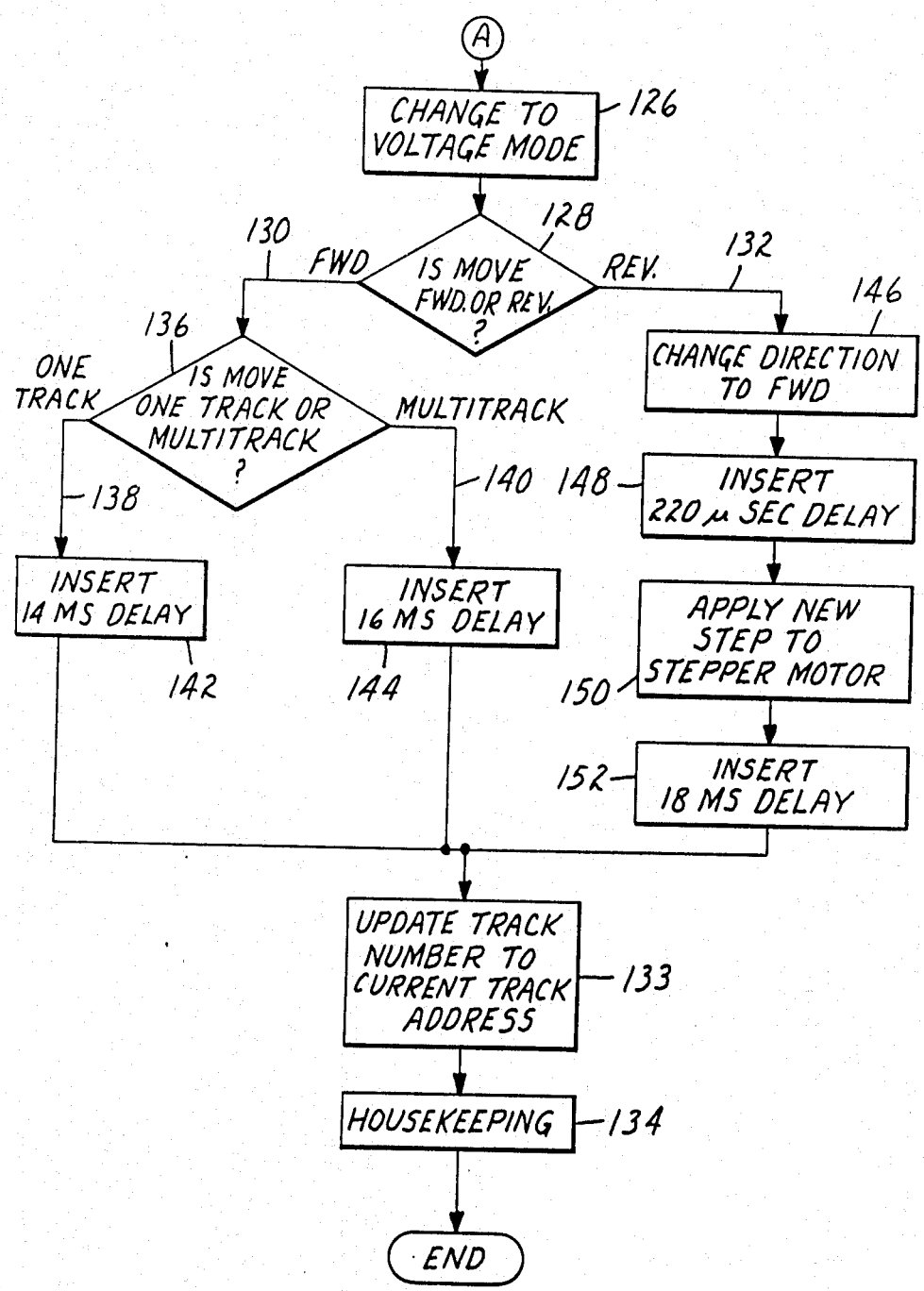

While the flow chart in FIGS. 8A and 8B illustrate the method of the present invention by incrementing the track difference ("TRCKDIF") by one, it is to be recognized and understood that the stepper motor 18 will magnetically approach the final step if the track difference were incremented by more than one. That is, any number of additional steps beyond the destination step will allow the stepper motor 18 to magnetically approach the final step from the same magnetic direction. However, such additional steps require additional time to be performed and thus, it is preferred that only one additional step be added in the method of the present invention.

A more detailed description of the method of the present invention can be found from the program listing submitted hereiwth and made a part of the present application, which program is designed to be performed on an Intel 8048 Microcomputer.

Thus, it can be seen there has been shown and described a novel method for controlling a stepper motor. It is to be understood, however, that various changes, modifications, and substitutions in the form of the details, of the described method can be made by those skilled in the art without departing from the scope of the invention as defined by the following claims.

TABLE OF CONTENTS

| | | |
|---|---|---|
| 1- | 8 | CONDITIONAL ASSEMBLY FLAGS |
| 2- | 1 | PROCESSOR PORT ASSIGNMENTS |
| 3- | 1 | VARIABLE STORAGE |
| 4- | 1 | ATTRIBUTE & ALGOR STORAGE |
| 5- | 1 | FLAGS AND INDICATORS |
| 6- | 1 | FAULT HANDLER ROUTINE |
| 7- | 1 | MOVE ROUTINE |
| 9- | 1 | END-OF-MOVE |
| 10- | 1 | R/W PERMIT ROUTINE |
| 11- | 1 | WRITE STATUS ADJUST |
| 12- | 1 | STEPPER TABLE ADJUST |
| 13- | 1 | REZERO ROUTINE |
| 14- | 1 | A/D CONVERT ROUTINE |
| 15- | 1 | STORAGE FOR CONSTANTS |
| 20- | 1 | BERRON, TIME, WRTCUR |
| 21- | 1 | SET/CLEAR BUSY/ATTN |
| 22- | 1 | DIRTST, DIRT, DSUB |
| 23- | 1 | DMDATA, DELAY, STPDEL |
| 24- | 1 | READY, ATTNQ |
| 25- | 1 | INITIALIZE COUNTERS |
| 26- | 1 | CHECK SPEED |
| 27- | 1 | INITIAL STATE |
| 29- | 1 | MAIN CONTROL LOOP |
| 30- | 1 | DOTIME |
| 31- | 1 | CMD.REQ & PAR.REQ SERVICE |
| 33- | 1 | LANDING ZONE ROUTINE |
| 34- | 1 | TEMPERATURE UPDATE |
| 35- | 1 | PORT ENABLE INTERRUPT |
| 36- | 1 | ANSI COMMAND TABLES |
| 37- | 1 | RIC, SK, HM, CFLT, CATN, SRES & REPORT CMDS |
| 38- | 1 | PARTITION TRK CMD |
| 39- | 1 | LDAT, RCNTL CMDS & CHK0E |
| 40- | 1 | SPIN CMD |
| 41- | 1 | LATW & SET CYL CMDS |
| 42- | 1 | SELECT MOVING HEAD CMD |
| 43- | 1 | WRITE CONTROL CMD |
| 44- | 1 | ATCNTL, R/W PERM & TESTB CMDS |
| 45- | 1 | SECTOR CMDS & TEMP CMD |
| 46- | 1 | PARAMETER END - BUS.ACK |
| 47- | 1 | TIME DEPENDENT CMDS - INIT |
| 48- | 1 | TD CMDS - SPIN |
| 49- | 1 | TD CMDS - SEEK |
| 50- | 1 | TD CMDS - LANDING ZONE |
| 51- | 1 | TD CMDS - REZERO |
| 52- | 1 | TD CMDS - PARTITION TRK |
| 53- | 1 | END OF TD CMDS, BADSK, ILL PARM & CMD |
| 54- | 1 | SECTOR ALGORITHMS (2) |

CONDITIONAL ASSEMBLY FLAGS

```
                            .TITLE TIX015  D1L2.2  8400 LEVE
                    ;*
                    ; CDD2   8039 PROCESSOR
                    ; TONY KOZLOWSKI 26-FEB-82 -- 0800 HRS
                    ;
              0010          .RADIX 16
    0000              .ASECT
                            .SBTTL CONDITIONAL ASSEMBLY FLAGS
                    ;*
                    ; NEW ALGORITHM FLAG
                    ; THE NEW ALGORITHM ASSUMES 'BYTE CLK'
                    ;  IS USED FOR DETERMINING SECTOR
                    ;  SPACING, NOT THE 2MHZ CLK AS
                    ;  ASSUMED BY THE OLD ALGORITHM
                    ;*
              0001  NEWALG = 1        ; 0 = OLD ALGOR
                                      ; 1 = NEW ALGOR
                    ;*
                    ; VARIABLE STEPPER MOTOR DELAY TIME FLAG
                    ; DELAY TIME CHANGES AS A FUNCTION OF
                    ;  TARGET CYL ADDR & MOVE DIRECTION
                    ;*
              0000  VARDLY = 0        ; 0 = CONSTANT DELAY
                                      ; 1 = VARIABLE DELAY
                    ;*
                    ; PAGE BOUNDARY ERROR INDICATOR
                    ;*
              0000  AAAPAG = 0
                    ;*
```

PROCESSOR PORT ASSIGNMENTS

```
                            .SBTTL PROCESSOR PORT ASSIGNMENT
                    ;
                    ; OUTPUT REG 1 ( ALSO - IMREG1 )
                    ;       0 -- READY
                    ;       1 --
                    ;       2 --
                    ;       3 --
                    ;       4 -- STBLTE
                    ;       5 -- STBELY
                    ;       6 -- HS0
                    ;       7 -- HS1
                    ;*
                    ; OUTPUT REG 2
                    ;       0 -- DOUT0
                    ;       1 -- DOUT1
                    ;       2 -- DOUT2
                    ;       3 -- DOUT3
                    ;       4 -- F0
                    ;       5 -- F1
                    ;       6 -- F2
                    ;       7 -- FNST3
                    ;*
                    ; INPUT REG 1
                    ;       0 -- WRT PROTECT STATUS (0=PROT)
                    ;       1 --
                    ;       2 --
                    ;       3 -- SPDFLT
                    ;       4 -- RDFLT
                    ;       5 -- WRFLT
                    ;       6 -- R/WFLT
                    ;       7 -- PWRFLT
                    ;*
                    ; OUTL P2,A ( ALSO - IMPRT2 )
                    ;       0 -- BUSY     ;0=ON, 1=OFF
                    ;       1 -- ATTNEN   ;1=ON, 0=OFF
                    ;       2 -- ATTN     ;   "      "
                    ;       3 -- ACK      ;   "      "
                    ;       4 -- WREN     ;   "      "
                    ;       5 -- RDEN     ;   "      "
```

```
 40                               ;         6 -- FLTRES      ;  "     "
 41                               ;         7 -- RST         ;  "     "
 42                               ;*
 43                               ; IN A,P1
 44                               ;         0 -- SPDLEN
 45                               ;         1 -- DIAGNOSTIC MODE
 46                               ;         2 -- MODEL # JUMPER
 47                               ;         3 --
 48                               ;         4 -- BUSOUT
 49                               ;         5 -- PRQ
 50                               ;         6 -- CRQ
 51                               ;         7 -- SLTD
```

VARIABLE STORAGE

```
  1                                         .SBTTL VARIABLE STORAGE
  2                               ; EQUATES
  3                               ;*
  4              0020             RAM     = 20
  5                               ;*
  6                               ; INTERNAL DATA MEMORY
  7                               ;*
  8              0020                     . = 20
  9                               ;*
 10                               ; NOTE: ALL 2-BYTE NUMBERS ARE MS FIRST
 11                               ;*
 12    0020                       DELMLT: .BLKB    2       ;#MS FOR 'DELAY'
 13    0022                       MTRDEL: .BLKB    1       ;USED IN STPDEL
 14    0023                       TCKDIF: .BLKB    2       ;#CYLS REMAINING
 15    0025                       HEDDIR: .BLKB    1       ;DIRECTION
 16                                                        ;0=FOR,1=REV
 17    0026                       MOTOR:  .BLKB    1       ;LAST TBL ADDR
 18    0027                       TIMER:  .BLKB    1       ;# OF 20 MS TICS
 19    0028                       TMRFLG: .BLKB    1       ;TIMER OVERFLOW
 20    0029                       DEAD:   .BLKB    1       ;DEADMAN TIMER
 21    002A                       MOVSIZ: .BLKB    2       ;# CYLS IN MOVE
 22    002C                       TCKDEM: .BLKB    2       ;DEMAND CYL ADR
 23    002E                       TCKNUM: .BLKB    2       ;PRESENT "   "
 24    0030                       TEMPER: .BLKB    1       ;TEMPERATURE
 25    0031                       MUXSEL: .BLKB    1       ;DM MUX-# SELECT
 26    0032                       FLTSTS: .BLKB    1       ;DR FAULT STATUS
 27    0033                       GENSTS: .BLKB    1       ;GENERAL STATUS
 28    0034                       SNS1:   .BLKB    1       ;SENSE BYTE 1
 29    0035                       SNS2:   .BLKB    1       ;SENSE BYTE 2
 30    0036                       WPERM:  .BLKB    2       ;WRITE PERMIT
 31    0038                       RPERM:  .BLKB    2       ;READ PERMIT
 32    003A                       TEST:   .BLKB    1       ;TEST BYTE
 33    003B                       TEMP2:  .BLKB    2       ;2 BYTE STORAGE
 34    003D                       TMPCOD: .BLKB    1       ;USED IN TEMOFF
 35    003E                       OFFCOD: .BLKB    1       ;  "    "    "
 36    003F                       DUMMY:  .BLKB    3       ;DUMMY STORAGE
 37                               ;*
 38                               ; HISTORY OF "NOT-READY" BIT IN (GENSTS)
 39                               ; B0 = PREVIOUS STATE
 40                               ;*
 41    0042                       RDYHST: .BLKB    1
 42                               ;*
 43    0043                       IMPRT2: .BLKB    1       ;(PORT-2)
 44    0044                       IMREG1: .BLKB    1       ;(WR-REG1)
```

ATTRIBUTE & ALGOR STORAGE

```
  1                                         .SBTTL ATTRIBUTE & ALGOR STORAGE
  2                               ;*
  3                               ; DEVICE ATTRIBUTES WHICH ARE ALTERABLE
  4                               ; BY HOST
  5                               ;*
  6    0045                       VARATT: .BLKB    1       ;USER    (00)
  7    0046                       AT0E:   .BLKB    1       ;TBL MOD (0E)
  8                               ;*
  9                               ; THESE DEVICE ATTRIBUTES ARE NOT
 10                               ; ALTERABLE BY HOST
 11                               ;*
```

```
 12    0047
 13                          NOLOAD:  .BLKB   1       ;BYT/SEC-HI (13)
 14                                   .BLKB   1       ;  "   "  -MED(14)
 15                                   .BLKB   1       ;  "   "  -LO (15)
 16                                   .BLKB   1       ;SEC/TRK-HI (16)
 17                                   .BLKB   1       ;  "   "  -MED(17)
 18                                   .BLKB   1       ;  "   "  -LO (18)
 19                                   .BLKB   1       ;#MOVING HDS(23)
 20                                   .BLKB   1       ;MODEL#-LO  (02)
 21                          ;*
 22                          ; ATTRIBUTE TABLE POINTER
 23                          ;*
 24                          ; B7=1 -- ILLEGAL ATTRIB.#
 25                          ; B6=1 -- FIXED TABLE (PROM)
 26                          ; B5=1 -- NON-LOADABLE RAM
 27                          ; B4=0
 28                          ; B0 TO B3 -- TABLE OFFSET
 29    004F                  ;*
 30                          ATPNTR:  .BLKB   1
 31                          ;*
 32                          ; TRACK FORMAT CONSTANTS WHICH ARE
 33                          ; BY HOST CMDS 56 THROUGH 5B
 34    0050                  ;*
 35    0051                  XTRA:    .BLKB   1       ;'ALGOR' BYTE
 36                          TRACK:   .BLKB   3       ;BYTES/SECTOR
 37                                   .BLKB   3       ;SECTORS/TRACK
 38                          ;*
 39                          ; REQUIRED BY S/R "ALGOR"
 40    0057                  ;*
 41    005B                  RESULT:  .BLKB   4       ;4 BYTE PRODUCT
 42    005D                  DIVRES:  .BLKB   2       ;DIVISION RESULT
 43    005F                  MLTCNT:  .BLKB   2       ;MULTIPLIER
 44                          DIVZOR:  .BLKB   4       ;DIVISOR
 45                          ;*
 46                          ; RESULT OF TRIPLE BYTE DIVIDE  "ALGOR"
 47                          ; ---- MICROSECS PER SECTOR
 48    0063                  ;*
                             DIVTBL:  .BLKB   2
```

FLAGS AND INDICATORS

```
  1                                   .SBTTL FLAGS AND INDICATORS
  2
  3                          ;*
  4                          ; WRITE CONTROL STATUS
  5                          ;*
  6                          ; 1=WRITE DISABLED
  7                          ;*
  8                          ; B0 --- WRITE CONTROL (CMD 41)
  9                          ; B1 --- WRITE PERMIT  (CMDS 6D & 6E)
 10                          ; B2 --- WRITE PROTECT SWITCH IN DRIVE
 11    0065                  ;*
 12                          WRTFLG:  .BLKB   1
 13                          ;*
 14                          ; FLAGS
 15    0066                  ;*
 16    0067                  SEEK:    .BLKB   1       ;SEEK NEEDED
 17    0068                  REZERO:  .BLKB   1       ;HOME NEEDED
 18    0069                  INITFG:  .BLKB   1       ;INIT NEEDED
 19    006A                  HOMREQ:  .BLKB   1       ;HOME REQ'D FLG
 20    006B                  LNDFLG:  .BLKB   1       ;LAND ZONE FLAG
 21                          MATFLG:  .BLKB   1       ;FORMAT REQ'D
 22                          ;
 23    006C                  COMSEQ:  .BLKB   1       ;CMD SEQ FLAG
 24    006D                  ATTFLG:  .BLKB   1       ;SET IN "ATTNQ"
                                                      ;SET ATTENTION
 25    006E                  SRFLG:   .BLKB   1       ;SELECTIVE RESET
 26                                                   ;USED IN CLR FLT
 27
 28    006F                  SPNCON:  .BLKB   1       ;SPIN CNTRL FLG
 29    0070                  INLAND:  .BLKB   1       ;IN LANDING ZONE
 30                          ;
 31    0071                  SPABRT:  .BLKB   1       ;SPIN ABORTED
 32    0072                  SKABRT:  .BLKB   1       ;SEEK ABORTED
 33    0073                  WPSHST:  .BLKB   1       ;WP SW HIST
 34             0074         RAMEND = .
```

FAULT HANDLER ROUTINE

```
                                        .SBTTL FAULT HANDLER ROUTINE
  2          0000                        . = 0
  3   0000   A4     5A           BEGIN:  JMP     START1
  4
  5                                  ;*
  6                                  ; PORT ENABLE INTERRUPT
  7                                  ; LEVEL 2.0 AND BEYOND ONLY
  8                                  ;*
  9   0002   00                       .IF GT NEWALG
 10   0003   E4     6D                NOP
 11                                   JMP     PINTER
 12                                   .ENDC
 13                                  ;*
 14                                  ; EXTERNAL DM FAULT ROUTINE
 15                                  ; ASSUMES THAT A FAULT IS
 16                                  ; PRESENT
 17   0005   B9     32           DMFLT:  MOV     R1,#FLTSTS
 18   0007   B8     01                   MOV     R0,#1
 19   0009   80                          MOVX    A,@R0     ;INPUT FAULTS
 20   000A   53     F8                   ANL     A,#0F8
 21   000C   A1                          MOV     @R1,A
 22
 23                                  ;*
 24                                  ; BIT 7 - PWR FLT
 25                                  ; BIT 6 - R/W FLT
 26                                  ; BIT 5 - WR FLT
 27                                  ; BIT 4 - RD FLT
 28                                  ; BIT 3 - SPD FLT
 29   000D   F2     29                   J37     PWRFLT
 30   000F   D2     35           ERR1:   J36     RWFLT
 31   0011   B2     46           ERR2:   J35     WTFLT
 32   0013   92     55           ERR3:   J34     RDFLT
 33   0015   72     5B           ERR4:   J33     SPDFLT
 34
 35   0017                       ERR5:
 36
 37                                  ;*
 38                                  ; 1- RESET READY
 39                                  ; 2- UPDATE GENERAL STATUS
 40                                  ; 3- SET ATTENTION
 41                                  ; 4- SET FAULT FLAG
 42                                  ;*
 43                                  ; HARDWARE READY OFF
 44   0017   B8     44                   MOV     R0,#IMREG1
 45   0019   F0                          MOV     A,@R0
 46   001A   53     FE                   ANL     A,#0FE
 47   001C   A0                          MOV     @R0,A
 48   001D   B8     01                   MOV     R0,#1
 49   001F   90                          MOVX    @R0,A
 50
 51                                  ;*
 52                                  ; UP-DATE (GENSTS)
 53   0020   B8     33                   MOV     R0,#GENSTS
 54   0022   23     10                   MOV     A,#10     ;SENSE BYTE 1
 55   0024   40                          ORL     A,@R0
 56   0025   A0                          MOV     @R0,A
 57
 58                                  ;*
 59                                  ; SET ATTENTION
 60   0026   94     35                   CALL    SATTN
 61
 62                                  ;*
 63                                  ; RESTORE REGS & RETURN TO
 64                                  ; MAIN WAIT LOOP
 65   0028   83                   ERR6:   RET
 66
 67                                  ;*
 68                                  ; *** POWER FAULT ***
 69   0029   14     6F           PWRFLT: CALL    NOTRDY    ;POWER FAULT
 70   002B   23     04                   MOV     A,#4
 71   002D   14     67                   CALL    DO
```

```
72
73                          ;*
74                          ; SET "HOME REQ'D FLG"
75   002F   B8    69        ;*
76   0031   B0    01              MOV    R0,#HOMREQ
77   0033   04    0F              MOV    @R0,#1
78                                 JMP    ERR1
79                          ;*
80                          ; *** READ/WRITE FAULT (SSI) ***
81   0035   B8    31        ;*
82   0037   B0    50        RWFLT: MOV    R0,#MUXSEL  ;DEAD
83   0039   54    B1              MOV    @R0,#50     ;SPINDLE?
84   003B   37                    CALL   ADCONV
85   003C   72    5B              CPL    A
86                                 JB3    SPDFLT      ;JMP IF DEAD
87   003E   14    6F        ;*
88   0040   23    02              CALL   NOTRDY      ;ELSE,
89   0042   14    67              MOV    A,#2        ;READ/WRITE FLT
90   0044   04    11              CALL   DO
91                                 JMP    ERR2
92                          ;*
93                          ; *** WRITE PERMIT FAULT ***
94   0046   B9    65        ;*
95   0048   F1              WTFLT: MOV    R1,#WRTFLG  ;DISABLED
96   0049   12    4F              MOV    A,@R1       ;DUE TO WRT CNTL
97   004B   23    08              JB0    WREJ
98   004D   04    51              MOV    A,#8        ;R/W PERM VIOL
99   004F   23    22              JMP    WCON
100  0051   14    67        WREJ:  MOV    A,#22       ;CMD REJ
101  0053   04    13        WCON:  CALL   DO          ; & R/W FLT
102                                JMP    ERR3
103                         ;*
104                         ; *** READ PERMIT FAULT ***
105  0055   23    08        ;*
106  0057   14    67        RDFLT: MOV    A,#8        ;READ FAULT
107  0059   04    15              CALL   DO
108                                JMP    ERR4
109                         ;*
110                         ; *** SPEED FAULT ***
111  005B   14    6F        ;*
112  005D   23    10        SPDFLT:CALL   NOTRDY
113  005F   14    67              MOV    A,#10       ;SPEED FAULT
114                                CALL   DO
115                         ;*
116                         ; SET HOME REQ'D FLAG
117  0061   B8    69        ;*
118  0063   B0    01              MOV    R0,#HOMREQ
119  0065   04    17              MOV    @R0,#1
120                                JMP    ERR5
121                         ;*
122                         ;*
123                         ; SET PROPER BIT IN SENSE BYTE 1
124  0067   B8    34        ;*
125  0069   40              DO:    MOV    R0,#SNS1
126  006A   A0                     ORL    A,@R0       ;ADD NEW STATUS
127  006B   B9    32              MOV    @R0,A
128  006D   F1                     MOV    R1,#FLTSTS
129  006E   83                     MOV    A,@R1       ;RESTORE A
130                                RET
131                         ;*
132                         ; SET "NOT-READY" IN (GENSTS)
133  006F   B8    33        ;*
134  0071   F0              NOTRDY:MOV    R0,#GENSTS
135  0072   43    01              MOV    A,@R0
136  0074   A0                     ORL    A,#1
137  0075   94    A0              MOV    @R0,A
138  0077   94    BA              CALL   READY       ;HISTORY
139  0079   83                     CALL   ATTNQ       ;SET ATTN
                                   RET
```

MOVE ROUTINE

```
                                        .SBTTL MOVE ROUTINE
                                  ;************************************
                                  ;*
                                  ;                SUBROUTINES
                                  ;*
                                  ;************************************
                                  ;*
                                  ; STEPPER MOTOR HAS TABLE CONTROLLED
                                  ; START/STOP VELOCITY PROFILES. PROGRAM
                                  ; MUST ENSURE ,WHEN ACCELERATING OR
                                  ; SLEWING, THAT # OF STEPS REMAINING IN
                                  ; MOVE IS ALWAYS LESS THAN # OF
                                  ; STEPS IN  DECELERATION TABLE. IF
                                  ; SLEWING ,A TRANSITION TO DECEL. TABLE
                                  ; IS MADE; IF STILL ACCELERATING, THE
                                  ; TRANSITION TO DECEL. IS MADE WHEN
                                  ; (DECEL. TABLE) = (ACCEL. TABLE). THIS
                                  ; ALLOWS FOR REQUIRED TRIANGULATED
                                  ; VELOCITY PROFILES WHEN SLEW SPEED
                                  ; IS NOT ATTAINED -- SHORT MOVES.
                                  ;*
                                  ; DISABLE COUNTER IN 8039
                                  ; INCREMENT (TIMER) TO MAKE UP
                                  ; FOR TIME LOST DURING MOVE --
                                  ; (ASSUME AVERAGE MOVE = 20 MILLISECS)
                                  ;*
                                  ; SKIP MOVE IF "HOME REQ'D" FLAG SET
                                  ;*
 007A    B8    69                 MOVE:   MOV    R0,#HOMREQ
 007C    F0                               MOV    A,@R0
 007D    C6    84                         JZ     DOMOVE

;*
                                  ; SET SEEK ABORT FLAG -- CANNOT MOVE
                                  ;*
 007F    B8    72                         MOV    R0,#SKABRT
 0081    B0    01                         MOV    @R0,#1
 0083    83                               RET
                                  ;*
 0084    F4    0A                 DOMOVE: CALL   TEMUP   ;SET TEMP COMP
 0086    F4    61                         CALL   NEWOFF  ;OF NEW TRK
 0088    94    4A                         CALL   DIRTST  ;DIR OF MOVE?
 008A    B8    25                         MOV    R0,#HEDDIR
 008C    07                               DEC    A
 008D    C6    A5                         JZ     REV2    ;A=0 IF REV
                                  ;*
                                  ; FORWARD DIRECTION
                                  ;*
 008F    B0    00                         MOV    @R0,#0
 0091    B8    2C                         MOV    R0,#TCKDEM
 0093    F0                               MOV    A,@R0   ;MS TCKDEM IN R2
 0094    AA                               MOV    R2,A
 0095    18                               INC    R0
 0096    F0                               MOV    A,@R0   ;LS TCKDEM IN A
 0097    B8    2F                         MOV    R0,#TCKNUM+1
 0099    94    65                 MOV1:   CALL   DSUB
                                  ;*
                                  ; MS BYTE (TCKDIF) IN R2
                                  ; LS  "       "     " A
                                  ;*
 009B    AD                               MOV    R5,A
 009C    B8    24                         MOV    R0,#TCKDIF+1
 009E    A0                               MOV    @R0,A
 009F    C8                               DEC    R0
 00A0    FA                               MOV    A,R2
 00A1    A0                               MOV    @R0,A
 00A2    AE                               MOV    R5,A
                                  ;*
                                  ; MS BYTE OF (TCKDIF) IN R6
                                  ; LS  "   "     "      " R5
                                  ;*
 00A3    04    B1                         JMP    MOVE1
```

| | | | | | |
|---|---|---|---|---|---|
| 72 | | | | ;* | |
| 73 | | | | ;* REVERSE DIRECTION | |
| 74 | | | | ;* | |
| 75 | 00A5 | B0 | 01 | REV2: MOV | @R0,#1 |
| 76 | 00A7 | B8 | 2E | MOV | R0,#TCKNUM |
| 77 | 00A9 | F0 | | MOV | A,@R0 |
| 78 | 00AA | AA | | MOV | R2,A |
| 79 | 00AB | 18 | | INC | R0 |
| 80 | 00AC | F0 | | MOV | A,@R0 |
| 81 | 00AD | B8 | 2D | MOV | R0,#TCKDEM+1 |
| 82 | 00AF | 04 | 99 | JMP | MOV1 |
| 83 | | | | ;* | |
| 84 | | | | ; IF MOVE IS REVERSE (TOWARD OUTSIDE) | |
| 85 | | | | ; INCREASE LENGTH OF MOVE BY ONE CYL | |
| 86 | | | | ; -- COMPENSATE AT END OF MOVE | |
| 87 | | | | ;* | |
| 88 | 00B1 | B8 | 25 | MOVE1: MOV | R0,#HEDDIR |
| 89 | 00B3 | F0 | | MOV | A,@R0 |
| 90 | 00B4 | C6 | BD | JZ | MOVE2 ;JMP IF FOR |
| 91 | 00B6 | 1D | | INC | R5 |
| 92 | 00B7 | FD | | MOV | A,R5 |
| 93 | 00B8 | C6 | BC | JZ | CARRY |
| 94 | 00BA | 04 | BD | JMP | MOVE2 |
| 95 | 00BC | 1E | | CARRY: INC | R6 |
| 96 | | | | ;* | |
| 97 | 00BD | 23 | 75 | MOVE2: MOV | A,#75 ;CURRENT MODE |
| 98 | 00BF | 94 | 6F | CALL | DMDATA |
| 99 | | | | ;* | |
| 100 | | | | ; SAVE (TCKDIF) FOR END OF MOVE DELAY | |
| 101 | | | | ;* | |
| 102 | 00C1 | B8 | 23 | MOV | R0,#TCKDIF |
| 103 | 00C3 | B9 | 2A | MOV | R1,#MOVSIZ |
| 104 | 00C5 | F0 | | MOV | A,@R0 |
| 105 | 00C6 | A1 | | MOV | @R1,A |
| 106 | 00C7 | 18 | | INC | R0 |
| 107 | 00C8 | 19 | | INC | R1 |
| 108 | 00C9 | F0 | | MOV | A,@R0 |
| 109 | 00CA | A1 | | MOV | @R1,A |
| 110 | | | | ;* | |
| 111 | | | | ; STORE LS BYTE OF ACCTBL IN R2 | |
| 112 | | | | ; " " " " DCTBL " R3 | |
| 113 | | | | ; STORE (DECSPS) " R7 | |
| 114 | | | | ;* | |
| 115 | 00CB | BA | 45 | MOV | R2,#ACCTBL&0FF |
| 116 | 00CD | BB | 5A | MOV | R3,#DCTBL&0FF |
| 117 | 00CF | 23 | 59 | MOV | A,#DECSPS&0FF |
| 118 | 00D1 | E3 | | MOVP3 | A,@A |
| 119 | 00D2 | AF | | MOV | R7,A |
| 120 | | | | ;* | |
| 121 | | | | ; IF # OF REMAINING STEPS ARE GREATER | |
| 122 | | | | ; THAN # OF DEC'N STEPS, CLIMB UP ACCEL | |
| 123 | | | | ; RAMP OR CONTINUE TO SLEW --- | |
| 124 | | | | ; NOTE: ASSUMPTION IS THAT # OF DEC'N | |
| 125 | | | | ; STEPS IN TABLE IS ALWAYS 255 OR LESS | |
| 126 | | | | ;* | |
| 127 | 00D3 | FE | | ACLOOP: MOV | A,R6 ;MS TCKDIF |
| 128 | 00D4 | 96 | EF | JNZ | PAD2 ;"TCKDIF" > 255? |
| 129 | 00D6 | FD | | MOV | A,R5 |
| 130 | 00D7 | 37 | | CPL | A |
| 131 | 00D8 | 17 | | INC | A ;2'S CPL |
| 132 | 00D9 | A8 | | MOV | R0,A ;SAVE |
| 133 | 00DA | FF | | MOV | A,R7 ;(DECSPS) IN A |
| 134 | 00DB | 68 | | ADD | A,R0 ;DIFFERENCE |
| 135 | | | | ;* | |
| 136 | | | | ; CARRY= 1 IF "TCKDIF" >= (DECSPS) | |
| 137 | | | | ;* | |
| 138 | 00DC | F6 | F7 | JC | DECEL |
| 139 | | | | ;* | |
| 140 | | | | ; ACCELERATION LOOP | |
| 141 | | | | ; (R2) = CURRENT ACCEL POINTER | |
| 142 | | | | ;* | |
| 143 | 00DE | FA | | ACCT: MOV | A,R2 |

```
144   00DF    E3                      MOVP3   A,@A        ;STEP DLY IN A
145   00E0    B8      22              MOV     R0,#MTRDEL
146   00E2    A0                      MOV     @R0,A
147   00E3    34      2B              CALL    DOIT        ;STEP MOTOR
148   00E5    94      8D              CALL    STPDEL      ;STEP DELAY
149
150                                   ;*
151                                   ; CHECK FOR TABLE TOP
                                      ;*
152   00E7    1A                      INC     R2
153   00E8    FA                      MOV     A,R2
154   00E9    E3                      MOVP3   A,@A
155   00EA    96      ED              JNZ     JMPDCL      ;A=0 IF THERE
156   00EC    CA                      DEC     R2
157   00ED    04      D3      JMPDCL: JMP     ACLOOP
158
159                                   ;*
                                      ; 8 CYCLE PAD
                                      ;*
161   00EF    B8      02      PAD2:   MOV     R0,#2
162   00F1    E8      F1              DJNZ    R0,PAD2+2
163   00F3    04      DE              JMP     ACCT
164
165                                   ;*
166                                   ; DECELERATION LOOP
167                                   ; (R3)=CURRENT DECEL TBL PNTR
168                                   ; NOTE: MS BYTE OF "TCKDIF"=0
169                                   ;       I.E. -- # OF TRACKS REMAINING
170                                   ;       IS ALWAYS LESS THAN 256
                                      ;*
171   00F5    00                      NOP                 ;ASSEMBLER FIX
172   00F6    00                      NOP
173
174   00F7    FB              DECEL:  MOV     A,R3
175                                   ;*
176                                   ; OFFSET DECEL TABLE
177                                   ;*
178   00F8    6D                      ADD     A,R5
179   00F9    AB                      MOV     R3,A        ;STARTING DECEL
180                                                       ; POINTER
181                                   ;
                                      ;*
182   00FA    FB              DCLOOP: MOV     A,R3
183   00FB    E3                      MOVP3   A,@A        ;CURRENT "  "
184
185                                   ;*
186                                   ; WHICH TABLE HAS LARGER DELAY ?
                                      ;*
187   00FC    37                      CPL     A
188   00FD    A8                      MOV     R0,A        ;1'S OF DEC DLY
189   00FE    FA                      MOV     A,R2
190   00FF    E3                      MOVP3   A,@A        ;ACCEL DLY IN A
191   0100    68                      ADD     A,R0
192   0101    E6      18              JNC     DECDEL      ;CY=1 IF
193                                                       ; ACC DLY>DEC DLY
194                                   ;
                                      ;*
195                                   ; CONTINUE ACCELERATING WITHIN
196                                   ; DECELERATION ZONE UNTIL SLOPES CROSS
                                      ;*
198   0103    FA                      MOV     A,R2
199   0104    E3                      MOVP3   A,@A
200   0105    B8      22              MOV     R0,#MTRDEL
201   0107    A0                      MOV     @R0,A
202   0108    34      2B              CALL    DOIT
203
204                                   ;*
205                                   ; CHECK IF MOVE IS COMPLETE -- IF SO
206                                   ; GO TO "ENDMOV"
                                      ;*
207   010A    FD                      MOV     A,R5        ;LS - TCKDIF
208   010B    C6      4C              JZ      ENDMOV
209   010D    94      8D              CALL    STPDEL
210
211                                   ;*
212                                   ; UP-DATE ACCEL/DECEL POINTERS
                                      ;*
213   010F    1A                      INC     R2
214   0110    CB                      DEC     R3
215                                   ;*
```

```
                        ; CHECK FOR TABLE TOP
                        ;*
216
217
218   0111   FA                 MOV     A,R2
219   0112   E3                 MOVP3   A,@A
220   0113   96   16             JNZ     JMPLUP
221   0115   CA                 DEC     R2
222   0116   04   FA    JMPLUP: JMP     DCLOOP
223
224                     ;*
225                     ; DECELERATION BY SLIDING DOWN DECEL TBL
                        ;*
226   0118   FB        DECDEL: MOV     A,R3        ;MTR TBL PNT
227   0119   E3                 MOVP3   A,@A
228   011A   B8   22             MOV     R0,#MTRDEL
229   011C   A0                 MOV     @R0,A
230   011D   34   2B             CALL    DOIT
231
232                     ;*
233                     ; IS MOVE COMPLETE ?
                        ;*
234   011F   FD                 MOV     A,R5        ;LS - TCKDIF
235   0120   C6   4C             JZ      ENDMOV
236   0122   94   8D             CALL    STPDEL
237
238                     ;*
239                     ; 18 CYCLE PAD
                        ;*
240   0124   B8   07             MOV     R0,#7
241   0126   E8   26    PAD1:   DJNZ    R0,PAD1
242                     ;*
243   0128   CB                 DEC     R3
244   0129   24   18             JMP     DECDEL
  1                     ;*
  2                     ; OUTPUT NEXT STEPPER MOTOR NIBBLE &
  3                     ; UP-DATE "TCKDIF'
  4                     ;*
  5                     ; PREVENT STEP IF "SPDFLT" TRUE
  6                     ; BUT ALLOW COMPLETION OF MOVE
  7                     ; ROUTINE
  8                     ;*
  9                     ; UP-DATE "TCKDIF'
 10                     ;*
 11   012B   FD        DOIT:   MOV     A,R5
 12   012C   03   FF             ADD     A,#0FF      ;DECREMENT
 13   012E   AD                 MOV     R5,A
 14   012F   F6   34             JC      DOIT1
 15   0131   FE                 MOV     A,R6
 16   0132   07                 DEC     A
 17   0133   AE                 MOV     R6,A
 18                     ;*
 19   0134   B8   01    DOIT1:  MOV     R0,#1
 20   0136   80                 MOVX    A,@R0
 21                     ;*
 22                     ; SPEED OR POWER FAULT ?
 23                     ;*
 24   0137   72   47             J33     SKIP1       ;SPD FLT
 25   0139   F2   47             J37     SKIP1       ;PWR FLT
 26   013B   54   01             CALL    TBLADJ
 27                     ;*
 28                     ; (MOTOR)=NEXT MOTOR TABLE POINTER
 29                     ;*
 30   013D   B8   26             MOV     R0,#MOTOR
 31   013F   F0                 MOV     A,@R0       ;POINTER IN A
 32   0140   E3                 MOVP3   A,@A
 33   0141   53   0F             ANL     A,#0F       ;FUNCTION = 0
 34                     ;*
 35                     ; STEP MOTOR ONCE
 36                     ;*
 37   0143   94   6F             CALL    DMDATA
 38   0145   24   4B             JMP     SKIP2
 39   0147   B8   72    SKIP1:  MOV     R0,#SKABRT  ;SET FLAG
 40   0149   B0   01             MOV     @R0,#1
 41   014B   83        SKIP2:  RET
```

END-OF-MOVE

```
                                            .SBTTL END-OF-MOVE
                                        ;*
                                        ; CHECK (MOVSIZ) & INSERT DELAYS SO THAT
                                        ; "ON-CYL" IS DECLARED AT PROPER TIME
                                        ;*
 6   014C    B8    25          ENDMOV: MOV     R0,#HEDDIR
 7   014E    F0                        MOV     A,@R0
 8   014F    C6    69                  JZ      MOVEND  ;JMP IF FOR
                                        ;*
                                        ; APPLY CORRECTION AFTER SMALL
                                        ; DELAY - ELIMINATE STEPPER HYSTERESIS
                                        ;*
13   0151    B0    00                  MOV     @R0,#0   ;FORWARD 1-TRK
14   0153    54    01                  CALL    TBLADJ
                                        ;*
16   0155    23    71                  MOV     A,#71   ;VOLTAGE MODE
17   0157    94    6F                  CALL    D1DATA
                                        ;*
19   0159    B8    26                  MOV     R0,#MOTOR
20   015B    F0                        MOV     A,@R0
21   015C    E3                        MOVP3   A,@A
22   015D    53    0F                  ANL     A,#0F
23   015F    94    6F                  CALL    D1DATA
24   0161    BB    12                  MOV     R3,#^D18 ;REV 1-TRK DLY
25   0163    B8    25                  MOV     R0,#HEDDIR
26   0165    B0    01                  MOV     @R0,#1
27   0167    24    6B                  JMP     MOVFIN
28   0169    BB    0E          MOVEND: MOV     R3,#^D14 ;FOR 1-TRK DLY
29   016B    23    71          MOVFIN: MOV     A,#71   ;VOLTAGE MODE
30   016D    94    6F                  CALL    D1DATA
                                        ;*
                                        ; IS THIS A ONE TRACK MOVE ?
                                        ;*
34   016F    B8    2A                  MOV     R0,#MOVSIZ
35   0171    F0                        MOV     A,@R0
36   0172    96    7A                  JNZ     NO
37   0174    18                        INC     R0
38   0175    F0                        MOV     A,@R0
39   0176    D3    01                  XRL     A,#1
40   0178    C6    89                  JZ      MOVDEL
                                        ;*
                                        ; MULTI-TRACK MOVE DELAY
                                        ;*
44   017A    B8    25          NO:     MOV     R0,#HEDDIR ;DIR OF MOVE
45   017C    B9    26                  MOV     R1,#MOTOR  ;GET ADDR OF
46   017E    F1                        MOV     A,@R1      ;STEP ENTRY
47   017F    03    09                  ADD     A,#9
48   0181    E3                        MOVP3   A,@A
49   0182    03    C0                  ADD     A,#NIBTBL&0FF ;ENTRY TOP
50   0184    03    04                  ADD     A,#4       ;DELAY DATA
51   0186    60                        ADD     A,@R0      ;DIRECTION
52   0187    E3                        MOVP3   A,@A       ;GET DELAY TIME
53   0188    AB                        MOV     R3,A
                                        ;*
55   0189    27          MOVDEL: CLR     A
56   018A    B8    28                  MOV     R0,#DELMLT
57   018C    A0                        MOV     @R0,A
58   018D    18                        INC     R0
59   018E    FB                        MOV     A,R3
60   018F    A0                        MOV     @R0,A
61   0190    94    79                  CALL    DELAY
                                        ;*
63   0192    B8    2C                  MOV     R0,#TCKDEM
64   0194    F0                        MOV     A,@R0
65   0195    B9    2E                  MOV     R1,#TCKNUM  ;UPDATE
66   0197    A1                        MOV     @R1,A       ;TCKNUM
67   0198    18                        INC     R0
68   0199    19                        INC     R1
69   019A    F0                        MOV     A,@R0
70   019B    A1                        MOV     @R1,A
```

```
71
72                              ;*
73                              ; IF THIS MOVE WAS RESULT OF LANDING
74                              ; ZONE COMMAND -- THEN RETURN
75   019C   B8    6A            ;*
76   019E   F0                          MOV     R0,#LNDFLG
77   019F   96    A5                    MOV     A,@R0
78                                      JNZ     LAND
79                              ;*
80                              ; UP-DATE (TEMPER) -- APPLY PROPER
81                              ; STEPPER MOTOR OFFSET & SET WRITE
82                              ; CURRENT LEVEL FOR PRESENT CYLINDER
83   01A1   94    1A            ;*
84   01A3   34    A6                    CALL    WRTCUR
85                                      CALL    RWPERM
86   01A5   83                  ;*
                                LAND:   RET             ;RETURN FROM "MOVE"
```

R/W PERMIT ROUTINE

```
 1
 2                                      .SBTTL  R/W PERMIT ROUTINE
 3                              ;*
 4                              ; R/W PERMIT IDENTIFICATION
 5   01A6   B8    36            ;*
 6   01A8   94    4C            RWPERM: MOV     R0,#WPERM  ;CHECK FOR
 7   01AA   07                          CALL    DIRT       ;WRITE PERMIT
 8   01AB   07                          DEC     A
 9   01AC   96    B8                    DEC     A
10                                      JNZ     PEMW
11                              ;*
12                              ; DISABLE WRITE HERE
13   01AE   B8    65            ;*
14   01B0   F0                          MOV     R0,#WRTFLG
15   01B1   43    02                    MOV     A,@R0
16   01B3   A0                          ORL     A,#02      ;SET FLAG
17   01B4   34    D7                    MOV     @R0,A
18   01B6   24    C0                    CALL    WRTSTS     ;DO EVERYTHING
19                                      JMP     DORD
20                              ;*
21                              ; PERMIT WRITE HERE
22   01B8   B8    65            ;*
23   01BA   F0                  PEMW:   MOV     R0,#WRTFLG
24   01BB   53    FD                    MOV     A,@R0
25   01BD   A0                          ANL     A,#0FD     ;RESET FLAG
26   01BE   34    D7                    MOV     @R0,A
27                                      CALL    WRTSTS     ;DO EVERYTHING
28   01C0   B8    38            ;*
29   01C2   94    4C            DORD:   MOV     R0,#RPERM  ;CHECK FOR
30   01C4   07                          CALL    DIRT       ;READ PERMIT
31   01C5   07                          DEC     A
32   01C6   B8    43                    DEC     A
33   01C8   96    D1                    MOV     R0,#IMPRT2
34   01CA   F0                          JNZ     PEMR
35   01CB   53    DF                    MOV     A,@R0      ;READ INHIBITED
36   01CD   A0                          ANL     A,#0DF     ;ON THIS CYL.
37   01CE   3A                  PEMR1:  MOV     @R0,A
38   01CF   24    D6                    OUTL    P2,A
39                                      JMP     RWDONE
40   01D1   F0                  ;*
41   01D2   43    20            PEMR:   MOV     A,@R0      ;READ ENABLED
42   01D4   24    CD                    ORL     A,#20      ;ON THIS CYL.
43   01D6   83                          JMP     PEMR1
                                RWDONE: RET
```

WRITE STATUS ADJUST

```
 1
 2                                      .SBTTL  WRITE STATUS ADJUST
 3                              ;*
 4                              ; ADJUST STATUS
 5                              ; ENABLE/DISABLE WRITE
 6   01D7   B8    65            ;*
 7   01D9   F0                  WRTSTS: MOV     R0,#WRTFLG
 8   01DA   B8    33                    MOV     A,@R0
                                        MOV     R0,#GENSTS
```

```
 9    01DC    B9   35              MOV    R1,#SNS2
10    01DE    C6   EF              JZ     OKWRT
11
12                          ;*
13                          ; WRITE INHIBITED
                            ;*
14    01E0    F0              MOV    A,@R0
15    01E1    43   20          ORL    A,#20
16    01E3    A0              MOV    @R0,A    ;(GENSTS)
17                          ;*
18    01E4    F1              MOV    A,@R1
19    01E5    43   40          ORL    A,#40
20    01E7    A1              MOV    @R1,A    ;(SNS2)
21                          ;*
22    01E8    B8   43          MOV    R0,#IMPRT2
23    01EA    23   EF          MOV    A,#0EF
24    01EC    50              ANL    A,@R0
25    01ED    24   FE          JMP    WRTEND
26
27    01EF    F1      OKWRT:  MOV    A,@R1
28    01F0    53   BF          ANL    A,#0BF
29    01F2    A1              MOV    @R1,A
30    01F3    96   F9          JNZ    RESDUN
31    01F5    F0              MOV    A,@R0
32    01F6    53   DF          ANL    A,#0DF
33    01F8    A0              MOV    @R0,A
34                          ;*
35    01F9    B8   43  RESDUN: MOV   R0,#IMPRT2
36    01FB    23   10          MOV    A,#10
37    01FD    40              ORL    A,@R0
38    01FE    A0      WRTEND: MOV    @R0,A
39    01FF    3A              OUTL   P2,A
40    0200    83              RET
```

STEPPER TABLE ADJUST

```
                            .SBTTL STEPPER TABLE ADJUST
                        ;*
                        ; ROUTINE TO ADJUST (MOTOR) FOR "DOIT"
                        ;*
 5    0201    B8   25   TBLADJ: MOV    R0,#HEDDIR
 6    0203    B9   26           MOV    R1,#MOTOR
 7    0205    F0               MOV    A,@R0    ;DIRECTION ?
                        ;*
 9    0206    96   14           JNZ    REV
10    0208    11              INC    @R1
11    0209    F1              MOV    A,@R1
12    020A    E3              MOVP3  A,@A     ;MOTOR NIBBLE
13    020B    D3   FF          XRL    A,#0FF   ;OFF TABLE TOP?
14    020D    96   1F          JNZ    INTBL
15    020F    23   34          MOV    A,#TBLBOT&0FF
16    0211    A1              MOV    @R1,A    ;TABLE BOTTOM
17    0212    44   1F          JMP    INTBL
18    0214    F1      REV:    MOV    A,@R1
19    0215    07              DEC    A
20    0216    A1              MOV    @R1,A
21    0217    E3              MOVP3  A,@A     ;MOTOR NIBBLE
22    0218    D3   00          XRL    A,#0     ;OFF TABLE BOT?
23    021A    96   1F          JNZ    INTBL
24    021C    23   3B          MOV    A,#TBLTOP&0FF
25    021E    A1              MOV    @R1,A    ;TABLE TOP
26    021F    83      INTBL:  RET
```

REZERO ROUTINE

```
                            .SBTTL REZERO ROUTINE
                        ;*
                        ; HOME OR REZERO ROUTINE
                        ;*
 5    0220    B8   69   HOME:  MOV    R0,#HOMREQ ;IF HOMREQ,
 6    0222    F0              MOV    A,@R0      ; SLOW MOVE
 7    0223    96   3E          JNZ    SLOW       ; ALWAYS
 8                        ;
 9    0225    B8   2C          MOV    R0,#TCKDEM ;WHERE HDS?
```

| Line | Addr | B1 | B2 | Label | Op | Operand | Comment |
|---|---|---|---|---|---|---|---|
| 10 | 0227 | B0 | 00 | | MOV | @R0,#0 | |
| 11 | 0229 | 18 | | | INC | R0 | |
| 12 | 022A | B0 | 10 | | MOV | @R0,#10 | |
| 13 | 022C | 94 | 4A | | CALL | DIRTST | |
| 14 | 022E | C6 | 35 | | JZ | SHORT | ;HDS @ CYL 10 |
| 15 | 0230 | 07 | | | DEC | A | |
| 16 | 0231 | 96 | 35 | | JNZ | SHORT | ;HDS < CYL 10 |
| 17 | 0233 | 14 | 7A | | CALL | MOVE | ;FAST SEEK - CYL 10 |
| 18 | | | | ; | | | |
| 19 | 0235 | B8 | 23 | SHORT: | MOV | R0,#TCKDIF | |
| 20 | 0237 | B0 | 00 | | MOV | @R0,#0 | ;NOW DO SLOW SEEK |
| 21 | 0239 | 18 | | | INC | R0 | ; 14 TRKS, TO HIT |
| 22 | 023A | B0 | 14 | | MOV | @R0,#14 | ; END-STOP. |
| 23 | 023C | 44 | 45 | | JMP | HMCON | |
| 24 | | | | ; | | | |
| 25 | 023E | B8 | 23 | SLOW: | MOV | R0,#TCKDIF | |
| 26 | 0240 | B0 | 01 | | MOV | @R0,#1 | |
| 27 | 0242 | 18 | | | INC | R0 | ;350 TRACK |
| 28 | 0243 | B0 | 5E | | MOV | @R0,#5E | ;MOVE IN TCKDIF |
| 29 | | | | ; | | | |
| 30 | 0245 | B8 | 25 | HMCON: | MOV | R0,#HEDDIR | |
| 31 | 0247 | B0 | 01 | | MOV | @R0,#1 | ;GO REVERSE |
| 32 | 0249 | 23 | 70 | | MOV | A,#70 | ;SWITCH TO |
| 33 | 024B | 94 | 6F | | CALL | DMDATA | ;HOME MODE |
| 34 | | | | ;* | | | |
| 35 | | | | ; PREVENT STEP IF SPDFLT OR PWRFLT TRUE | | | |
| 36 | | | | ;* | | | |
| 37 | 024D | B8 | 01 | HOME1: | MOV | R0,#1 | |
| 38 | 024F | 80 | | | MOVX | A,@R0 | |
| 39 | 0250 | 72 | AC | | J33 | BADHM | ;SPD FLT |
| 40 | 0252 | F2 | AC | | J37 | BADHM | ;PWR FLT |
| 41 | | | | ;* | | | |
| 42 | 0254 | 54 | 01 | | CALL | TBLADJ | |
| 43 | 0256 | B9 | 26 | | MOV | R1,#MOTOR | |
| 44 | 0258 | F1 | | | MOV | A,@R1 | ;POINTER IN A |
| 45 | 0259 | E3 | | | MOVP3 | A,@A | |
| 46 | 025A | 53 | 0F | | ANL | A,#0F | ;FUNCTION = 0. |
| 47 | 025C | 94 | 6F | | CALL | DMDATA | ;STEP MOTOR. |
| 48 | 025E | B9 | 20 | | MOV | R1,#DELMLT | |
| 49 | 0260 | B1 | 00 | | MOV | @R1,#0 | |
| 50 | 0262 | 19 | | | INC | R1 | |
| 51 | 0263 | B1 | 1E | | MOV | @R1,#^D30 | |
| 52 | 0265 | 94 | 79 | | CALL | DELAY | ;30 MS. DELAY |
| 53 | | | | ;* | | | |
| 54 | 0267 | B8 | 3B | | MOV | R0,#TEMP2 | ;LOAD # 1 INTO |
| 55 | 0269 | B0 | 00 | | MOV | @R0,#0 | ;TEMP2. |
| 56 | 026B | 18 | | | INC | R0 | |
| 57 | 026C | B0 | 01 | | MOV | @R0,#1 | |
| 58 | | | | ;* | | | |
| 59 | 026E | B9 | 23 | | MOV | R1,#TCKDIF | ;DECREMENT |
| 60 | 0270 | F1 | | | MOV | A,@R1 | ;TCKDIF BY 1 |
| 61 | 0271 | AA | | | MOV | R2,A | |
| 62 | 0272 | 19 | | | INC | R1 | |
| 63 | 0273 | F1 | | | MOV | A,@R1 | |
| 64 | 0274 | 94 | 65 | | CALL | DSUB | |
| 65 | 0276 | A1 | | | MOV | @R1,A | |
| 66 | 0277 | AB | | | MOV | R3,A | ;SAVE FOR 0 CHECK |
| 67 | 0278 | C9 | | | DEC | R1 | |
| 68 | 0279 | FA | | | MOV | A,R2 | |
| 69 | 027A | A1 | | | MOV | @R1,A | |
| 70 | 027B | 4B | | | ORL | A,R3 | ;TEST IF ZERO. |
| 71 | 027C | 96 | 89 | | JNZ | JMPHOM | ;DO AGAIN IF NOT |
| 72 | | | | ;* | | | |
| 73 | 027E | B8 | 26 | | MOV | R0,#MOTOR | |
| 74 | 0280 | F0 | | | MOV | A,@R0 | ;POINTER IN A |
| 75 | 0281 | E3 | | | MOVP3 | A,@A | |
| 76 | 0282 | D3 | 08 | | XRL | A,#8 | ;COMPARE WITH 8 |
| 77 | 0284 | C6 | 8B | | JZ | ISATE | |
| 78 | 0286 | 19 | | | INC | R1 | |
| 79 | 0287 | B1 | 01 | | MOV | @R1,#1 | |
| 80 | 0289 | 44 | 4D | JMPHOM: | JMP | HOME1 | |
| 81 | | | | ;* | | | |

```
                          ; STOP ON MOTOR NIBBLE=8 -- THEN
                          ; ADVANCE ONE CYL TO CYL #0
                          ;*
85   028B   B8    25      ISATE:  MOV   R0,#HEDDIR
86   028D   B0    00              MOV   @R0,#0   ;FORWARD
87   028F   34    2B              CALL  DOIT
                          ;*
89   0291   23    71              MOV   A,#71    ;SWITCH TO
90   0293   94    6F              CALL  DM1DATA  ;DAMPING MODE
91   0295   B8    2E              MOV   R0,#TCKNUM
92   0297   27                    CLR   A
93   0298   A0                    MOV   @R0,A    ;SET 0  INTO
94   0299   18                    INC   R0       ;TCKNUM.
95   029A   A0                    MOV   @R0,A
96   029B   94    1A              CALL  WRTCUR   ;UPDATE WR CUR
97   029D   F4    0A              CALL  TEMUP    ;UPDATE TEMP
98   029F   F4    5A              CALL  TEMOFF   ;MOTOR  OFFSET
99   02A1   34    A6              CALL  RWPERM
                          ;*
                          ; REMOVE HOMREQ & INLAND FLAGS
                          ;*
103  02A3   B8    69      ISATE1: MOV   R0,#HOMREQ
104  02A5   B0    00              MOV   @R0,#0
105  02A7   B8    70              MOV   R0,#INLAND
106  02A9   B0    00              MOV   @R0,#0   ;CLR FLAG
107  02AB   83                    RET
                          ;*
                          ; IF FAULTS, SET SKABRT FLAG
                          ;*
111  02AC   B8    72      BADHM:  MOV   R0,#SKABRT
112  02AE   B0    01              MOV   @R0,#1
113  02B0   83                    RET
```

A/D CONVERT ROUTINE

```
                                  .SBTTL A/D CONVERT ROUTINE
                          ;*
                          ; 4-BIT A TO D CONVERSION
                          ;*
                          ; (MUXSEL) MUST BE PRESET AS PER BELOW
                          ; --- 00--- SENSE TEMPERATURE
                          ;     10--- UNUSED
                          ;     20--- UNUSED
                          ;     30--- UNUSED
                          ;     40--- WPSW- (0=PROTECTED)
                          ;     50--- SPDL DEAD (0=DEAD)
                          ;     60--- SSI UNSAFE
                          ;     70--- UNUSED
                          ; RESULT IN "ACC"
                          ;*
16   02B1   BD    04      ADCONV: MOV   R5,#4
17   02B3   BE    F7              MOV   R6,#0F7
18   02B5   23    08              MOV   A,#8     ;START TRIAL
19   02B7   AA                    MOV   R2,A     ;R2 = 0.5 FS
                          ;*
                          ; OUTPUT TRIAL VALUE IN R2 TO DAC
                          ;*
23   02B8   FA              MORCNV: MOV   A,R2     ;TRIAL  VALUE
24   02B9   53    0F              ANL   A,#0F
25   02BB   43    50              ORL   A,#50    ;FUNCTION = 5
26   02BD   94    6F              CALL  DM1DATA
                          ;*
                          ; SELECT DM MUX POLE
                          ;*
30   02BF   B8    31              MOV   R0,#MUXSEL
31   02C1   F0                    MOV   A,@R0
32   02C2   53    70              ANL   A,#70
33   02C4   B9    02              MOV   R1,#2    ;WRITE REG. 2
34   02C6   91                    MOVX  @R1,A
                          ;*
                          ; ALLOW 300 MICROSEC OP-AMP SETTLING
                          ;*
38   02C7   BF    3C      CONDEL: MOV   R7,#3C
```

```
39  02C9   EF     C9
40
41
42
43
44
45  02CB   56     D0
46  02CD   FA
47  02CE   5E
48  02CF   AA
49  02D0   FA
50  02D1   4D
51  02D2   AA
52  02D3   FD
53  02D4   77
54  02D5   AD
55  02D6   FE
56  02D7   77
57  02D8   AE
58
59
60
61  02D9   53     80
62  02DB   96     B8
63  02DD   FA
64  02DE   53     0F
65  02E0   83
```

DJNZ    R7,CONDEL+2
;*
; "T1" INPUT TO 8339-6 WILL BE
; EQUAL TO 1 IF TRIAL VALUE IS
; LESS THAN ANALOGUE VALUE
;*
                JT1     TOOSML    ;TOO SMALL
                MOV     A,R2
                ANL     A,R6
                MOV     R2,A
TOOSML:         MOV     A,R2
                ORL     A,R5
                MOV     R2,A      ;NEW TRIAL VALUE
                MOV     A,R5
                RR      A
                MOV     R5,A
                MOV     A,R6
                RR      A
                MOV     R5,A
;*
; FOUR APPROXIMATIONS
;*
                ANL     A,#80
                JNZ     MORCNV
                MOV     A,R2
                ANL     A,#0F     ;RESULT IN ACC
                RET

STORAGE FOR CONSTANTS

```
 1
 2
 3
 4              0300
 5
 6
 7
 8
 9
10
11
12
13
14
15
16
17
18  0300   00
19  0301   40
20  0302   27
21  0303   80
22  0304   80
23  0305   80
24  0306   80
25  0307   80
26  0308   80
27  0309   80
28  030A   80
29  030B   80
30  030C   80
31  030D   41
32  030E   01
33  030F   42
34  0310   43
35  0311   44
36  0312   45
37  0313   20
38  0314   21
39  0315   22
40  0316   23
41  0317   24
42  0318   25
43  0319   46
```

.SBTTL STORAGE FOR CONSTANTS
;*
                .IF  LT  .-0300
                . = 0300
                .IFF
AAAPAG = 1
                .ENDC
;*
; TABLE OF ATTRIBUTE POINTERS --
; UPON RECEIPT OF A "LOAD
; ATTRIBUTE # " (CMD=50)
; THE CONTENTS OF (ATPNTR)
; WILL BE MODIFIED TO PREPARE
; FOR THE RECEIPT OF EITHER
;       1- REPORT DEVICE ATTRIB.
;       2- LOAD       "      "
;*
PNTBL:  .BYTE   0         ;#00
        .BYTE   40        ;#01
        .BYTE   27        ;#02
        .BYTE   80        ;ILLEGAL
        .BYTE   80        ;  "
        .BYTE   80        ;  "
        .BYTE   80        ;  "
        .BYTE   80        ;  "
        .BYTE   80        ;  "
        .BYTE   80        ;  "
        .BYTE   80        ;  "
        .BYTE   80        ;  "
        .BYTE   80        ;  "
        .BYTE   41        ;#0D
        .BYTE   1         ;#0E
        .BYTE   42        ;#0F
        .BYTE   43        ;#10
        .BYTE   44        ;#11
        .BYTE   45        ;#12
        .BYTE   20        ;#13
        .BYTE   21        ;#14
        .BYTE   22        ;#15
        .BYTE   23        ;#16
        .BYTE   24        ;#17
        .BYTE   25        ;#18
        .BYTE   46        ;#19

```
 44    031A      80                                  .BYTE   80        ;ILLEGAL
 45    031B      80                                  .BYTE   80        ; "
 46    031C      80                                  .BYTE   80        ; "
 47    031D      80                                  .BYTE   80        ; "
 48    031E      80                                  .BYTE   80        ; "
 49    031F      80                                  .BYTE   80        ; "
 50    0320      47                                  .BYTE   47        ;#20
 51    0321      48                                  .BYTE   48        ;#21
 52    0322      26                                  .BYTE   26        ;#22
 53    0323      80                                  .BYTE   80        ;#23
  1                                         ;*
  2                                         ; TABLE OF FIXED ATTRIBUTES
  3                                         ;*
  4    0324      84                         FIXATT:  .BYTE   84        ;MODEL-ID-HI(01)
  5    0325      01                                  .BYTE   1         ;DEVICE TYPE(0D)
  6    0326      01                                  .BYTE   1         ;TABLE ID  (0F)
  7    0327      00                                  .BYTE   0         ;BYT/TRK-HI (10)
  8    0328      46                                  .BYTE   46        ;   "   MED(11)
  9    0329      00                                  .BYTE   0         ;   "    LO (12)
 10    032A      01                                  .BYTE   1         ;SECT METHOD(19)
 11    032B      01                                  .BYTE   1         ;# CYLS - HI(20)
 12    032C      18                                  .BYTE   18        ;# CYLS - LO(21)
 13                                         ;*
 14                                         ; INITIAL SECTOR CONSTANTS
 15                                         ;*
 16    032D      00    02    54             SECTBL:  .BYTE   0,2,54    ;BYTES/SECTOR
 17    0330      00    00    1D                      .BYTE   0,0,1D    ;SECTORS/TRK
  1                                         ;*
  2                                         ; STEPPER MOTOR DELAY TABLES
  3                                         ;*
  4                                         ; TABLE OF STEPPER MOTOR NIBBLES --
  5                                         ; "0" & "FF" USED AS TABLE LIMITS
  6                                         ; NOTE: TOP 8 BYTES USED IN TEMPERATURE
  7                                         ;       OFFSET ROUTINE
  8                                         ;*
  9    0333      00                                  .BYTE   0
 10    0334      08    0E    05             TBLBOT:  .BYTE   8,0E,5,0D
       0337      0D
 11    0338      09    0F    04                      .BYTE   9,0F,4
 12    033B      0C                         TBLTOP:  .BYTE   0C
 13    033C      FF                                  .BYTE   0FF
 14                                         ;*
 15                                         ; LOCATIONS OF TEMP COMP CONSTANTS
 16                                         ;  RELATIVE TO NIBTBL ADDR
 17                                         ; THESE NUMBERS MUST BE POSITIONED
 18                                         ; 9 BYTES AFTER THE CORRESPONDING
 19                                         ; ENTRY IN THE STEPPER MOTOR
 20                                         ;  NIBBLE TABLE
 21                                         ;*
 22    033D      00    06    0C             NIBLOC:  .BYTE   0,^D6,^D12,^D18
       0340      12
 23    0341      18    1E    24                      .BYTE   ^D24,^D30,^D36,^D42
       0344      2A
 24
 25                                         ;*
 26                                         ; STEPPER MOTOR RAMP TABLES & CONTANTS
 27    0345      42    38    30             ACCTBL:  .BYTE   042,038,030,029,025
       0348      29    25
 28    034A      20    1E    1B                      .BYTE   020,01E,01B,019,017
       034D      19    17
 29    034F      16    14    13                      .BYTE   016,014,013,012,011
       0352      12    11
 30    0354      10    0F    0F                      .BYTE   010,0F,0F,0F,0
       0357      0F    00
 31    0359      65                         DECSPS:  .BYTE   ^D101  ;# OF DECEL STEPS
 32    035A      A6    84    6E             DCTBL:   .BYTE   0A6,084,06E,05F,052
       035D      5F    52
 33    035F      4A    42    3C                      .BYTE   04A,042,03C,037,032
       0362      37    32
 34    0364      2F    2C    2C                      .BYTE   02F,02C,02C,02A,029
       0367      2A    29
 35    0369      28    27    26                      .BYTE   028,027,026,025,024
       036C      25    24
```

```
36   036E    23      22    20         .BYTE   023,022,020,020,01F
     0371    20      1F
37   0373    1E      1E    1D         .BYTE   01E,01E,01D,01D,01C
     0376    1D      1C
38   0378    1B      1B    1A         .BYTE   01B,01B,01A,01A,01A
     037B    1A      1A
39   037D    1A      19    19         .BYTE   01A,019,019,019,019
     0380    19      19
40   0382    18      18    18         .BYTE   018,018,018,017,017
     0385    17      17
41   0387    16      16    16         .BYTE   016,016,016,016,016
     038A    16      16
42   038C    16      15    15         .BYTE   016,015,015,015,014
     038F    15      14
43   0391    14      14    14         .BYTE   014,014,014,014,014
     0394    14      14
44   0396    14      13    13         .BYTE   014,013,013,013,013
     0399    13      13
45   039B    13      13    13         .BYTE   013,013,013,013,012
     039E    13      12
46   03A0    12      12    12         .BYTE   012,012,012,012,011
     03A3    12      11
47   03A5    11      11    11         .BYTE   011,011,011,011,011
     03A8    11      11
48   03AA    11      11    11         .BYTE   011,011,011,010,010
     03AD    10      10
49   03AF    10      10    10         .BYTE   010,010,010,010,0F
     03B2    10      0F
50   03B4    0F      0F    0F         .BYTE   0F,0F,0F,0F,0F
     03B7    0F      0F
51   03B9    0F      0F    0F         .BYTE   0F,0F,0F,0F,0F
     03BC    0F      0F
52   03BE    0F      00               .BYTE   0F,0
 1                                ;*
 2                                ; TABLE CONTAINS STEPPER MOTOR OFFSET
 3                                ; NIBBLE WHICH IS TRANSMITTED TO DM --
 4                                ; NOTE: "D" IS DEFINED AS OFFSET UNIT
 5                                ; APPROX. EQUAL TO 250 MICRO-INCHES --
 6                                ; "IN" DIRECTION IS TOWARD ID OF DISC
 7                                ;*
 8                                ; MOTOR DRIVE NIBBLE = 8 (CYL=XX0)
 9                                ;*
10   03C0    08               NIBTBL: .BYTE  8       ; 1.5D  -- IN
11   03C1    09                       .BYTE  9       ; 0.5D  -- IN
12   03C2    0A                       .BYTE  0A      ; 0.5D  -- OUT
13   03C3    0B                       .BYTE  0B      ; 1.5D  -- OUT
14                                    .IF GT VARDLY
15                                    .BYTE  ^D23    ; FOR DIR DLY
16                                    .BYTE  ^D23    ; REV DIR DLY
17                                    .IFF
18   03C4    10                       .BYTE  ^D16    ;CONSTANT DLY
19   03C5    10                       .BYTE  ^D16
20                                    .IFTF
21                                ;*
22                                ; MOTOR DRIVE NIBBLE = E (CYL=XX1)
23                                ;*
24   03C6    00                       .BYTE  0       ; SAME
25   03C7    08                       .BYTE  8
26   03C8    0D                       .BYTE  0D
27   03C9    0F                       .BYTE  0F
28                                    .IFT
29                                    .BYTE  ^D15    ;VARIABLE DLY
30                                    .BYTE  ^D15
31                                    .IFF
32   03CA    10                       .BYTE  ^D16    ;CONSTANT DLY
33   03CB    10                       .BYTE  ^D16
34                                    .IFTF
35                                ;*
36                                ; MOTOR DRIVE NIBBLE = 5 (CYL=XX2)
37                                ;*
38   03CC    01                       .BYTE  1       ; SAME
39   03CD    05                       .BYTE  5
```

```
40    03CE    09              .BYTE   9
41    03CF    0D              .BYTE   0D
42                            .IFT
43                            .BYTE   ^D10
44                            .BYTE   ^D10
45                            .IFF
46    03D0    10              .BYTE   ^D16
47    03D1    10              .BYTE   ^D16
48                            .IFTF
49
50                     ;*
51                     ; MOTOR DRIVE NIBBLE = D (CYL=XX3)
52    03D2    03       ;*
53    03D3    0B              .BYTE   3       ; SAME
54    03D4    0E              .BYTE   0B
55    03D5    0C              .BYTE   0E
56                            .BYTE   0C
57                            .IFT
58                            .BYTE   ^D15
59                            .BYTE   ^D15
60    03D6    10              .IFF
61    03D7    10              .BYTE   ^D16
62                            .BYTE   ^D16
63                            .IFTF
64
65                     ;*
66    03D8    0B       ; MOTOR DRIVE NIBBLE = 9 (CYL=XX4)
67    03D9    0A       ;*
68    03DA    09              .BYTE   0B      ; SAME
69    03DB    08              .BYTE   0A
70                            .BYTE   9
71                            .BYTE   8
72                            .IFT
73                            .BYTE   ^D23
74    03DC    10              .BYTE   ^D23
75    03DD    10              .IFF
76                            .BYTE   ^D16
77                            .BYTE   ^D16
78                            .IFTF
79                     ;*
80    03DE    0F       ; MOTOR DRIVE NIBBLE = F (CYL=XX5)
81    03DF    0D       ;*
82    03E0    08              .BYTE   0F      ; SAME
83    03E1    00              .BYTE   0D
84                            .BYTE   8
85                            .BYTE   0
86                            .IFT
87                            .BYTE   ^D15
88    03E2    10              .BYTE   ^D17
89    03E3    10              .IFF
90                            .BYTE   ^D16
91                            .BYTE   ^D16
92                            .IFTF
93                     ;*
94    03E4    0D       ; MOTOR DRIVE NIBBLE = 4 (CYL=XX6)
95    03E5    09       ;*
96    03E6    05              .BYTE   0D      ; SAME
97    03E7    01              .BYTE   9
98                            .BYTE   5
99                            .BYTE   1
100                           .IFT
101                           .BYTE   ^D10
102   03E8    10              .BYTE   ^D10
103   03E9    10              .IFF
104                           .BYTE   ^D16
105                           .BYTE   ^D16
106                           .IFTF
107                    ;*
108   03EA    0C       ; MOTOR DRIVE NIBBLE = C (CYL=XX7)
109   03EB    0E       ;*
110   03EC    0B              .BYTE   0C      ; SAME
111   03ED    03              .BYTE   0E
                               .BYTE   0B
                               .BYTE   3
```

```
112
113
114
115
116    03EE      10
117    03EF      10
118
  1
  2
  3
  4
  5
  6
  7
  8
  9
 10
 11
 12    03F0      00
 13
 14
 15
 16    03F1      01
 17
 18
 19
 20    03F2      02
 21
 22
 23
 24    03F3      03
 25
```

BERRON, TIME, WRTCUR

```
  1
  2
  3              0400
  4
  5
  6
  7
  8
  9
 10
 11
 12
 13    0400      B8      33
 14    0402      40
 15    0403      A0
 16    0404      94      35
 17    0406      83
 18
 19
 20
 21
 22
 23    0407      65
 24    0408      16      0C
 25    040A      04      10
 26
 27    040C      B8      27
 28    040E      F0
 29    040F      03      01
 30    0411      A0
 31    0412      E6      18
 32    0414      B8      28
 33    0416      B0      01
 34    0418      55
 35    0419      83
 36
 37
 38
```

```
              .IFT
              .BYTE    ^015
              .BYTE    ^017
              .IFF
              .BYTE    ^016
              .BYTE    ^016
              .ENDC
;*
; TABLE CONTAINS OFFSET CODE ---
; REQUIRED FOR CURRENT CYL ZONE & TEMP
;*
;  0 = 1.50 - IN
;  1 = 0.50 - IN
;  2 = 0.50 - OUT
;  3 = 1.50 - OUT
;*
; 75F>TEMP
;*
OFFTBL:  .BYTE    0
;*
; 100F>TEMP>75F
;*
         .BYTE    1
;*
; 125F>TEMP>100F
;*
         .BYTE    2
;*
; TEMP>125F
;*
         .BYTE    3
;*

.SBTTL BERRON, TIME, WRTCUR
         .IF  LT  .-0400
         . = 0400
         .IFF
AAAPAG   = 1
         .ENDC
;*
;*
; ROUTINE TO ASSERT GENERAL STATUS ERROR
; & ATTENTION - ON
; ("A" REG MUST CONTAIN ERROR BIT)
;*
BERRON:  MOV      R0,#GENSTS
         ORL      A,@R0
         MOV      @R0,A
         CALL     SATTN
         RET
;*
; CHECKS TIMER FLAG & ACCUMULATES
; 20 MILLISEC PERIODS IN (TIMER) ---
; SETS (THRFLG) IF (TIMER) OVERFLOWS
;*
TIME:    STOP     TCNT
         JTF      STEP       ;EVERY 20 MS
         JMP      TIMEND
;*
STEP:    MOV      R0,#TIMER
         MOV      A,@R0
         ADD      A,#1
         MOV      @R0,A
         JNC      TIMEND
         MOV      R0,#TMRFLG  ;EVERY 5 SEC
         MOV      @R0,#1
TIMEND:  STRT     T
         RET
;*
; SET WRITE CURRENT LEVEL AS FUNCTION
; OF PRESENT CYL ADR -- HIGHEST LEVEL OF
```

```
                                        ; WRITE CURRENT WHEN DAC INPUT = "0"
                                        ; LOWEST WHEN "F" -- OUTSIDE CYLS REQ.
                                        ; HIGHER CURRENT
                                        ;*
43   041A    B8    2E          WRTCUR:  MOV     R0,#TCKNUM
44   041C    F0                         MOV     A,@R0
45   041D    96    28                   JNZ     LOCURR       ;CYL>255 DEC
46   041F    18                         INC     R0
47   0420    F0                         MOV     A,@R0
48   0421    47                         SWAP    A
49   0422    53    0F                   ANL     A,#0F        ;DAC DATA
50   0424    43    40                   ORL     A,#40        ;FUNCTION = 4
51   0426    84    2A                   JMP     OUTCUR
52   0428    23    4F          LOCURR:  MOV     A,#4F
53   042A    94    6F          OUTCUR:  CALL    D4DATA
54   042C    83                         RET
```

SET/CLEAR BUSY/ATTN

```
                                        .SBTTL SET/CLEAR BUSY/ATTN
                                        ;*
                                        ; SET BUSY
                                        ;*
 5   042D    B8    43          SBUSY:   MOV     R0,#IMPRT2
 6   042F    F0                         MOV     A,@R0
 7   0430    53    FE                   ANL     A,#0FE
 8   0432    A0                SBUSY1:  MOV     @R0,A
 9   0433    3A                         OUTL    P2,A
10   0434    83                         RET
                                        ;*
                                        ; SET ATTENTION
                                        ;*
14   0435    B8    43          SATTN:   MOV     R0,#IMPRT2
15   0437    F0                         MOV     A,@R0
16   0438    43    04                   ORL     A,#4
17   043A    84    32                   JMP     SBUSY1
                                        ;*
                                        ; CLEAR BUSY
                                        ;*
21   043C    B8    43          CBUSY:   MOV     R0,#IMPRT2
22   043E    F0                         MOV     A,@R0
23   043F    43    01                   ORL     A,#1
24   0441    84    32                   JMP     SBUSY1
                                        ;*
                                        ; CLEAR ATTENTION
                                        ;*
28   0443    B8    43          CATTN:   MOV     R0,#IMPRT2
29   0445    F0                         MOV     A,@R0
30   0446    53    FB                   ANL     A,#0FB
31   0448    84    32                   JMP     SBUSY1
```

DIRTST, DIRT, DSUB

```
                                        .SBTTL DIRTST, DIRT, DSUB
                                        ;*
                                        ;  DETERMINE DIRECTION OF MOVE OR IF
                                        ;  EQUAL TRACK ADDRESSES -- ALSO
                                        ;  USED AS GENERAL TWO BYTE COMPARE
                                        ;*
 7   044A    B8    2C          DIRTST:  MOV     R0,#TCKDEM
                                        ;*
                                        ; ENTRY POINT FOR COMPARISON OF
                                        ; R/W PERM ADDRESSES TO TCKNUM
                                        ;*
12   044C    BA    02          DIRT:    MOV     R2,#2        ;LOOP COUNT
13   044E    B9    2E                   MOV     R1,#TCKNUM   ;TEST DIR
14   0450    F0                DIR1:    MOV     A,@R0        ;OF MOVE WITH MSB
15   0451    37                         CPL     A
16   0452    61                         ADD     A,@R1        ;IS LARGER ?
17   0453    F6    5F                   JC      REV1         ;GO REV. IF CARRY
18   0455    F0                         MOV     A,@R0
19   0456    D1                         XRL     A,@R1        ;IS MS BYTE =?
20   0457    96    62                   JNZ     FOR1         ;GO FWD IF <
```

```
21   0459     19                      INC    R1         ;GO TO  LS BYTE
22   045A     18                      INC    R0         ;IF SMALLER.
23   045B     EA    50                DJNZ   R2,DIR1
24   045D     27                      CLR    A          ;A = 0  IF EQUAL
25   045E     83                      RET
26   045F     23    01         REV1:  MOV    A,#1       ;A=1 IF REV OR
27                                                      ;(R/W PERM) < (TCKNUM)
28   0461     83                      RET
29   0462     23    02         FOR1:  MOV    A,#2       ;A=2 IF FOR OR
30                                                      ;(R/W PERM) > (TCKNUM)
31   0464     83                      RET
32
33                              ;*
34                              ; DOUBLE PRECISION SUBTRACT ROUTINE
35                              ;*
36                              ; MS.    LS
37                              ; --     --
38                              ; R2     A
39                              ; X      X  <--R0
40                              ; --------
41                              ; R2     A (ANSWER)
42   0465     37                ;*
43   0466     60         DSUB:  CPL    A          ;SUBTRACT
44   0467     37                ADD    A,@R0      ;LS. BYTE.
45   0468     C8                CPL    A
46   0469     2A                DEC    R0
47   046A     37                XCH    A,R2
48   046B     70                CPL    A
49   046C     37                ADDC   A,@R0      ;SUBTRACT
50   046D     2A                CPL    A          ;MS. BYTE
51   046E     83                XCH    A,R2       ;WITH CARRY
                                RET
```

DMDATA, DELAY, STPDEL

```
 1                                     .SBTTL DMDATA, DELAY, STPDEL
 2                              ;*
 3                              ; OUTPUT DM DATA/FUNCTION/FUNCTION
 4                              ; STROBE ACCORDING TO FOLLOWING:
 5                              ;       BITS 0-3       DMDATA
 6                              ;       BITS 4-6       FUNCTION
 7                              ;       BIT 7=0
 8                              ;*
 9   046F     B8    02          DMDATA: MOV    R0,#2      ;WRITE PORT 2
10   0471     90                        MOVX   @R0,A      ;DATA/FUNC OUT
11   0472     43    80                  ORL    A,#80
12   0474     90                        MOVX   @R0,A      ;STROBE ON
13   0475     53    7F                  ANL    A,#7F
14   0477     90                        MOVX   @R0,A      ;STROBE OFF
15   0478     83                        RET
16                              ;*
17                              ; GENERALIZED DELAY (1 M-SEC TO 65 SECS)
18                              ; SUB-ROUTINE EXPECTS 2 BYTE QUANTITY IN
19                              ; LOCATION "DELMLT" TO BE EQUAL TO THE
20                              ; # OF REQUIRED 1 MILLISECOND INTERVALS
21                              ;*
22   0479     B8    20          DELAY: MOV    R0,#DELMLT
23   047B     F0                       MOV    A,@R0
24   047C     AC                       MOV    R4,A       ;MS BYTE TO R4
25   047D     18                       INC    R0
26   047E     F0                       MOV    A,@R0
27   047F     AB                       MOV    R3,A       ;LS BYTE TO R3
28   0480     BF    C8          DELUP: MOV    R7,#^D200
29   0482     EF    82                 DJNZ   R7,DELUP+2
30   0484     EB    80                 DJNZ   R3,DELUP
31   0486     FC                       MOV    A,R4
32   0487     C6    8C                 JZ     ENDLY
33   0489     CC                       DEC    R4
34   048A     84    80                 JMP    DELUP
35                              ;*
36   048C     83          ENDLY: RET
37                              ;*
38                              ; STEPPER MOTOR DELAY ROUTINE
```

```
39
40
41
42   048D    B8    22
43
44
45
46   048F    23    0F
47   0491    37
48   0492    17
49   0493    A9
50   0494    F0
51   0495    69
52   0496    C6    9F
53   0498    A8
54   0499    B9    01
55   049B    E9    9B
56   049D    E8    99
57   049F    83
```

```
;  -- EXPECTS # OF REQUIRED 15 MICROSEC
;  INTERVALS TO BE IN LOCATION (MTRDEL)
;*
STPDEL: MOV     R0,#MTRDEL
;*
;  SUBTRACT SOFTWARE OVERHEAD
;*
        MOV     A,#0F       ;215 MICROSECS.
        CPL     A
        INC     A           ;2'S CPL
        MOV     R1,A
        MOV     A,@R0
        ADD     A,R1        ;ADJUSTED DELAY
        JZ      ENDSTP
        MOV     R0,A
STPLUP: MOV     R1,#1       ;6 CYCLE LOOP
        DJNZ    R1,STPLUP+2
        DJNZ    R0,STPLUP
ENDSTP: RET
```

READY, ATTNQ

```
 1
 2
 3
 4
 5
 6
 7
 8
 9
10
11
12
13   04A0    B8    33
14   04A2    B9    42
15   04A4    F0
16   04A5    53    01
17   04A7    AA
18   04A8    D1
19   04A9    C6    B9
20   04AB    B9    35
21   04AD    F1
22   04AE    43    02
23   04B0    A1
24   04B1    F0
25   04B2    43    20
26   04B4    A0
27   04B5    FA
28   04B6    B9    42
29   04B8    A1
30   04B9    83
31
32
33
34   04BA    B8    6D
35   04BC    B0    00
36
37   04BE    B9    35
38   04C0    F1
39   04C1    53    02
40   04C3    C6    CB
41   04C5    94    35
42
43
44
45   04C7    B8    6D
46   04C9    B0    01
47   04CB    83
```

```
        .SBTTL  READY, ATTNQ
;*
; ROUTINE TO SERVICE CURRENT UP-DATE TO
; "NOT READY" BIT IN GENERAL STATUS
; PERFORMS THE FOLLOWING:
;           1- SETS "READY TRANSITION" IN
;              SENSE BYTE 2 IF REQ'D
;           2- UP-DATES (GENSTS)
; NOTE: ROUTINE ASSUMES "NOT READY" BIT
;       IN (GENSTS) HAS ALREADY BEEN
;       UP-DATED
;*
READY:  MOV     R0,#GENSTS
        MOV     R1,#RDYHST
        MOV     A,@R0
        ANL     A,#1        ;STRIP "NOT-RDY"
        MOV     R2,A        ;SAVE CUR STATE
        XRL     A,@R1       ;TRANS?
        JZ      ENDR
        MOV     R1,#SNS2
        MOV     A,@R1
        ORL     A,#2        ;RDY TRANS
        MOV     @R1,A
        MOV     A,@R0
        ORL     A,#20
        MOV     @R0,A
        MOV     A,R2
        MOV     R1,#RDYHST
        MOV     @R1,A       ;NEW (RDYHST)
ENDR:   RET
;*
; DID WE SET ATTN AFTER "CALL READY"
;*
ATTNQ:  MOV     R0,#ATTFLG
        MOV     @R0,#0      ;RESET FLAG
;*
        MOV     R1,#SNS2
        MOV     A,@R1
        ANL     A,#2        ;READY TRANS ?
        JZ      NEG
        CALL    SATTN
;*
; SET ATTENTION FLAG
;*
        MOV     R0,#ATTFLG
        MOV     @R0,#1
NEG:    RET
```

INITIALIZE COUNTERS

```
                                    .SBTTL  INITIALIZE COUNTERS
                            ;*
                            ; INITIALIZE TRACK FORMAT CONSTANTS
                            ; TO DEFAULT VALUES
                            ;*
  04CC   B8   51    FORMAT: MOV     R0,#TRACK
  04CE   B9   47            MOV     R1,#NOLOAD
  04D0   BA   2D            MOV     R2,#SECTBL&0FF
  04D2   BB   06            MOV     R3,#6
  04D4   FA        FORM1:   MOV     A,R2
  04D5   E3                 MOVP3   A,@A
  04D6   A0                 MOV     @R0,A
  04D7   A1                 MOV     @R1,A
  04D8   18                 INC     R0
  04D9   19                 INC     R1
  04DA   1A                 INC     R2
  04DB   EB   D4            DJNZ    R3,FORM1
                            ;*
                            ; CONVERT BYTES/SECTOR TO
                            ; MICROSECS/SECTOR
                            ;*
  04DD   F5                 SEL     MB1
                            .IF GT NEWALG
  04DE   94   A9            CALL    ALGOR1
                            .IFF
                            CALL    ALGOR
                            .ENDC
  04E0   E5                 SEL     MB0
                            ;*
                            ; INITIALIZE SECTOR PULSE COUNTERS(8253)
                            ; 19.2 MILLI-SECS BETWEEN INDEX PULSES.
                            ; ENSURE TIME INTERVAL BETWEEN SECTORS &
                            ; # OF SECTORS IS LESS THAN 19.1 M-SECS
                            ; (ALLOWING FOR SPINDLE SPEED TOLERANCE)
                            ; COUNTER # 0 IS SECTOR SPACING
                            ; COUNTER # 1 IS # OF SECTORS
                            ; COUNTER # 2 IS SPINDLE OVER SPEED
                            ;*
                            ; CONFIGURE 8253 COUNTERS & LOAD TIMER
                            ;*
  04E1   B8   07    INCNTR: MOV     R0,#7     ;WRITE MODE 2 TO
  04E3   23   34            MOV     A,#34
  04E5   90                 MOVX    @R0,A     ;COUNTER # 0.
  04E6   23   74            MOV     A,#74
  04E8   90                 MOVX    @R0,A     ;MODE 2 TO CTR#1
  04E9   23   B2            MOV     A,#0B2
  04EB   90                 MOVX    @R0,A     ;MODE 1 TO CTR#2
                            ;*
  04EC   B8   05            MOV     R0,#5     ;COUNTER # 1.
  04EE   B9   56            MOV     R1,#TRACK+5
  04F0   F1                 MOV     A,@R1
                            ;*
                            ; SUB ONE FROM CONCATENATED # IN
                            ; (TRACK+4)-(TRACK+5)
                            ; --- # OF SECTORS PER TRACK ---
                            ;*
  04F1   03   FF            ADD     A,#0FF    ;MINUS 1
  04F3   90                 MOVX    @R0,A
  04F4   C9                 DEC     R1
  04F5   F6   FC            JC      NOBOR
  04F7   F1                 MOV     A,@R1
  04F8   03   FF            ADD     A,#0FF    ;MINUS 1
  04FA   84   FD            JMP     NOBOR+1
  04FC   F1        NOBOR:   MOV     A,@R1
  04FD   90                 MOVX    @R0,A
                            ;*
  04FE   B8   06            MOV     R0,#6     ;COUNTER # 2.
  0500   23   70            MOV     A,#70
  0502   90                 MOVX    @R0,A     ;LS BYTE
  0503   23   94            MOV     A,#94
```

| | | | | | | |
|---|---|---|---|---|---|---|
| 71 | 0505 | 90 | | MOVX | @R0,A | ;MS BYTE |
| 72 | | | ;* | | | |
| 73 | 0506 | B8 | 04 | MOV | R0,#4 | ;COUNTER # 0. |
| 74 | 0508 | B9 | 64 | MOV | R1,#DIVTBL+1 | |
| 75 | 050A | F1 | | MOV | A,@R1 | |
| 76 | 050B | 90 | | MOVX | @R0,A | ;LSB |
| 77 | 050C | C9 | | DEC | R1 | |
| 78 | 050D | F1 | | MOV | A,@R1 | |
| 79 | 050E | 90 | | MOVX | @R0,A | ;MSB |
| 80 | 050F | 83 | | RET | | |

CHECK SPEED

```
  1                             .SBTTL CHECK SPEED
  2                        ;*
  3                        ; UP TO SPEED SENSE --- "SPDFLT" LINE IS
  4                        ; SENSED EVERY 100 MICROSEC FOR 5 SECS -
  5                        ; 50,000 SUCCESSFUL SAMPLES ALLOWS EXIT.
  6                        ; ANY SINGLE FAILURE PRODUCES "FLTRST"
  7                        ; PULSE & RESTART
  8                        ;*
  9                        ; IF NOT WITHIN TOLERANCE AFTER APPROX.
 10                        ; 45 SECONDS, SET SPABRT FLAG
 11                        ;*
 12                        ; R2 = LS      BYTE OF COUNT
 13                        ; R3 = MS          '  "   "
 14                        ;*
 15  0510  65          CHKSPN: STOP    TCNT    ;INIT TIMER
 16  0511  27                  CLR     A
 17  0512  62                  MOV     T,A
 18  0513  55                  STRT    T
 19                        ;*
 20  0514  B8   71              MOV     R0,#SPABRT
 21  0516  A0                   MOV     @R0,A   ;INIT LOC'S
 22  0517  B8   29              MOV     R0,#DEAD
 23  0519  A0                   MOV     @R0,A
 24
 25  051A  BA   4F         SRTOVR: MOV     R2,#^D79
 26  051C  BB   C4                 MOV     R3,#^D196 ;50,000
 27
 28                        ;*
 29                        ; TEST "SPDFLT"
                           ;*
 30  051E  B8   01         TSTAGN: MOV     R0,#1
 31  0520  80                     MOVX    A,@R0
 32  0521  72   25                J33     ALIVE   ;NO GOOD
 33  0523  A4   43                JMP     DECNT
 34
 35                        ;*
 36                        ; CHECK DEAD MAN COUNT
 37                        ; (SPINDLE MAL-FUNCTION)
                           ;*
 38  0525  94   07         ALIVE:  CALL    TIME
 39  0527  B8   28                 MOV     R0,#TMRFLG
 40  0529  F0                      MOV     A,@R0
 41  052A  C6   36                 JZ      FLTRST
 42
 43                        ;*
 44                        ; RESET FLAG & INC (DEAD)
                           ;*
 45  052C  B0   00                 MOV     @R0,#0
 46  052E  B8   29                 MOV     R0,#DEAD
 47  0530  10                      INC     @R0
 48  0531  F0                      MOV     A,@R0
 49
 50                        ;*
 51                        ; ALLOW APPROX. 45 SECS (9 CYCLES OF
 52                        ; 5 SEC EACH) FOR SPINDLE RUN-UP
                           ;*
 53  0532  D3   09                 XRL     A,#9
 54  0534  C6   54                 JZ      BADSPD  ;JMP IF TOO
 55                                                ;MUCH TIME
 56
 57                        ;*
 58                        ; ISSUE FAULT RESET IF DEAD-MAN TIMER
 59                        ; NOT TIMED OUT
                           ;*
```

| | | | | | | | |
|---|---|---|---|---|---|---|---|
| 60 | 0536 | B4 | 3A | | FLTRST: | CALL | CLRFLT |
| 61 | 0538 | A4 | 1A | | | JMP | SRTOVR |
| 62 | | | | ;* | | | |
| 63 | | | | ; PULSE THE FAULT RESET LINE | | | |
| 64 | | | | ;* | | | |
| 65 | 053A | B8 | 43 | | CLRFLT: | MOV | R0,#IMPRT2 |
| 66 | 053C | F0 | | | | MOV | A,@R0 |
| 67 | 053D | 43 | 40 | | | ORL | A,#040 |
| 68 | 053F | 3A | | | | OUTL | P2,A |
| 69 | 0540 | F0 | | | | MOV | A,@R0 |
| 70 | 0541 | 3A | | | | OUTL | P2,A |
| 71 | 0542 | 83 | | | | RET | |
| 72 | | | | ;* | | | |
| 73 | | | | ; DEC COUNT & WAIT 100 MICROSECS | | | |
| 74 | | | | ;* | | | |
| 75 | 0543 | FA | | | DECNT: | MOV | A,R2 |
| 76 | 0544 | 03 | FF | | | ADD | A,#0FF   ;DECREMENT |
| 77 | 0546 | AA | | | | MOV | R2,A |
| 78 | 0547 | F6 | 4D | | | JC | SMLDEL |
| 79 | 0549 | CB | | | | DEC | R3       ;NEGLECT DLY |
| 80 | 054A | FB | | | | MOV | A,R3     ;ONLY 1 OUT |
| 81 | 054B | C6 | 58 | | | JZ | GUDSPD   ;255 TIMES |
| 82 | 054D | BF | 09 | | SMLDEL: | MOV | R7,#9 |
| 83 | 054F | 00 | | | | NOP | |
| 84 | 0550 | EF | 4F | | | DJNZ | R7,SMLDEL+2 |
| 85 | 0552 | A4 | 1E | | | JMP | TSTAGN |
| 86 | | | | ;* | | | |
| 87 | | | | ;IF NOT UTS WITHIN ALLOWED TIME, | | | |
| 88 | | | | ;   RETURN WITH SPABRT FLAG SET | | | |
| 89 | | | | ;* | | | |
| 90 | 0554 | B8 | 71 | | BADSPD: | MOV | R0,#SPABRT |
| 91 | 0556 | B0 | 01 | | | MOV | @R0,#1 |
| 92 | 0558 | 65 | | | GUDSPD: | STOP | TCNT |
| 93 | 0559 | 83 | | | | RET | |

INITIAL STATE

| | | | | | | | |
|---|---|---|---|---|---|---|---|
| 1 | | | | | | | |
| 2 | | | | | | .SBTTL | INITIAL STATE |
| 3 | | | | ;************************************* | | | |
| 4 | | | | ;* | | | |
| 5 | | | | ;   PROGRAM STARTING POINT | | | |
| 6 | | | | ;* | | | |
| 7 | | | | ;************************************* | | | |
| 8 | 055A | 23 | C0 | | START1: | MOV | A,#0C0  ;RESET, BUSY, |
| 9 | 055C | 3A | | | | OUTL | P2,A    ;ATTN EN, RDEN ON |
| 10 | | | | ;* | | | |
| 11 | 055D | 35 | | | | DIS | TCNTI |
| 12 | | | | ;* | | | |
| 13 | 055E | 23 | 22 | | START2: | MOV | A,#022  ;RESETS OFF, |
| 14 | 0560 | 3A | | | | OUTL | P2,A    ;BUSY,OTHERS ON |
| 15 | | | | ;* | | | |
| 16 | 0561 | 23 | FF | | | MOV | A,#0FF  ;ALLOW PORT 1 TO |
| 17 | 0563 | 39 | | | | OUTL | P1,A    ;READ + SPINDLE ON |
| 18 | | | | ;* | | | |
| 19 | 0564 | 27 | | | | CLR | A |
| 20 | 0565 | A8 | | | | MOV | R0,A    ;R0 = 0 |
| 21 | 0566 | 37 | | | | CPL | A       ;A = FF |
| 22 | 0567 | 90 | | | | MOVX | @R0,A   ;FF TO CONTROLLER |
| 23 | | | | ;* | | | |
| 24 | 0568 | 75 | | | | ENT0 | CLK     ;ENABLE CLK OUT |
| 25 | 0569 | 94 | CC | | | CALL | FORMAT  ;START SECTOR CN |
| 26 | | | | ;* | | | |
| 27 | 056B | 05 | | | | EN | I       ;ENABLE INTERRUP |
| 28 | | | | ;* | | | |
| 29 | 056C | 27 | | | | CLR | A |
| 30 | 056D | D7 | | | | MOV | PSW,A   ;INIT PSW |
| 31 | | | | ;* | | | |
| 32 | | | | ; CLEAR SCRATCH - PAD | | | |
| 33 | | | | ;* | | | |
| 34 | 056E | B8 | 5F | | | MOV | R0,#05F |
| 35 | 0570 | B9 | 20 | | | MOV | R1,#RAM ;CLEAR ALL OF |
| 36 | 0572 | A1 | | | RAM1: | MOV | @R1,A   ; SCRATCH RAM |

| | | | | | | |
|---|---|---|---|---|---|---|
|37|0573|19| | |INC|R1|
|38|0574|E8|72| |DJNZ|R0,RAM1|
|39| | | |;*| | |
|40|0576|B8|26| |MOV|R0,#MOTOR    ;INIT 1ST|
|41|0578|B0|34| |MOV|@R0,#TBLBOT&0FF ;VALUE.|
|42| | | |;*| | |
|43| | | |; SET WRITE DISABLED FLAG| | |
|44| | | |;*| | |
|45|057A|B8|65| |MOV|R0,#WRTFLG|
|46|057C|B0|01| |MOV|@R0,#1|
|47| | | |;*| | |
|48|057E|B8|43| |MOV|R0,#IMPRT2|
|49|0580|B0|22| |MOV|@R0,#022 ;BUSY,ETC ON|
|50| | | |;*| | |
|51| | | |; INITIALIZE ATTRIBUTES LOCATED IN RAM| | |
|52| | | |;*| | |
|53|0582|B8|45| |MOV|R0,#VARATT|
|54|0584|B0|00| |MOV|@R0,#0  ;USER DEFINED|
|55|0586|18| | |INC|R0|
|56|0587|B0|40| |MOV|@R0,#40 ;TBL MOD|
|57| | | |;*| | |
|58| | | |; DETERMINE # OF DISC SURFACES| | |
|59| | | |;*| | |
|60|0589|B8|4D| |MOV|R0,#NOLOAD+6|
|61|058B|09| | |IN|A,P1|
|62|058C|52|95| |J32|FOUR|
|63|058E|B0|02| |MOV|@R0,#2 ;2 HEADS|
|64|0590|18| | |INC|R0|
|65|0591|B0|31| |MOV|@R0,#31 ;1 DISC|
|66|0593|A4|9A| |JMP|START3|
|67|0595|B0|04|FOUR:|MOV|@R0,#4 ;4 HEADS|
|68|0597|18| | |INC|R0|
|69|0598|B0|32| |MOV|@R0,#32 ;2 DISCS|
|70| | | |;*| | |
|71| | | |; INITIALIZE SECTOR MANAGEMENT COUNTER| | |
|72| | | |;*| | |
|73|059A|94|CC|START3:|CALL|FORMAT|
|74| | | |;*| | |
|75| | | |; CHECK POWER FAULT BEFORE CONTINUING| | |
|76| | | |; INSURE THAT STEPPER CHOPPER STARTS BY| | |
|77| | | |; JERKING THE TEMP COMP LINES| | |
|78| | | |; IF POWER FLT REMAINS AFTER 25SEC,| | |
|79| | | |; REVERT TO NORMAL FLT HANDLING| | |
|80| | | |;*| | |
|81|059C|27| | |CLR|A|
|82|059D|62| | |MOV|T,A|
|83|059E|55| | |STRT|T|
|84|059F|BA|10| |MOV|R2,#10|
|85|05A1|BB|1F| |MOV|R3,#1F|
|86| | | |;*| | |
|87|05A3|FA| |PWRCHK:|MOV|A,R2  ;JERK LINES|
|88|05A4|2B| | |XCH|A,R3|
|89|05A5|AA| | |MOV|R2,A|
|90|05A6|94|6F| |CALL|DMDATA|
|91| | | |;*| | |
|92|05A8|B4|3A| |CALL|CLRFLT|
|93|05AA|B8|01| |MOV|R0,#1  ;CHECK PWR FLT|
|94|05AC|80| | |MOVX|A,@R0|
|95|05AD|F2|B1| |J37|PWR1  ;BAD PWR|
|96|05AF|A4|C4| |JMP|PWROK ;JMP IF PWR OK|
|97| | | |;*| | |
|98|05B1|94|07|PWR1:|CALL|TIME|
|99|05B3|B8|28| |MOV|R0,#TMRFLG|
|100|05B5|F0| | |MOV|A,@R0|
|101|05B6|C6|A3| |JZ|PWRCHK ;TRY UNTIL 5SEC|
|102| | | |;*| | |
|103| | | |; ALLOW 25SEC BEFORE CRYING WOLF| | |
|104| | | |;*| | |
|105|05B8|B0|00| |MOV|@R0,#0|
|106|05BA|B8|29| |MOV|R0,#DEAD|
|107|05BC|10| | |INC|@R0|
|108|05BD|F0| | |MOV|A,@R0|

| | | | | | | |
|---|---|---|---|---|---|---|
|109|05BE|D3|05| |XRL|A,#5 ;DO 5SEC X 5 TIMES|
|110|05C0|96|A3| |JNZ|PWRCHK|
|111|05C2|A4|D8| |JMP|NOINST ;IF TIMEOUT, BAD|

;*
; PERFORM UP-TO-SPEED CHECK
; IF BAD, FAULT STATUS WILL BE SET
; IN "LOOP"
;*

| | | | | | | |
|---|---|---|---|---|---|---|
|117|05C4|B4|10|PWROK:|CALL|CHKSPN|
|118|05C6|B8|71| |MOV|R0,#SPABRT|
|119|05C8|F0| | |MOV|A,@R0 ;IF A SPIN ERR,|
|120|05C9|96|D8| |JNZ|NOINST ;NO INIT STATE|

;*
; PERFORM REZERO
;*

| | | | | | | |
|---|---|---|---|---|---|---|
|124|05CB|B4|3A| |CALL|CLRFLT ;MAKE SURE A|
| | | | | | |; CLRFLT IS SENT|
|126|05CD|B8|69| |MOV|R0,#HOMREQ ;DO SLOW|
|127|05CF|B0|01| |MOV|@R0,#1 ;SEEK TO|
|128|05D1|54|20| |CALL|HOME ;TRACK 0|
|129|05D3|B8|72| |MOV|R0,#SKABRT|
|130|05D5|F0| | |MOV|A,@R0 ;IF NO SK ERR,|
|131|05D6|C6|E6| |JZ|OKINST ;OK TO INIT STATE|

;*
; FAULT WHILE DOING INITIAL STATE THINGS
; SET NOT-RDY, THEN HANDLE FAULT IN
; "LOOP" -- HOMREQ FLAG SET IN "DMFLT"
;*

| | | | | | | |
|---|---|---|---|---|---|---|
|137|05D8|B8|42|NOINST:|MOV|R0,#RDYHST ;DON'T SET|
|138|05DA|B0|01| |MOV|@R0,#1 ;READY TRANS|
|139|05DC|B8|33| |MOV|R0,#GENSTS|
|140|05DE|B0|01| |MOV|@R0,#1 ;NOT-RDY|
|141|05E0|94|3C|NOSPD:|CALL|CBUSY|
|142|05E2|94|35| |CALL|SATTN|
|143|05E4|C4|03| |JMP|ENDST|

;*
; INITIAL STATE CONDITION IS REACHED
;*

| | | | | | | |
|---|---|---|---|---|---|---|
|4|05E6|94|3C|OKINST:|CALL|CBUSY|
|5|05E8|94|35| |CALL|SATTN|

;*

| | | | | | | |
|---|---|---|---|---|---|---|
|7|05EA|B8|44| |MOV|R0,#IMREG1|
|8|05EC|F0| | |MOV|A,@R0 ;READY LED ON|
|9|05ED|43|01| |ORL|A,#1|
|10|05EF|A0| | |MOV|@R0,A|
|11|05F0|B9|01| |MOV|R1,#1|
|12|05F2|91| | |MOVX|@R1,A|

;*

| | | | | | | |
|---|---|---|---|---|---|---|
|14|05F3|B8|35| |MOV|R0,#SNS2 ;INITIAL STATE|
|15|05F5|B0|01| |MOV|@R0,#1|
|16|05F7|B8|34| |MOV|R0,#SNS1 ;NO FAULTS|
|17|05F9|B0|00| |MOV|@R0,#0|
|18|05FB|B8|33| |MOV|R0,#GENSTS ;SNS 2 &|
|19|05FD|B0|A0| |MOV|@R0,#0A0 ;NORM COMP ON|
|20|05FF|94|A0| |CALL|READY|
|21|0601|94|BA| |CALL|ATTNQ|

| | | | | | | |
|---|---|---|---|---|---|---|
|23|0603|27| |ENDST:|CLR|A|
|24|0604|62| | |MOV|T,A|
|25|0605|55| | |STRT|T|
|26|0606|C4|35| |JMP|DOTIME|

MAIN CONTROL LOOP

.SBTTL MAIN CONTROL LOOP
;*

| | | | | | | |
|---|---|---|---|---|---|---|
|3|0608|94|07|LOOP:|CALL|TIME|

;*
; FAULT PRESENT ?
;*

| | | | | | | |
|---|---|---|---|---|---|---|
|7|060A|B8|01| |MOV|R0,#1|
|8|060C|80| | |MOVX|A,@R0|

```
 9   060D    53   F8              ANL     A,#0F8
10   060F    C6   18              JZ      LOOP2       ;NO - JMP
11
12                         ;*
13                         ; WAS FAULT CLEARED BY CLR FLT CMD ?
14   0611    B8   32       ;*
15   0613    D0           FAULT:  MOV     R0,#FLTSTS
16   0614    C6   18              XRL     A,@R0
17                                 JZ      LOOP2
18   0616    14   05       ;*
19                                 CALL    DMFLT
20                         ;*
21                         ;*
22                         ; SKIP "DOTIME" IF SEQUENCE FLAG = 1
23                         ;  I.E. BETWEEN CMD & PAR
24   0618    B8   6C       ;*
25   061A    F0           LOOP2:  MOV     R0,#COMSEQ
26   061B    96   2A              MOV     A,@R0
27                                 JNZ     LOOP1
28   061D    B8   01       ;*
29   061F    80                   MOV     R0,#1
30   0620    B9   73              MOVX    A,@R0
31   0622    D1                   MOV     R1,#WPSHST
32   0623    12   3F              XRL     A,@R1
33                                 J30     WPSUP
34   0625    B8   28       ;*
35   0627    F0                   MOV     R0,#TMRFLG
36   0628    96   35              MOV     A,@R0
37                                 JNZ     DOTIME      ;JMP IF FLG SET
38   062A    09           LOOP1:  IN      A,P1
39   062B    37                   CPL     A
40   062C    F2   08              J37     LOOP        ;IF NOT SELECTED
41   062E    37                   CPL     A
42   062F    D2   59              J36     COMREQ      ;COMM. REQ. ?
43   0631    B2   75              J35     PAMREQ      ;PARAM. REQ. ?
44   0633    C4   08              JMP     LOOP
```

DOTIME

```
 1
 2                                 .SBTTL DOTIME
 3                         ;*
 4                         ; PERFORM TEMP UPDATE CYCLE EVERY
 5                         ;   5 SEC
 6   0635    B8   28       ;*
 7   0637    B0   00       DOTIME: MOV    R0,#TMRFLG
 8   0639    F4   0A              MOV     @R0,#0      ;CLR TMRFLG
 9   063B    F4   5A              CALL    TEMUP
10   063D    C4   08              CALL    TEMOFF
11                                 JMP     LOOP
12                         ;*
13                         ; CHECK WRITE PROTECT STATUS IN DRIVE
14                         ;*
15                         ; ASSUME R0 = #1 & R1 = #WPSHST
16   063F    80           ;*
17   0640    53   01      WPSUP:  MOVX    A,@R0
18   0642    A1                   ANL     A,#1
19   0643    12   4F              MOV     @R1,A       ;UPDATE HIST
20                                 J30     NOWPS
21
22                         ; DISABLE WRITE
23   0645    B8   65       ;*
24   0647    F0                   MOV     R0,#WRTFLG
25   0648    43   04              MOV     A,@R0
26   064A    A0                   ORL     A,#4        ;SET FLAG
27   064B    34   D7              MOV     @R0,A
28   064D    C4   2A              CALL    WRTSTS      ;DO EVERYTHING
29                                 JMP     LOOP1
30                         ;*
31                         ; ENABLE WRITE
32   064F    B8   65       ;*
33   0651    F0           NOWPS:  MOV     R0,#WRTFLG
                                   MOV     A,@R0
```

```
34  0652   53  FB              ANL    A,#0FB    ;RESET FLAG
35  0654   A0                  MOV    @R0,A
36  0655   34  D7              CALL   WRTSTS
37  0657   C4  2A              JMP    LOOP1
```

CMD.REQ & PAR.REQ SERVICE

```
                                .SBTTL CMD.REQ & PAR.REQ SERVICE
                            ;*
                            ; COMMAND REQUEST CYCLE
                            ;*
 5  0659   B8  6C     COMREQ: MOV    R0,#COMSEQ  ;CMD REQ
 6  065B   F0                  MOV    A,@R0
 7  065C   96  AA              JNZ    BUSER1      ;SEQUENCE ERROR!
 8  065E   10                  INC    @R0
 9  065F   09                  IN     A,P1
10  0660   37                  CPL    A
11  0661   92  AA              JB4    BUSER1                ;BUSOUT OK ?
12  0663   B8  00              MOV    R0,#0
13  0665   80                  MOVX   A,@R0
14  0666   37                  CPL    A                     ;INPUT CMD DATA
                            ;*
                            ; SAVE COMMAND IN R7
                            ;*
18  0667   AF                  MOV    R7,A
                            ;*
                            ; RETURN BUS ACKNOWLEDGE TO HOST
                            ;*
22  0668   B8  43     BUSACK: MOV    R0,#IMPRT2
23  066A   F0                  MOV    A,@R0
24  066B   43  08              ORL    A,#8
25  066D   3A                  OUTL   P2,A       ;BUS ACK. ON
                            ;*
27  066E   09         BA:     IN     A,P1       ;WAIT FOR END
28  066F   D2  6E              JB6    BA         ;OF CMD REQ.,
                            ;*
30  0671   F0                  MOV    A,@R0
31  0672   3A                  OUTL   P2,A
32  0673   C4  08              JMP    LOOP       ;BUS ACK. OFF
                            ;*
                            ; PARAMETER REQUEST CYCLE
                            ;*
36  0675   B8  6C     PAMREQ: MOV    R0,#COMSEQ
37  0677   F0                  MOV    A,@R0
38  0678   C6  B0              JZ     BUSER2     ;SEQUENCE ERROR?
39  067A   07                  DEC    A
40  067B   A0                  MOV    @R0,A
                            ;*
                            ; CHECK FOR ILLEGAL CMDS
                            ;*
44  067C   FF                  MOV    A,R7
45  067D   F2  B7              JB7    ILLCOM     ;CMD=8X
46  067F   53  70              ANL    A,#70
47  0681   D3  70              XRL    A,#70
48  0683   C6  B7              JZ     ILLCOM     ;CMD=7X
49  0685   FF                  MOV    A,R7
```

MD.REQ & PAR.REQ SERVICE

```
                            ;*
                            ; IS COMMAND = 31 TO 3F
                            ;*
 4  0686   53  30              ANL    A,#30
 5  0688   D3  30              XRL    A,#30
 6  068A   C6  8E              JZ     CUDBE
 7  068C   C4  93              JMP    PAM1
 8  068E   FF         CUDBE:  MOV    A,R7       ;COMMAND AGN
 9  068F   53  0F              ANL    A,#0F
10  0691   96  BA              JNZ    ILCMD1
11  0693   FF         PAM1:   MOV    A,R7
12  0694   D2  9D              JB6    POUT2      ;JUMP IF PARM OUT
                            ;*
                            ; PARAMETERS IN
```

```
15
16   0696   09                      IN      A,P1        ;PARAMETERS IN.
17   0697   92   B0                 J34     BUSER2
18   0699   FF                      MOV     A,R7
19   069A   F5                      SEL     M31
20   069B   04   70                 JMP     TABLE
21
22                          ;*
23                          ; PARAMETERS OUT
                            ;*
24   069D   09        POUT2:  IN      A,P1        ;PARAMETERS OUT
25   069E   37                CPL     A
26   069F   92   B0           J34     BUSER2
27   06A1   B9   00           MOV     R1,#0
28   06A3   81                MOVX    A,@R1
29   06A4   37                CPL     A
30
31                          ;*
32                          ; SAVE PARAM DATA IN R3
                            ;*
33   06A5   AB                MOV     R3,A
34   06A6   FF                MOV     A,R7
35   06A7   F5                SEL     M31
36   06A8   04   70           JMP     TABLE
37
38   06AA   23   02   BUSER1: MOV     A,#2        ;BUS ERROR
39   06AC   94   00           CALL    BERRON
40   06AE   C4   68           JMP     BUSACK
41
42   06B0   23   02   BUSER2: MOV     A,#2        ;BUS ERROR
43   06B2   94   00           CALL    BERRON
44   06B4   F5                SEL     M31
45   06B5   64   92           JMP     PAREND
46
47   06B7   F5        ILLCOM: SEL     M31         ;SET ILL CMD
48   06B8   04   8F           JMP     ILLCMD
49
50   06BA   F5        ILCMDI: SEL     M31
51   06BB   04   D0           JMP     RIC         ;REPORT ILL CMD
```

LANDING ZONE ROUTINE

```
 1                                  .SBTTL LANDING ZONE ROUTINE
 2                          ;*
 3                          ; LANDING ZONE ROUTINE
 4                          ;*
 5                          ; PERFORM A FAST MOVE TO CYL 117
 6                          ; THEN DO A SLOW MOVE 16 TRACKS IN
 7                          ;*
 8   06BD   E4   05   FIX6:   JMP     NOLZ
 9                          ;*
10   06BF   B8   2C   LNDZN1: MOV     R0,#TCKDEM
11   06C1   B0   01           MOV     @R0,#1
12   06C3   18                INC     R0
13   06C4   B0   17           MOV     @R0,#17
14   06C6   94   4A           CALL    DIRTST
15
16                          ;*
17                          ; ALREADY THERE ?
                            ;*
18   06C8   C6   D1           JZ      THERE
19   06CA   14   7A           CALL    MOVE
20   06CC   B8   72           MOV     R0,#SKABRT  ;FAULT WHEN
21   06CE   F0                MOV     A,@R0       ;MOVING?
22   06CF   96   BD           JNZ     FIX6        ;YES - DONE
23
24                          ;*
25                          ; MOVE 16 TRACKS FORWARD IN HOME MODE
                            ;*
26   06D1   B8   25   THERE:  MOV     R0,#HEDDIR
27   06D3   B0   00           MOV     @R0,#0
28   06D5   BA   10           MOV     R2,#10      ;16 TRACKS IN
29
30   06D7   B8   01   MORE:   MOV     R0,#1       ;CHK FOR FLTS
31   06D9   80                MOVX    A,@R0
32   06DA   72   BD           J33     FIX6
```

| | | | | |
|---|---|---|---|---|
| 33 | 06DC | F2 | BD | |
| 34 | | | | |
| 35 | 06DE | 54 | 01 | |
| 36 | 06E0 | B9 | 26 | |
| 37 | 06E2 | F1 | | |
| 38 | 06E3 | E3 | | |
| 39 | 06E4 | 53 | 0F | |
| 40 | 06E6 | 94 | 6F | |
| 41 | | | | |
| 42 | 06E8 | B9 | 20 | |
| 43 | 06EA | B1 | 00 | |
| 44 | 06EC | 19 | | |
| 45 | 06ED | B1 | 1E | |
| 46 | 06EF | 94 | 79 | |
| 47 | 06F1 | EA | D7 | |
| 48 | | | | |
| 49 | 06F3 | B8 | 70 | |
| 50 | 06F5 | B0 | 01 | |
| 51 | | | | |
| 52 | | | | |
| 53 | | | | |
| 54 | 06F7 | B8 | 2E | |
| 55 | 06F9 | B0 | FF | |
| 56 | 06FB | 18 | | |
| 57 | 06FC | B0 | FF | |
| 58 | | | | |
| 59 | 06FE | 34 | A6 | |
| 60 | | | | |
| 61 | | | | |
| 62 | | | | |
| 63 | 0700 | B8 | 69 | |
| 64 | 0702 | B0 | 01 | |
| 65 | 0704 | 83 | | |
| 66 | | | | |
| 67 | | | | |
| 68 | | | | |
| 69 | 0705 | B8 | 72 | |
| 70 | 0707 | B0 | 01 | |
| 71 | 0709 | 83 | | |

```
                J37     FIX6
;*
                CALL    TBLADJ
                MOV     R1,#MOTOR
                MOV     A,@R1
                MOVP3   A,@A
                ANL     A,#0F
                CALL    DMDATA  ;STEP MOTOR
;*
                MOV     R1,#DELMLT
                MOV     @R1,#0
                INC     R1
                MOV     @R1,#^D30
                CALL    DELAY
                DJNZ    R2,MORE ;LOOP
;*
                MOV     R0,#INLAND
                MOV     @R0,#1  ;SET FLAG
;*
; SET (TCKNUM) = FFFF
;*
                MOV     R0,#TCKNUM
                MOV     @R0,#0FF
                INC     R0
                MOV     @R0,#0FF
;*
                CALL    RWPERM
;*
; NO MORE SEEKS UNTIL RE-ZERO
;*
                MOV     R0,#HOMREQ
                MOV     @R0,#1
                RET
;*
; BAD LANDING ZONE
;*
NOLZ:           MOV     R0,#SKABRT
                MOV     @R0,#1
                RET
```

TEMPERATURE UPDATE

| | | | | |
|---|---|---|---|---|
| 1 | | | | |
| 2 | | | | |
| 3 | | | | |
| 4 | | | | |
| 5 | | | | |
| 6 | | | | |
| 7 | | | | |
| 8 | 070A | B8 | 31 | |
| 9 | 070C | 27 | | |
| 10 | 070D | A0 | | |
| 11 | | | | |
| 12 | 070E | 54 | B1 | |
| 13 | 0710 | B8 | 30 | |
| 14 | 0712 | A0 | | |
| 15 | 0713 | 83 | | |

```
                .SBTTL  TEMPERATURE UPDATE
;*
; READ TEMPERATURE SENSOR & STORE
; IN (TEMPER)
;*
; SELECT ANALOGUE MUX CHANNEL IN DM
;*
TEMUP:          MOV     R0,#MUXSEL
                CLR     A
                MOV     @R0,A
;*
                CALL    ADCONV
                MOV     R0,#TEMPER
                MOV     @R0,A
                RET
;*
; DETERMINE STEPPER MOTOR OFFSET AS
; FUNCTION OF CYL ZONE & CURRENT TEMP
;*
; FIND TEMPERATURE CODE -- (TMPCOD)
; (TMPCOD) = 0 --   75F>TEMP
; (TMPCOD) = 1 -- 100F>TEMP>75F
; (TMPCOD) = 2 -- 125F>TEMP>100F
; (TMPCOD) = 3 --      TEMP>125F
;*
; A TO D CONVERSION TABLE
;       (TEMPER) = 0 -- TEMP < 75F
;       (TEMPER) = 6 -- TEMP = 100F
;       (TEMPER) = A -- TEMP = 125F
;*
```

| | | | | | | | |
|---|---|---|---|---|---|---|---|
| 31 | 0714 | B9 | 3D | | DOFF: | MOV | R1,#TMPCOD |
| 32 | 0716 | B8 | 30 | | | MOV | R0,#TEMPER |
| 33 | 0718 | F0 | | | | MOV | A,@R0 |
| 34 | 0719 | 96 | 1F | | | JNZ | TEMP4 |
| 35 | 071B | B1 | 00 | | | MOV | @R1,#0 |
| 36 | 071D | E4 | 34 | | | JMP | FIND |
| 37 | | | | | ;* | | |
| 38 | 071F | 37 | | | TEMP4: | CPL | A |
| 39 | 0720 | 03 | 06 | | | ADD | A,#6 |
| 40 | 0722 | E6 | 28 | | | JNC | TEMP8 |
| 41 | 0724 | B1 | 01 | | | MOV | @R1,#1 |
| 42 | 0726 | E4 | 34 | | | JMP | FIND |
| 43 | 0728 | F0 | | | TEMP8: | MOV | A,@R0 |
| 44 | 0729 | 37 | | | | CPL | A |
| 45 | 072A | 03 | 0A | | | ADD | A,#0A |
| 46 | 072C | E6 | 32 | | | JNC | TEMPC |
| 47 | 072E | B1 | 02 | | | MOV | @R1,#2 |
| 48 | 0730 | E4 | 34 | | | JMP | FIND |
| 49 | 0732 | B1 | 03 | | TEMPC: | MOV | @R1,#3 |
| 50 | | | | | ;* | | |
| 51 | | | | | ; FIND OFFSET CODE -- (OFFCOD) | | |
| 52 | | | | | ;* | | |
| 53 | 0734 | F1 | | | FIND: | MOV | A,@R1 |
| 54 | 0735 | 03 | F0 | | | ADD | A,#OFFTBL&0FF |
| 55 | 0737 | E3 | | | | MOVP3 | A,@A |
| 56 | 0738 | B8 | 3E | | | MOV | R0,#OFFCOD |
| 57 | 073A | A0 | | | | MOV | @R0,A |
| 58 | 073B | 83 | | | | RET |  |
| 59 | | | | | ;* | | |
| 60 | | | | | ; FIND OFFSET NIBBLE FOR DM DAC | | |
| 61 | | | | | ;* | | |
| 62 | 073C | B9 | 26 | | GETOFF: | MOV | R1,#MOTOR |
| 63 | 073E | B8 | 3E | | | MOV | R0,#OFFCOD |
| 64 | 0740 | F1 | | | | MOV | A,@R1 |
| 65 | 0741 | 03 | 09 | | | ADD | A,#9 |
| 66 | 0743 | E3 | | | GETOF1: | MOVP3 | A,@A |
| 67 | 0744 | 60 | | | | ADD | A,@R0   ;ADD (OFFCOD) |
| 68 | 0745 | 03 | C0 | | | ADD | A,#NIBTBL&0FF |
| 69 | 0747 | E3 | | | | MOVP3 | A,@A |
| 70 | 0748 | 53 | 0F | | | ANL | A,#0F   ; NIBBLE IN A |
| 71 | 074A | 43 | 10 | | | ORL | A,#10   ; FUNCTION = 1 |
| 72 | 074C | 94 | 6F | | | CALL | DMDATA |
| 73 | 074E | 83 | | | | RET | |
| 74 | | | | | ;* | | |
| 75 | | | | | ; 1 MILLISEC DELAY TO ALLOW FOR | | |
| 76 | | | | | ; ANY OFFSET DISTURBANCE | | |
| 77 | | | | | ;* | | |
| 78 | 074F | B8 | 20 | | DLY1MS: | MOV | R0,#DELMLT |
| 79 | 0751 | 27 | | | | CLR | A |
| 80 | 0752 | A0 | | | | MOV | @R0,A |
| 81 | 0753 | 18 | | | | INC | R0 |
| 82 | 0754 | 23 | 01 | | | MOV | A,#1 |
| 83 | 0756 | A0 | | | | MOV | @R0,A |
| 84 | 0757 | 94 | 79 | | | CALL | DELAY |
| 85 | 0759 | 83 | | | | RET | |
| 86 | | | | | ;* | | |
| 87 | | | | | ; PERFORM STEPPER OFFSET AS A FUNCTION | | |
| 88 | | | | | ; OF VALUE IN TEMPER | | |
| 89 | | | | | ;* | | |
| 90 | 075A | F4 | 14 | | TEMOFF: | CALL | DOFF |
| 91 | 075C | F4 | 3C | | | CALL | GETOFF ;PERFORM OFFSET |
| 92 | 075E | F4 | 4F | | | CALL | DLY1MS |
| 93 | 0760 | 83 | | | | RET | |
| 94 | | | | | ;* | | |
| 95 | | | | | ; SET TEMP OFFSET DAC FOR VALUES | | |
| 96 | | | | | ; OF TARGET CYL | | |
| 97 | | | | | ; USES LAST 3 BITS OF TARGET ADDR | | |
| 98 | | | | | ; AS INDEX INTO TABLE NIBLOC | | |
| 99 | | | | | ;* | | |
| 100 | 0761 | F4 | 14 | | NEWOFF: | CALL | DOFF |
| 101 | 0763 | B9 | 2D | | | MOV | R1,#TCKDEM+1 |
| 102 | 0765 | F1 | | | | MOV | A,@R1 |

```
103  0766    53   07
104  0768    03   3D
105  076A    F4   43
106  076C    83
107
```
```
              AHL    A,#7
              ADD    A,#NIBLOC&0FF
              CALL   GETOF1
              RET
              .IF GT NEWALG
```

PORT ENABLE INTERRUPT

```
  1
  2
  3
  4
  5
  6
  7   076D    23   62
  8   076F    3A
  9
 10   0770    23   01
 11   0772    D7
 12
 13   0773    B8   08
 14   0775    B0   5E
 15   0777    18
 16   0778    B0   05
 17
 18   077A    86   7A
 19
 20
 21   077C    93
 22
```
```
              .SBTTL PORT ENABLE INTERRUPT
;*
; PORT ENABLE INTERRUPT
; LOOP UNTIL PORT ENABLE GOES AWAY
; THEN, CLEAR STACK & GO
;*
PINTER:  MOV   A,#862    ;FLTRES,BUSY ON
         OUTL  P2,A
;*
         MOV   A,#1      ;SET SP
         MOV   PSW,A
;*
         MOV   R3,#8     ;SET RETURN ADDR
         MOV   @R0,#START2&0FF
         INC   R0
         MOV   @R0,#START2/100&0FF
;*
PORT1:   JNI   PORT1     ;WAIT FOR PE TO
                         ;GO AWAY
;*
         RETR            ;RET TO LOC "START2"
         .ENDC
```

ANSI COMMAND TABLES

```
  1
  2
  3           0800
  4
  5
  6
  7
  8
  9
 10   0800    71
 11   0801    73
 12   0802    75
 13   0803    77
 14   0804    79
 15
 16   0805    71
 17   0806    71
 18   0807    71
 19   0808    71
 20   0809    71
 21   080A    71
 22   080B    71
 23   080C    71
 24
 25   080D    7B
 26   080E    7D
 27   080F    7F
 28   0810    81
 29   0811    83
 30   0812    85
 31   0813    87
 32   0814    89
 33   0815    8B
 34   0816    8D
 35
 36   0817    71
 37   0818    71
 38   0819    71
```
```
              .SBTTL ANSI COMMAND TABLES
              .IF LT .-0800
              . = 0800
              .IFF
AAAPAG  = 1
              .ENDC
;*
; COMMAND TABLE FOR PARAMETERS IN.
;*
              .BYTE  JT&0FF         ;ILL. CMD
              .BYTE  JT+2&0FF       ;CLEAR FAULT
              .BYTE  JT+4&0FF       ;CLEAR ATTN
              .BYTE  JT+6&0FF       ;SEEK
              .BYTE  JT+8&0FF       ;REZERO
;*********************************
              .BYTE  JT&0FF
              .BYTE  JT&0FF
              .BYTE  JT&0FF         ;HOLE
              .BYTE  JT&0FF
              .BYTE  JT&0FF         ;REPORT ILL CMD
              .BYTE  JT&0FF
              .BYTE  JT&0FF
              .BYTE  JT&0FF
;*********************************
              .BYTE  JT+^D10&0FF    ;SNS BYTE 2
              .BYTE  JT+^D12&0FF    ;SNS BYTE 1
              .BYTE  JT+^D14&0FF    ;RPT GENSTS
              .BYTE  JT+^D16&0FF    ;RPT ATTRIB.
              .BYTE  JT+^D18&0FF    ;SET ATTN
              .BYTE  JT+^D20&0FF    ;RESERVE DR
              .BYTE  JT+^D22&0FF    ;RELEASE DR
              .BYTE  JT+^D24&0FF    ;SEL RESET
              .BYTE  JT+^D26&0FF    ;SK LND ZONE
              .BYTE  JT+^D28&0FF    ;REFORMT TRK
;*********************************
              .BYTE  JT&0FF
              .BYTE  JT&0FF
              .BYTE  JT&0FF
```

| | | | | | |
|---|---|---|---|---|---|
|39|081A|71|.BYTE|JT&0FF| |
|40|081B|71|.BYTE|JT&0FF| |
|41|081C|71|.BYTE|JT&0FF| |
|42|081D|71|.BYTE|JT&0FF| |
|43|081E|71|.BYTE|JT&0FF| |
|44|081F|71|.BYTE|JT&0FF| |
|45|0820|71|.BYTE|JT&0FF|;HOLE|
|46|0821|71|.BYTE|JT&0FF| |
|47|0822|71|.BYTE|JT&0FF|;REPORT ILL CMD|
|48|0823|71|.BYTE|JT&0FF| |
|49|0824|71|.BYTE|JT&0FF| |
|50|0825|71|.BYTE|JT&0FF| |
|51|0826|71|.BYTE|JT&0FF| |
|52|0827|71|.BYTE|JT&0FF| |
|53|0828|71|.BYTE|JT&0FF| |
|54| | | | | |

;**********************************

| | | | | | |
|---|---|---|---|---|---|
|55|0829|8F|.BYTE|JT+^D30&0FF|;REP CYL HI|
|56|082A|91|.BYTE|JT+^D32&0FF|;REP CYL.LOW|
|57|082B|93|.BYTE|JT+^D34&0FF|;REP RPER HI|
|58|082C|95|.BYTE|JT+^D36&0FF|;REP RPER LO|
|59|082D|97|.BYTE|JT+^D38&0FF|;REP WPER HI|
|60|082E|99|.BYTE|JT+^D40&0FF|;REP WPER LO|
|61|082F|9B|.BYTE|JT+^D42&0FF|;REP TEST|
|62|0830|9D|.BYTE|JT+^D44&0FF|;REP TEMP|

;*
; COMMAND TABLE FOR PARAMETERS OUT.
;*

|66|0840| | | . = 840| |
|---|---|---|---|---|---|

;*

| | | | | | |
|---|---|---|---|---|---|
|68|0840|9F|.BYTE|JT+^D46&0FF|;ATTN CTRL|
|69|0841|A1|.BYTE|JT+^D48&0FF|;WRITE CTRL|
|70|0842|A3|.BYTE|JT+^D50&0FF|;SET HI CYL|
|71|0843|A5|.BYTE|JT+^D52&0FF|;SET LOW CYL|
|72|0844|A7|.BYTE|JT+^D54&0FF|;SEL MOV HD|

;**********************************

| | | | | | |
|---|---|---|---|---|---|
|74|0845|CB|.BYTE|JT+^D90&0FF| |
|75|0846|CB|.BYTE|JT+^D90&0FF| |
|76|0847|CB|.BYTE|JT+^D90&0FF| |
|77|0848|CB|.BYTE|JT+^D90&0FF| |
|78|0849|CB|.BYTE|JT+^D90&0FF| |
|79|084A|CB|.BYTE|JT+^D90&0FF| |
|80|084B|CB|.BYTE|JT+^D90&0FF| |
|81|084C|CB|.BYTE|JT+^D90&0FF|;HOLE|
|82|084D|CB|.BYTE|JT+^D90&0FF| |
|83|084E|CB|.BYTE|JT+^D90&0FF| |
|84|084F|CB|.BYTE|JT+^D90&0FF| |

;**********************************

| | | | | | |
|---|---|---|---|---|---|
|86|0850|A9|.BYTE|JT+^D56&0FF|;LOAD ATT #|
|87|0851|AB|.BYTE|JT+^D58&0FF|;LD DEV ATT|
|88|0852|AD|.BYTE|JT+^D60&0FF|;SEL FXED HD|
|89|0853|AF|.BYTE|JT+^D62&0FF|;READ CNTRL|
|90|0854|B1|.BYTE|JT+^D64&0FF|;OFFSET CTRL|
|91|0855|B3|.BYTE|JT+^D66&0FF|;SPIN CNTRL|
|92|0856|B5|.BYTE|JT+^D68&0FF|;LOAD BPS HI|
|93|0857|B7|.BYTE|JT+^D70&0FF|;  "  "  MED|
|94|0858|B9|.BYTE|JT+^D72&0FF|;  "  "  LO|
|95|0859|BB|.BYTE|JT+^D74&0FF|;LD SPPT HI|
|96|085A|BD|.BYTE|JT+^D76&0FF|;  "  "  MED|
|97|085B|BF|.BYTE|JT+^D78&0FF|;  "  "  LO|

;**********************************

| | | | | | |
|---|---|---|---|---|---|
|99|085C|CB|.BYTE|JT+^D90&0FF| |
|100|085D|CB|.BYTE|JT+^D90&0FF| |
|101|085E|CB|.BYTE|JT+^D90&0FF| |
|102|085F|CB|.BYTE|JT+^D90&0FF| |
|103|0860|CB|.BYTE|JT+^D90&0FF| |
|104|0861|CB|.BYTE|JT+^D90&0FF| |
|105|0862|CB|.BYTE|JT+^D90&0FF| |
|106|0863|CB|.BYTE|JT+^D90&0FF| |
|107|0864|CB|.BYTE|JT+^D90&0FF|;HOLE|
|108|0865|CB|.BYTE|JT+^D90&0FF| |
|109|0866|CB|.BYTE|JT+^D90&0FF| |
|110|0867|CB|.BYTE|JT+^D90&0FF| |

```
111  0868  CB                    .BYTE   JT+^D90&0FF
112  0869  CB                    .BYTE   JT+^D90&0FF
113  086A  CB                    .BYTE   JT+^D90&0FF
114                       ;****************************************
115  086B  C1                    .BYTE   JT+^D80&0FF  ;LD R PER HI
116  086C  C3                    .BYTE   JT+^D82&0FF  ;LD R PER LO
117  086D  C5                    .BYTE   JT+^D84&0FF  ;LD W PER HI
118  086E  C7                    .BYTE   JT+^D86&0FF  ;LD W PER LW
119  086F  C9                    .BYTE   JT+^D88&0FF  ;LD TEST BYT
120                       ;*
121                       ;*
122  0870  B3            TABLE:  JMPP    @R  ;GO TO ADD FROM TABLE
123                       ;*
124                       ; COMMAND JUMP TABLE
125                       ;*
126  0871  04  D0        JT:     JMP     RIC     ;ILLEG CMD  00
127  0873  24  01                JMP     CFLT    ;CLR FAULT  01
128  0875  24  56                JMP     CATN    ;CLR ATTN   02
129  0877  04  D8                JMP     SK      ;SEEK       03
130  0879  04  FB                JMP     RZO     ;REZERO     04
131  087B  24  92                JMP     S32     ;SENSE 2    0D
132  087D  24  8E                JMP     S31     ;SENSE 1    0E
133  087F  24  8A                JMP     GS      ;GENSTS     0F
134  0881  24  B6                JMP     RDAT    ;REPORT ATTR 10
135  0883  24  70                JMP     SA      ;SET ATTN   11
136  0885  24  B2                JMP     RESD    ;RESERVE DR 12
137  0887  24  B4                JMP     RELD    ;RELEASE DR 13
138  0889  24  76                JMP     SRES    ;SEL RESET  14
139  088B  24  D5                JMP     LNDZON  ;LAND ZONE  15
140  088D  24  E6                JMP     REFMAT  ;PART TRK   16
141  088F  24  AA                JMP     RCH     ;RPT CYL HI 29
142  0891  24  AE                JMP     RCL     ;RPT CYL LOW 2A
143  0893  24  9E                JMP     RRPH    ;RPT RPER HI 2B
144  0895  24  A2                JMP     RRPL    ;RPT RPER LO 2C
145  0897  24  96                JMP     RWPH    ;RPT WPER HI 2D
146  0899  24  9A                JMP     RWPL    ;RPT WPER LO 2E
147  089B  24  A6                JMP     RTB     ;RPT TST BYT 2F
148  089D  64  81                JMP     RPTEMP  ;RPT TEMP   30
149  089F  64  2A                JMP     ATTCON  ;ATTN CNTL  40
150  08A1  64  0B                JMP     WRTCON  ;WRITE CNTL 41
151  08A3  44  D6                JMP     SHCA    ;SET CYL HI 42
152  08A5  44  D0                JMP     SLCA    ;SET CYL LO 43
153  08A7  44  E4                JMP     SELMH   ;SEL MOV HD 44
154  08A9  44  C0                JMP     LOATN   ;SET ATT#   50
155  08AB  44  38                JMP     LOAT    ;SET ATT    51
156  08AD  44  34                JMP     SFH     ;SEL FXED HD 52
157  08AF  44  70                JMP     RC      ;READ CNTL  53
158  08B1  44  36                JMP     OC      ;OFFSET CNTL 54
159  08B3  44  95                JMP     SC      ;SPIN CNTL  55
160  08B5  64  5D                JMP     LBPSHI  ;LOAD BPS HI 56
161  08B7  64  63                JMP     LBPSMD  ; "    " MED 57
162  08B9  64  69                JMP     LBPSLO  ; "    " LO  58
163  08BB  64  6F                JMP     LBPPTH  ;LD SPPT HI 59
164  08BD  64  75                JMP     LBPPTM  ; "    " MED 5A
165  08BF  64  7B                JMP     LBPPTL  ; "    " LOW 5B
166  08C1  64  51                JMP     SRPH    ;SET RPER HI 6B
167  08C3  64  55                JMP     SRPL    ;SET RPER LO 6C
168  08C5  64  43                JMP     SWPH    ;SET WPER HI 6D
169  08C7  64  4D                JMP     SWPL    ;SET WPER LO 6E
170  08C9  64  59                JMP     STB     ;SET TST BYT 6F
171  08CB  04  CD                JMP     ERR
```

RIC, SK, HM, CFLT, CATN, SRES & REPORT CMDS

```
1                                .SBTTL RIC, SK, HM, CFLT, CATN,
2                        ;*
3  08CD  E5               ERR:   SEL     M30
4  08CE  C4  B7                  JMP     ILLCOM
5                        ;****************************************
6                        ;*
7                        ; CMDS WITH PARAMETERS IN
8                        ;*
```

```
 9
10                              ;*********************************
11                              ;*
12                              ;  *** REPORT ILLEGAL CMD CMD ***
13  08D0   23   04              ;*
14  08D2   E5                   RIC:    MOV     A,#4        ;ILL CMD
15  08D3   94   00                      SEL     M30
16  08D5   F5                           CALL    BERRON
17  08D6   64   8B                      SEL     M31
18                                      JMP     BAK5
19                              ;*
20                              ;  *** SEEK CMD ***
21  08D8   B8   2C              ;*
22  08DA   F0                   SK:     MOV     R0,#TCKDEM
23  08DB   03   FF                      MOV     A,@R0       ;CHECK FOR
24  08DD   E6   EA                      ADD     A,#0FF      ;ILLEG CYL
25  08DF   F0                           JNC     SK1
26  08E0   53   FE                      MOV     A,@R0
27  08E2   96   F9                      ANL     A,#0FE
28  08E4   18                           JNZ     BADAD
29  08E5   F0                           INC     R0
30  08E6   03   E8                      MOV     A,@R0
31  08E8   F6   F9                      ADD     A,#0E8
32                                      JC      BADAD
33  08EA   B8   69              ;*
34  08EC   F0                   SK1:    MOV     R0,#HOMREQ
35  08ED   C6   F3                      MOV     A,@R0       ;IF HOMREQ,
36  08EF   94   9A                      JZ      SK2         ;SET SK ERR
37  08F1   64   8B                      CALL    SKERR       ;& CMD REJ
38                                      JMP     BAK5        ;SEND GENSTS
39  08F3   B9   66              ;*
40  08F5   B1   01              SK2:    MOV     R1,#SEEK    ;SK FLAG ON
41  08F7   64   87                      MOV     @R1,#1
42                                      JMP     BAK3
43  08F9   44   2C              ;*
44                              BADAD:  JMP     NOCAN
45                              ;*
46                              ;  *** REZERO CMD ***
47  08FB   B9   67              ;*
48  08FD   B1   01              RZO:    MOV     R1,#REZERO  ;HOME FLAG ON
49  08FF   64   87                      MOV     @R1,#1
50                                      JMP     BAK3
51                              ;*
52                              ;  *** CLEAR FAULT CMD ***
53                              ;*
54                              ;  ISSUE FAULT RESET PULSE
55  0901   E5                   ;*
56  0902   B4   3A              CFLT:   SEL     M30
57  0904   F5                           CALL    CLRFLT
58                                      SEL     M31
59                              ;*
60                              ;  UP-DATE (GENSTS) & (SNS1)
61                              ;  REGARDLESS OF FAULT STATUS
62  0905   B8   33              ;*
63  0907   F0                           MOV     R0,#GENSTS
64  0908   53   F1                      MOV     A,@R0
65  090A   A0                           ANL     A,#0F1
66                                      MOV     @R0,A
67  090B   B9   34              ;*
68  090D   F1                           MOV     R1,#SNS1
69  090E   53   01                      MOV     A,@R1
70  0910   A1                           ANL     A,#1
71  0911   96   17                      MOV     @R1,A
72                                      JNZ     CFLT6
73  0913   F0                   ;*
74  0914   53   EF                      MOV     A,@R0
75  0916   A0                           ANL     A,#0EF      ;CLR SNS1 BIT
76                                      MOV     @R0,A
77  0917   B9   32              ;*
78  0919   B1   00              CFLT6:  MOV     R1,#FLTSTS
79                                      MOV     @R1,#0
80                              ;*
                                ;  FAULT STILL THERE ?  IF YES,
```

```
81
82
83    091B    B9    01                    MOV     R1,#1
84    091D    81                          MOVX    A,@R1
85    091E    53    F8                    AHL     A,#0F8
86    0920    96    54                    JHZ     ENDCF      ;YES - DONE
87
                                   ;*
88                                 ; ARE WE IN LANDING ZONE ?
89                                 ; --- IF SO DON'T CLR "NOT-READY"
90                                 ;*
91    0922    B9    70                    MOV     R1,#INLAND
92    0924    F1                          MOV     A,@R1
93    0925    96    36                    JHZ     CFLT3
94    0927    F0                          MOV     A,@R0
95    0928    53    FE                    AHL     A,#0FE
96    092A    A0                          MOV     @R0,A
97    092B    E5                          SEL     MB0
98    092C    94    A0                    CALL    READY
99
100                                ;*
101                                ; IF SELECTIVE RESET CMD DO
102                                ; NOT SET ATTENTION
                                   ;*
103   092E    B9    6E                    MOV     R1,#SRFLG
104   0930    F1                          MOV     A,@R1
105   0931    96    35                    JHZ     CFLT5
106   0933    94    BA                    CALL    ATTNQ
107   0935    F5                  CFLT5:  SEL     MB1
108
                                   ;*
109                                ; READY ON
110                                ;*
111   0936    B8    44            CFLT3:  MOV     R0,#IMREG1
112   0938    F0                          MOV     A,@R0
113   0939    43    01                    ORL     A,#1       ;READY LED ON
114   093B    A0                          MOV     @R0,A
115   093C    B8    01                    MOV     R0,#1
116   093E    90                          MOVX    @R0,A
117
                                   ;*
118                                ; CLEAR ATTENTION ONLY IF (ATTFLG) = 0
119                                ;*
120   093F    B8    6D                    MOV     R0,#ATTFLG
121   0941    F0                          MOV     A,@R0
122   0942    96    54                    JHZ     ENDCF
123
                                   ;*
124                                ; CLEAR ATTENTION ONLY IF NO BIT
125                                ; IS SET WHICH IS NORMALLY CLEARED
126                                ; BY A CLEAR ATTENTION COMMAND
127                                ;*
128   0944    B8    33                    MOV     R0,#GENSTS
129   0946    F0                          MOV     A,@R0
130   0947    F2    54                    J37     ENDCF
131   0949    B8    35                    MOV     R0,#SNS2
132   094B    F0                          MOV     A,@R0
133   094C    53    AB                    AHL     A,#0AB
134   094E    96    54                    JHZ     ENDCF
135   0950    E5                          SEL     MB0
136   0951    94    43                    CALL    CATTN
137   0953    F5                          SEL     MB1
138   0954    64    8B            ENDCF:  JMP     MK5
139
                                   ;*
140                                ; *** CLEAR ATTENTION CMD ***
141                                ;*
142   0956    B9    35            CATN:   MOV     R1,#SNS2
143   0958    F1                          MOV     A,@R1
144   0959    53    54                    AHL     A,#54
145   095B    A1                          MOV     @R1,A
146
                                   ;*
147   095C    B8    33                    MOV     R0,#GENSTS
148   095E    96    66                    JHZ     CATN1
149   0960    F0                          MOV     A,@R0
150   0961    53    5F                    AHL     A,#5F
151   0963    A0                          MOV     @R0,A
152   0964    24    6A                    JMP     CATN2
```

| | | | | | | |
|---|---|---|---|---|---|---|
| 153 | 0966 | F0 | | CATN1: | MOV | A,@R0 |
| 154 | 0967 | 53 | 7F | | ANL | A,#7F |
| 155 | 0969 | A0 | | | MOV | @R0,A |
| 156 | | | | ;* | | |
| 157 | | | | ; CLEAR ATTENTION | | |
| 158 | | | | ;* | | |
| 159 | 096A | E5 | | CATN2: | SEL | MB0 |
| 160 | 096B | 94 | 43 | | CALL | CATTN |
| 161 | 096D | F5 | | | SEL | MB1 |
| 162 | 096E | 64 | 8B | | JMP | BAK5 |
| 163 | | | | | | |
| 164 | | | | ; *** SET ATTENTION CMD *** | | |
| 165 | | | | ;* | | |
| 166 | 0970 | E5 | | SA: | SEL | MB0 |
| 167 | 0971 | 94 | 35 | | CALL | SATTN |
| 168 | 0973 | F5 | | | SEL | MB1 |
| 169 | 0974 | 64 | 8B | | JMP | BAK5 |
| 170 | | | | | | |
| 171 | | | | ; *** SELECTIVE RESET CMD *** | | |
| 172 | | | | ;* | | |
| 173 | 0976 | E5 | | SRES: | SEL | MB0 |
| 174 | 0977 | 94 | 43 | | CALL | CATTN |
| 175 | 0979 | F5 | | | SEL | MB1 |
| 176 | 097A | B8 | 33 | | MOV | R0,#GENSTS |
| 177 | 097C | F0 | | | MOV | A,@R0 |
| 178 | 097D | 53 | 31 | | ANL | A,#31 |
| 179 | 097F | A0 | | | MOV | @R0,A |
| 180 | 0980 | B9 | 68 | | MOV | R1,#INITFG |
| 181 | 0982 | B1 | 01 | | MOV | @R1,#1 ;INIT REQ FLAG |
| 182 | 0984 | B9 | 6E | | MOV | R1,#SRFLG |
| 183 | 0986 | B1 | 01 | | MOV | @R1,#1 ;SET FLAG |
| 184 | 0988 | 24 | 01 | | JMP | CFLT ;CONT ON IN CFLT |
| 185 | | | | ;* | | |
| 186 | | | | ; *** REPORT GENERAL STATUS CMD *** | | |
| 187 | | | | ;* | | |
| 188 | 098A | B8 | 33 | GS: | MOV | R0,#GENSTS |
| 189 | 098C | 64 | 8D | | JMP | BAK2 |
| 190 | | | | ;* | | |
| 191 | | | | ; *** REPORT SENSE BYTE 1 CMD *** | | |
| 192 | | | | ;* | | |
| 193 | 098E | B8 | 34 | SB1: | MOV | R0,#SNS1 |
| 194 | 0990 | 64 | 8D | | JMP | BAK2 |
| 195 | | | | ;* | | |
| 196 | | | | ; *** REPORT SENSE BYTE 2 CMD *** | | |
| 197 | | | | ;* | | |
| 198 | 0992 | B8 | 35 | SB2: | MOV | R0,#SNS2 |
| 199 | 0994 | 64 | 8D | | JMP | BAK2 |
| 200 | | | | ;* | | |
| 201 | | | | ; *** REPORT WRITE PERMIT CMDS *** | | |
| 202 | | | | ;* | | |
| 203 | 0996 | B8 | 36 | RWPH: | MOV | R0,#WPERM |
| 204 | 0998 | 64 | 8D | | JMP | BAK2 |
| 205 | | | | ;* | | |
| 206 | 099A | B8 | 37 | RWPL: | MOV | R0,#WPERM+1 |
| 207 | 099C | 64 | 8D | | JMP | BAK2 |
| 208 | | | | ;* | | |
| 209 | | | | ; *** REPORT READ PERMIT CMDS *** | | |
| 210 | | | | ;* | | |
| 211 | 099E | B8 | 38 | RRPH: | MOV | R0,#RPERM |
| 212 | 09A0 | 64 | 8D | | JMP | BAK2 |
| 213 | | | | ;* | | |
| 214 | 09A2 | B8 | 39 | RRPL: | MOV | R0,#RPERM+1 |
| 215 | 09A4 | 64 | 8D | | JMP | BAK2 |
| 216 | | | | ;* | | |
| 217 | | | | ; *** REPORT TEST BYTE CMD *** | | |
| 218 | | | | ;* | | |
| 219 | 09A6 | B8 | 3A | RTB: | MOV | R0,#TEST |
| 220 | 09A8 | 64 | 8D | | JMP | BAK2 |
| 221 | | | | ;* | | |
| 222 | | | | ; *** REPORT CYL ADDR CMDS *** | | |
| 223 | | | | ;* | | |
| 224 | 09AA | B8 | 2E | RCH: | MOV | R0,#TCKNUM |

| | | | | | | |
|---|---|---|---|---|---|---|
|225|09AC|64|8D| |JMP|BRK2|
|226| | | |;*| | |
|227|09AE|B8|2F|RCL:|MOV|R0,#TCKNUM+1|
|228|09B0|64|8D| |JMP|BRK2|
|229| | | |;*| | |

; * MULTI-PORT CMDS *
;*

| | | | | | | |
|---|---|---|---|---|---|---|
|232|09B2|04|CD|RESD:|JMP|ERR|
|233|09B4|04|CD|RELD:|JMP|ERR|

;*
; * REPORT DEVICE ATTRIBUTE CMD *
;*
; IS HOST ASKING FOR REPORT OF AN
; ILLEGAL ATTRIBUTE NUMBER ?
;*

| | | | | | | |
|---|---|---|---|---|---|---|
|240|09B6|B8|4F|RDAT:|MOV|R0,#ATPNTR|
|241|09B8|F0| | |MOV|A,@R0|
|242|09B9|F2|D3| |J37|BADRPT|
|243|09BB|D2|CC| |J36|FIXED|
|244|09BD|B2|C6| |J35|OTHER|
|245|09BF|53|0F| |ANL|A,#0F|
|246|09C1|03|45| |ADD|A,#VARATT|
|247|09C3|A8| |EXIT:|MOV|R0,A|
|248|09C4|64|8D| |JMP|BRK2|
|249|09C6|53|0F|OTHER:|ANL|A,#0F|
|250|09C8|03|47| |ADD|A,#NOLOAD|
|251|09CA|24|C3| |JMP|EXIT|
|252|09CC|53|0F|FIXED:|ANL|A,#0F|
|253|09CE|03|24| |ADD|A,#FIXATT&0FF ;PG 3 PNTR|
|254|09D0|E3| | |MOVP3|A,@A|
|255|09D1|64|8E| |JMP|BRK4|
|256| | | |;*| | |
|257|09D3|04|D0|BADRPT:|JMP|RIC   ;ILLEG CMD|

;*
; * SEEK TO LANDING ZONE CMD *
;*

| | | | | | | |
|---|---|---|---|---|---|---|
|261|09D5|B8|69|LNDZON:|MOV|R0,#HOMREQ|
|262|09D7|F0| | |MOV|A,@R0|
|263|09D8|C6|DE| |JZ|LND1|
|264|09DA|94|9A| |CALL|SKERR   ;SET SK ERR|
|265|09DC|64|8B| |JMP|BRK5   ;& CMD REJ BIT|
|266| | | |;*| | |
|267|09DE|B8|6A|LND1:|MOV|R0,#LNDFLG|
|268|09E0|B0|01| |MOV|@R0,#1|
|269|09E2|64|87| |JMP|BRK3   ;SET BUSY|

PARTITION TRK CMD

.SBTTL   PARTITION TRK CMD
;*
; * PARTITION TRACK CMD *
;*
; CHECK LEGALITY OF VALUES PREVIOUSLY
; LOADED BY COMMANDS 56 THRU 5B &
; UP-DATE ATTRIBUTE TABLE
;*

| | | | | | | |
|---|---|---|---|---|---|---|
|9|09E4|44|02|FIX7:|JMP|BADFOR|
|10| | | |;*| | |
|11|09E6|B8|51|REFMAT:|MOV|R0,#TRACK|
|12|09E8|B9|47| |MOV|R1,#NOLOAD|
|13|09EA|BA|00| |MOV|R2,#0|
|14|09EC|54|06| |CALL|TRANS   ;TRANS BYTES/SEC|
|15|09EE|FA| | |MOV|A,R2|
|16|09EF|96|E4| |JNZ|FIX7|
|17|09F1|54|23| |CALL|UPDATE|
|18|09F3|18| | |INC|R0|
|19|09F4|19| | |INC|R1|
|20|09F5|54|06| |CALL|TRANS   ;TRANS SECT/TRK|
|21|09F7|FA| | |MOV|A,R2|
|22|09F8|96|E4| |JNZ|FIX7|
|23|09FA|54|23| |CALL|UPDATE|
|24|09FC|B8|6B| |MOV|R0,#MATFLG|

```
25   89FE    B0    01              MOV     @R0,#1
26   0A00    64    87              JMP     BAK3     ;SET BUSY
27                         ;*
28   0A02    44    2C      BADFOR: JMP     NOCAN
29                         ;*
30                         ; TRANSFER 3 BYTES
31                         ;*
32   0A04    44    20      FIX2:   JMP     BADNUM   ;ASSEM FIX
33                         ;*
34   0A06    F0           TRANS:   MOV     A,@R0    ;HI BYTE
35   0A07    96    04              JNZ     FIX2     ;JMP - BAD
36   0A09    AC                    MOV     R4,A     ;SAVE
37
38   0A0A    18                    INC     R0
39   0A0B    F0                    MOV     A,@R0    ;MED BYTE
40   0A0C    03    B9              ADD     A,#0B9   ;>46 ?
41   0A0E    F6    20              JC      BADNUM
42   0A10    F0                    MOV     A,@R0    ;AGAIN
43   0A11    AD                    MOV     R5,A     ;SAVE
44
45   0A12    F0                    MOV     A,@R0    ;MED BYTE AGN
46   0A13    D3    46              XRL     A,#46
47   0A15    18                    INC     R0
48   0A16    C6    1B              JZ      EQ
49
50                         ;*
51                         ; OK TO LOAD LO BYTE
                           ;*
52   0A18    F0                    MOV     A,@R0
53   0A19    AE           EQ1:     MOV     R6,A     ;SAVE
54   0A1A    83                    RET
55                         ;*
56   0A1B    F0           EQ:      MOV     A,@R0    ;LO BYTE
57   0A1C    96    20              JNZ     BADNUM
58   0A1E    44    19              JMP     EQ1
59                         ;*
60   0A20    BA    01      BADNUM: MOV     R2,#1    ;BAD # FLAG
61   0A22    83                    RET
62                         ;*
63                         ; OK TO UP-DATE ATTRIBUTE TABLE
64                         ;*
65   0A23    FC           UPDATE:  MOV     A,R4
66   0A24    A1                    MOV     @R1,A
67   0A25    FD                    MOV     A,R5
68   0A26    19                    INC     R1
69   0A27    A1                    MOV     @R1,A
70   0A28    FE                    MOV     A,R6
71   0A29    19                    INC     R1
72   0A2A    A1                    MOV     @R1,A
73   0A2B    83                    RET
74                         ;*
75                         ; TRACK FORMAT ABORT -- ILLEGAL VALUES
76                         ; WERE LOADED BY COMMANDS 56 THRU 5B
77                         ;*
78   0A2C    23    08      NOCAN:  MOV     A,#8     ;SET ILLEG
79   0A2E    E5                    SEL     M30      ;PARM BIT IN
80   0A2F    94    00              CALL    BERRON   ;GENSTS &
81   0A31    F5                    SEL     M31      ;SET ATTN
82   0A32    64    8B              JMP     BAK5
```

LDAT, RCNTL CMDS & CHK0E

```
 1                                 .SBTTL  LDAT, RCNTL CMDS & CHK0E
 2                         ;*****************************************
 3                         ;*
 4                         ; CMDS WITH PARAMETERS OUT (TO DRIVE)
 5                         ;*
 6                         ;*****************************************
 7                         ;*
 8                         ; *** FIXED HD & OFFSET CNTL CMDS ***
 9                         ;*
10   0A34    04    CD      SFH:    JMP     ERR
```

```
 11   0A36    04   CD              OC:     JMP     ERR
 12                                ;*
 13                                ; *** LOAD DEVICE ATTRIBUTE CMD ***
 14                                ;*
 15                                ; IS HOST ATTEMPTING LOAD OF A
 16                                ; FIXED ATTRIBUTE/NON-LOADABLE ATTRIBUTE
 17                                ; INTO ILLEGAL ATTRIBUTE # - ?
 18                                ;*
 19   0A38    B8   4F              LDAT:   MOV     R0,#ATPNTR
 20   0A3A    F0                           MOV     A,@R0
 21   0A3B    F2   C7                      J37     BADAT   ;BAD #
 22   0A3D    D2   C7                      J36     BADAT   ;FIXED ATT#
 23   0A3F    B2   C7                      J35     BADAT   ;NON-LOAD ATT#
 24                                ;*
 25   0A41    53   0F                      ANL     A,#0F
 26   0A43    03   45                      ADD     A,#VARATT
 27   0A45    A9                           MOV     R1,A    ;POINTER SET
 28                                ;*
 29                                ; UP-DATE ATTRIBUTE #"0E" ?
 30                                ;*
 31   0A46    D3   46                      XRL     A,#AT0E
 32   0A48    96   51                      JNZ     NOT0E   ;NOT ATT# 0E
 33                                ;*
 34   0A4A    FB                   MOD0E:  MOV     A,R3    ;PARAM AGAIN
 35   0A4B    D3   20                      XRL     A,#20   ;WRT TO R/O BITS?
 36   0A4D    C6   53                      JZ      ENDMOD  ;NO - OK!
 37   0A4F    04   87                      JMP     ILLPAR  ;YES - ILL PARM
 38                                ;*
 39                                ; SOME ATT OTHER THAN 0E IS BEING
 40                                ;  CHANGED -- CHECK 0E FOR CORRECT
 41                                ;  SOFTWARE PROTOCOL
 42                                ;*
 43   0A51    54   57              NOT0E:  CALL    CHK0E
 44                                ;*
 45                                ; STORE POINTER FOR FUTURE
 46                                ;*
 47   0A53    FB                   ENDMOD: MOV     A,R3
 48   0A54    A1                           MOV     @R1,A
 49   0A55    64   92                      JMP     PAREND
 50                                ;*
 51                                ; CHECK THE CONTENTS OF ATT# 0E.
 52                                ; ASSUMES ATT TBL HAS ALREADY
 53                                ; BEEN MODIFIED
 54                                ;*
 55   0A57    B8   46              CHK0E:  MOV     R0,#AT0E
 56   0A59    F0                           MOV     A,@R0
 57   0A5A    B2   61                      J35     ERR0E   ;ERR IF BIT 5 SET
 58   0A5C    53   BF                      ANL     A,#0BF  ;ELSE, CLR BIT 6
 59   0A5E    A0                           MOV     @R0,A
 60   0A5F    44   6F                      JMP     CHKDON
 61                                ;*
 62   0A61    B0   10              ERR0E:  MOV     @R0,#10 ;SET #0E BIT 4
 63   0A63    B8   35                      MOV     R0,#SNS2 ;SENSE BYTE 2
 64   0A65    F0                           MOV     A,@R0
 65   0A66    43   20                      ORL     A,#20   ;SET TBL MOD BIT
 66   0A68    A0                           MOV     @R0,A
 67   0A69    23   20                      MOV     A,#20   ;SET SNS2 BIT
 68   0A6B    E5                           SEL     MB0     ;IN GENSTS &
 69   0A6C    94   00                      CALL    BERRON  ;SET ATTN
 70   0A6E    F5                           SEL     MB1
 71   0A6F    83                   CHKDON: RET
 72                                ;*
 73                                ; *** READ CONTROL CMD ***
 74                                ;*
 75   0A70    FB                   RC:     MOV     A,R3
 76                                ;*
 77                                ; ILLEGAL PARAMETER ?
 78                                ;*
 79   0A71    53   3F                      ANL     A,#3F
 80   0A73    C6   77                      JZ      RCOK
 81   0A75    04   87                      JMP     ILLPAR
 82                                ;*
```

```
83  0A77  FB                RCOK:   MOV    A,R3       ;PARAM AGN
84  0A78  B8    44                  MOV    R0,#IMREG1
85  0A7A  F2    85                  JB7    NOTNOM
86  0A7C  F0                        MOV    A,@R0      ;EARLY & LATE
87  0A7D  53    CF                  ANL    A,#0CF     ;STROBES OFF.
88  0A7F  A0                RC1:    MOV    @R0,A
89  0A80  B9    01                  MOV    R1,#1
90  0A82  91                        MOVX   @R1,A
91  0A83  64    92                  JMP    PAREND
92
93  0A85  D2    8E        NOTNOM:   JB6    STLT
94  0A87  F0                        MOV    A,@R0
95  0A88  53    EF                  ANL    A,#0EF     ;EARLY STROBE ON
96  0A8A  43    20                  ORL    A,#20      ;LATE STROBE OFF
97  0A8C  44    7F                  JMP    RC1
98
99  0A8E  F0                STLT:   MOV    A,@R0
100 0A8F  53    DF                  ANL    A,#0DF     ;EARLY STB OFF
101 0A91  43    10                  ORL    A,#10      ;LATE STROBE ON
102 0A93  44    7F                  JMP    RC1
```

SPIN CMD

```
 1                                 .SBTTL SPIN CMD
 2                          ;*
 3                          ;*** SPIN CONTROL CMD ***
 4                          ;*
 5  0A95  FB                SC:    MOV    A,R3       ;PARAMETER
 6                          ;*
 7                          ; ILLEGAL PARAMETER ?
 8                          ;*
 9  0A96  53    7F                  ANL    A,#7F
10  0A98  C6    9C                  JZ     SCOK
11  0A9A  04    87                  JMP    ILLPAR
12                          ;*
13  0A9C  B8    6F        SCOK:    MOV    R0,#SPNCON
14  0A9E  B0    01                  MOV    @R0,#1     ;SET FLAG
15  0AA0  FB                        MOV    A,R3       ;PARAMETER AGN
16  0AA1  F2    B8                  JB7    SPINON
17
18                          ;*
19                          ; IS DRIVE ALREADY STOPPED ?
20  0AA3  09                        IN     A,P1
21  0AA4  37                        CPL    A
22  0AA5  12    AC                  JB0    SC1
23  0AA7  23    FE                  MOV    A,#0FE
24  0AA9  39                        OUTL   P1,A       ;STOP SPDL
25  0AAA  44    BE                  JMP    SC2
26                          ;*
27  0AAC  B8    6F        SC1:     MOV    R0,#SPNCON
28  0AAE  B0    00                  MOV    @R0,#0
29  0AB0  E5                        SEL    MB0
30  0AB1  94    35                  CALL   SATTN
31  0AB3  F5                        SEL    MB1
32  0AB4  94    93                  CALL   NCOMP
33  0AB6  64    92                  JMP    PAREND
34
35                          ;*
36                          ; IS DRIVE ALREADY RUNNING ?
37  0AB8  09                SPINON: IN    A,P1
38  0AB9  12    AC                  JB0    SC1
39  0ABB  23    FF                  MOV    A,#0FF
40  0ABD  39                        OUTL   P1,A       ;START SPDL
41                          ;*
42  0ABE  64    87        SC2:     JMP    BRK3
```

LAT# & SET CYL CMDS

```
1                                  .SBTTL LAT# & SET CYL CMDS
2                          ;*
3                          ;*** LOAD ATTRIBUTE NUMBER CMD ***
4                          ;*
```

```
                                    ; OBTAIN DEVICE ATTRIBUTE TABLE POINTER
                                    ; & STORE IN (ATPNTR) FOR SUBSEQUENT
                                    ; LOAD OR REPORT ATTRIBUTE COMMAND
                                    ;*
                                    ; B7=1 -- ILLEGAL ATTRIBUTE #
                                    ; B6=1 -- FIXED TABLE (PROM)
                                    ; B5=1 -- NON-LOADABLE (RAM)
                                    ; B4=0
                                    ; B0 TO B3 -- TABLE OFFSET
                                    ;*
        0AC0    FB                  LDATN:  MOV     A,R3    ;PARM DATA-(ATT.#)
        0AC1    B8      4F                  MOV     R8,#ATPNTR
                                    ;*
                                    ; IS ATTRIB.# > 23 ?
                                    ;*
        0AC3    03      DC                  ADD     A,#0DC
        0AC5    E6      C9                  JNC     MAYBE
        0AC7    04      0F          BADAT:  JMP     ILLCMD
        0AC9    FB                  MAYBE:  MOV     A,R3    ;PARAM  AGN
        0ACA    E3                          MOVP3   A,@A
                                    ;*
                                    ; IS THIS A LEGAL ATTRIBUTE NUMBER ?
                                    ;*
        0ACB    F2      C7                  JB7     BADAT
        0ACD    A0                          MOV     @R0,A
        0ACE    64      92                  JMP     PARREND
                                    ;*
                                    ; *** SET CYL ADDR CMDS ***
                                    ;*
        0AD0    FB                  SLCA:   MOV     A,R3
        0AD1    B9      2D                  MOV     R1,#TCKDEM+1
        0AD3    A1                          MOV     @R1,A
        0AD4    64      92                  JMP     PARREND
                                    ;*
        0AD6    FB                  SHCA:   MOV     A,R3
        0AD7    B9      2C                  MOV     R1,#TCKDEM
        0AD9    A1                          MOV     @R1,A
        0ADA    64      92                  JMP     PARREND
```

SELECT MOVING HEAD CMD

```
                                            .SBTTL SELECT MOVING HEAD CMD
                                    ;*
                                    ; *** SELECT MOVING HEAD CMD ***
                                    ;*
                                    ;           3
                                    ; ------------- UPPER DISK
                                    ;           2
                                    ;                   DISK SURFACE #'S
                                    ;           1
                                    ; ------------- LOWER DISK
                                    ;           0
                                    ;*
                                    ; 8431 HEAD # TO SURFACE # TRANSLATION
                                    ;*
        0ADC    00                  HDTBL1: .BYTE   0       ;SURF 0
        0ADD    01                          .BYTE   1       ; "   1
                                    ;*
                                    ; 8432 HEAD # TO SURFACE # TRANSLATION
                                    ;*
        0ADE    02                  HDTBL2: .BYTE   2       ;SURF 0
        0ADF    01                          .BYTE   1       ; "   1
        0AE0    03                          .BYTE   3       ; "   2
        0AE1    00                          .BYTE   0       ; "   3
                                    ;*
        0AE2    64      09          FIX8:   JMP     BADHED
                                    ;*
        0AE4    09                  SELMH:  IN      A,P1
        0AE5    52      F0                  JB2     FOURHD
                                    ;*
        0AE7    FB                          MOV     A,R3
        0AE8    53      FE                  ANL     A,#0FE  ;HD ADR>1 ?
```

```
32  0AEA  96  E2              JNZ    FIX8
33  0AEC  B9  DC              MOV    R1,#HDTBL1&0FF
34  0AEE  44  F7              JMP    GUDHED
35                      ;*
36  0AF0  FB          FOURHD: MOV    A,R3
37  0AF1  53  FC              ANL    A,#0FC  ;MORE THAN
38  0AF3  96  E2              JNZ    FIX8    ;4 HEADS ?
39  0AF5  B9  DE              MOV    R1,#HDTBL2&0FF
40                      ;*
41  0AF7  FB          GUDHED: MOV    A,R3    ;GET HD #
42  0AF8  69                  ADD    A,R1
43  0AF9  A3                  MOVP   A,@A    ;GET SURFACE #
44                      ;*
45  0AFA  77                  RR     A       ;PUT INTO PORT
46  0AFB  77                  RR     A       ;BITS
47  0AFC  AB                  MOV    R3,A
48  0AFD  B8  44              MOV    R0,#IMREG1
49  0AFF  F0                  MOV    A,@R0
50  0B00  53  3F              ANL    A,#3F
51  0B02  4B                  ORL    A,R3
52  0B03  A0                  MOV    @R0,A
53  0B04  B9  01              MOV    R1,#1   ;WRITE TO PORT
54  0B06  91                  MOVX   @R1,A
55  0B07  64  92              JMP    PAREND
56                      ;*
57  0B09  84  87      BADHED: JMP    ILLPAR
```

WRITE CONTROL CMD

```
 1
 2                              .SBTTL  WRITE CONTROL CMD
 3                      ;*
 4                      ; *** WRITE CONTROL CMD ***
 5  0B0B  FB            ;*
 6                      WRTCON: MOV    A,R3    ;PARAMETER
 7                      ;*
 8                      ; ILLEGAL PARAMETER?
 9  0B0C  53  7F        ;*
10  0B0E  C6  14                ANL    A,#7F
11  0B10  84  87                JZ     WRTOK
12                              JMP    ILLPAR
13  0B12  00            ;*
14  0B13  00                    NOP            ;ASSEMBLER FIX
15                              NOP
16  0B14  FB            ;*
17  0B15  F2  1E        WRTOK:  MOV    A,R3    ;PARAM AGN
18                              JB7    WE
19                      ;*
20                      ; DISABLE WRITE
21  0B17  B8  65        ;*
22  0B19  F0                    MOV    R0,#WRTFLG
23  0B1A  43  01                MOV    A,@R0
24  0B1C  64  23                ORL    A,#1    ;SET FLAG
25                              JMP    WCONT
26                      ;*
27                      ; ENABLE WRITE
28  0B1E  B8  65        ;*
29  0B20  F0            WE:     MOV    R0,#WRTFLG
30  0B21  53  FE                MOV    A,@R0
31  0B23  A0                    ANL    A,#0FE  ;RESET FLAG
32  0B24  E5            WCONT:  MOV    @R0,A
33  0B25  34  D7                SEL    M B0
34  0B27  F5                    CALL   WRTSTS  ;DO EVERYTHING
35  0B28  64  92                SEL    MB1
                                JMP    PAREND
```

ATCNTL, R/W PERM & TESTB CMDS

```
 1
 2                              .SBTTL  ATCNTL, R/W PERM & TESTB
 3                      ;*
 4                      ; *** ATTENTION CONTROL CMD ***
 5  0B2A  FB            ;*
 6                      ATTCON: MOV    A,R3
                        ;*
```

```
  7                             ; ILLEGAL PARAMETER ?
  8                             ;*
  9    0B2B    53    7F                 ANL     A,#7F
 10    0B2D    C6    31                 JZ      ATTOK
 11    0B2F    84    87                 JMP     ILLPAR
 12                             ;*
 13    0B31    FB              ATTOK:   MOV     A,R3      ;PARAM  AGN
 14    0B32    37                       CPL     A
 15    0B33    B8    43                 MOV     R0,#IMPRT2
 16    0B35    F2    3E                 JB7     AE
 17    0B37    F0                       MOV     A,@R0
 18    0B38    53    FD                 ANL     A,#0FD    ;ATTN DISABLE
 19    0B3A    A0              AE1:     MOV     @R0,A
 20    0B3B    3A                       OUTL    P2,A
 21    0B3C    64    92                 JMP     PAREND
 22                             ;*
 23    0B3E    F0              AE:      MOV     A,@R0
 24    0B3F    43    02                 ORL     A,#2      ;ATTN ENABLE
 25    0B41    64    3A                 JMP     AE1
 26                             ;*
 27                             ; *** SET WRITE PERMIT ADDR CMDS ***
 28                             ;*
 29    0B43    B9    36         SWPH:   MOV     R1,#WPERM
 30    0B45    FB              SWPH1:   MOV     A,R3      ;SET WRITE
 31    0B46    A1                       MOV     @R1,A     ;PERMIT HIGH.
 32    0B47    E5                       SEL     MB0
 33    0B48    34    A6                 CALL    RWPERM
 34    0B4A    F5                       SEL     MB1
 35    0B4B    64    92                 JMP     PAREND
 36
 37    0B4D    B9    37         SWPL:   MOV     R1,#WPERM+1 ;SET WRITE
 38    0B4F    64    45                 JMP     SWPH1     ;PERMIT LOW
 39                             ;*
 40                             ; *** SET READ PERMIT ADDR CMDS ***
 41                             ;*
 42    0B51    B9    38         SRPH:   MOV     R1,#RPERM ;SET READ
 43    0B53    64    45                 JMP     SWPH1     ;PERMIT HIGH
 44                             ;*
 45    0B55    B9    39         SRPL:   MOV     R1,#RPERM+1
 46    0B57    64    45                 JMP     SWPH1
 47                             ;*
 48                             ; *** SET TEST BYTE CMD ***
 49                             ;*
 50    0B59    B9    3A         STB:    MOV     R1,#TEST  ;SET TEST
 51    0B5B    64    45                 JMP     SWPH1     ;BYTE
```

SECTOR CMDS & TEMP CMD

```
  1                                              .SBTTL SECTOR CMDS & TEMP CMD
  2
  3                             ;*
  4                             ; *** LOAD BYTES PER SECTOR CMDS ***
  5    0B5D    FB              LBPSHI:  MOV     A,R3
  6    0B5E    B9    51                 MOV     R1,#TRACK
  7    0B60    A1                       MOV     @R1,A
  8    0B61    64    92                 JMP     PAREND
  9                             ;*
 10    0B63    FB              LBPSMD:  MOV     A,R3
 11    0B64    B9    52                 MOV     R1,#TRACK+1
 12    0B66    A1                       MOV     @R1,A
 13    0B67    64    92                 JMP     PAREND
 14
 15    0B69    FB              LBPSLO:  MOV     A,R3
 16    0B6A    B9    53                 MOV     R1,#TRACK+2
 17    0B6C    A1                       MOV     @R1,A
 18    0B6D    64    92                 JMP     PAREND
 19
 20                             ;*
 21                             ; *** SET SECT PULSES PER TRK CMDS ***
 22    0B6F    FB              LSPPTH:  MOV     A,R3
 23    0B70    B9    54                 MOV     R1,#TRACK+3
 24    0B72    A1                       MOV     @R1,A
```

```
25  0B73    64  92                      JMP     PAREND
26                              ;*
27  0B75    FB              LSPPTM: MOV     A,R3
28  0B76    B9  55                  MOV     R1,#TRACK+4
29  0B78    A1                      MOV     @R1,A
30  0B79    64  92                  JMP     PAREND
31                              ;*
32  0B7B    FB              LSPPTL: MOV     A,R3
33  0B7C    B9  56                  MOV     R1,#TRACK+5
34  0B7E    A1                      MOV     @R1,A
35  0B7F    64  92                  JMP     PAREND
36                              ;*
37                              ; *** REPORT DRIVE TEMP CMD ***
38                              ;*
39                              ; SELECT MUX POLE
40                              ;*
41  0B81    E5              RPTEMP: SEL     M30
42  0B82    F4  0A                  CALL    TEMUP
43  0B84    F5                      SEL     M31
44  0B85    64  8D                  JMP     BAK2
```

PARAMETER END - BUS.ACK

```
                                        .SBTTL PARAMETER END - BUS.ACK
 1                              ;*
 2                              ; COMPLETE HANDSHAKE FOR PARAMETER BYTE
 3                              ;*
 4                              ; SET BUSY
 5                              ;*
 6
 7  0B87    E5              BAK3:   SEL     M30
 8  0B88    94  2D                  CALL    SBUSY
 9  0B8A    F5                      SEL     M31
10                              ;*
11                              ; REPORT GENERAL STATUS
12                              ;*
13  0B8B    B8  33          BAK5:   MOV     R0,#GENSTS
14                              ;*
15                              ; "BAK2" EXPECTS (R0) TO POINT TO
16                              ; DATA MEMORY LOCATION WHOSE
17                              ; CONTENTS IS TO BE REPORTED
18                              ; TO CONTROLLER
19                              ;*
20  0B8D    F0              BAK2:   MOV     A,@R0    ;(GENSTS) TO A
21  0B8E    B9  00          BAK4:   MOV     R1,#0    ;"PARAMETER IN"
22  0B90    37                      CPL     A
23  0B91    91                      MOVX    @R1,A    ;TO CONTROLLER.
24                              ;*
25  0B92    B8  43          PAREND: MOV     R0,#IMPRT2
26  0B94    F0                      MOV     A,@R0
27  0B95    43  08                  ORL     A,#8
28  0B97    3A                      OUTL    P2,A     ;BUS ACK ON
29                              ;*
30  0B98    09              PE:     IN      A,P1     ;WAIT FOR
31  0B99    B2  98                  JB5     PE       ;PARM END
32                              ;*
33  0B9B    F0                      MOV     A,@R0    ;BUS ACK. OFF
34  0B9C    3A                      OUTL    P2,A
35                                                   ;NOW GO LOOK FOR
36                                                   ;TD CMD EXECUTIO
```

TIME DEPENDENT CMDS - INIT

```
                                        .SBTTL TIME DEPENDENT CMDS - INI
 1                              ;*********************************
 2                              ;*
 3                              ; EXECUTE TIME DEPENDENT CMD
 4                              ;*
 5                              ;*********************************
 6                              ;*
 7                              ; INITIALIZATION REQ'ED ?
 8                              ;*
 9
10  0B9D    B8  68                  MOV     R0,#INITFG
```

| | | | | | | |
|---|---|---|---|---|---|---|
| 11 | 0B9F | F0 | | | MOV | A,@R0 |
| 12 | 0BA0 | C6 | AB | | JZ | NOINIT |
| 13 | | | | ;* | | |
| 14 | | | | ; PULSE THE RESET LINE, THEN SET BUSY | | |
| 15 | | | | ;* | | |
| 16 | 0BA2 | 23 | C0 | | MOV | A,#0C0   ;FLTRES & RST ON |
| 17 | 0BA4 | 3A | | | OUTL | P2,A |
| 18 | 0BA5 | 23 | 22 | | MOV | A,#022   ;RESETS OFF, BUS |
| 19 | 0BA7 | 3A | | | OUTL | P2,A    ;RDEN & ATTEN ON |
| 20 | 0BA8 | E5 | | | SEL | MB0 |
| 21 | 0BA9 | A4 | 5E | | JMP | START2 |

TD CMDS - SPIN

| | | | | | | |
|---|---|---|---|---|---|---|
| 1 | | | | | .SBTTL TD CMDS - SPIN | |
| 2 | | | | ;* | | |
| 3 | | | | ; ARE WE IN SPIN CONTROL ? | | |
| 4 | | | | ;* | | |
| 5 | 0BAB | B8 | 6F | NOINIT: | MOV | R0,#SPNCON |
| 6 | 0BAD | F0 | | | MOV | A,@R0 |
| 7 | 0BAE | C6 | ED | | JZ | NOSPIN |
| 8 | 0BB0 | B0 | 00 | | MOV | @R0,#0  ;CLR FLAG |
| 9 | | | | ;* | | |
| 10 | 0BB2 | FB | | | MOV | A,R3    ;SPIN UP OR DN? |
| 11 | 0BB3 | 96 | CA | | JNZ | SPUP    ;JMP IF UP |
| 12 | | | | ;* | | |
| 13 | | | | ; WAIT 45 SECONDS FOR SPIN DOWN | | |
| 14 | | | | ;* | | |
| 15 | 0BB5 | B8 | 20 | | MOV | R0,#DELMLT |
| 16 | 0BB7 | B0 | AF | | MOV | @R0,#0AF |
| 17 | 0BB9 | 18 | | | INC | R0 |
| 18 | 0BBA | B0 | C8 | | MOV | @R0,#0C8 |
| 19 | 0BBC | E5 | | | SEL | MB0 |
| 20 | 0BBD | 94 | 79 | | CALL | DELAY |
| 21 | 0BBF | 94 | 3C | | CALL | CBUSY |
| 22 | 0BC1 | 14 | 6F | | CALL | NOTRDY |
| 23 | 0BC3 | 94 | 35 | | CALL | SATTN |
| 24 | 0BC5 | F5 | | | SEL | MB1 |
| 25 | 0BC6 | 94 | 93 | | CALL | NCOMP |
| 26 | 0BC8 | 64 | E9 | | JMP | ENDSPN |
| 27 | | | | ;* | | |
| 28 | | | | ; WAIT FOR SPINDLE UPS, THEN | | |
| 29 | | | | ; CLEAR "HOT-READY" BIT IN (GENSTS) | | |
| 30 | | | | ; IF SPINDLE IS SPINNING | | |
| 31 | | | | ; ELSE, REVERT TO NORMAL ERRORS | | |
| 32 | | | | ;* | | |
| 33 | 0BCA | E5 | | SPUP: | SEL | MB0 |
| 34 | 0BCB | B4 | 10 | | CALL | CHKSPN |
| 35 | 0BCD | F5 | | | SEL | MB1 |
| 36 | 0BCE | B8 | 71 | | MOV | R0,#SPABRT |
| 37 | 0BD0 | F0 | | | MOV | A,@R0 |
| 38 | 0BD1 | C6 | DB | | JZ | SPOK |
| 39 | | | | ;* | | |
| 40 | 0BD3 | E5 | | | SEL | MB0   ;PROBLEM WITH |
| 41 | 0BD4 | 14 | 05 | | CALL | DMFLT ;SPIN-UP |
| 42 | 0BD6 | 94 | 3C | | CALL | CBUSY |
| 43 | 0BD8 | F5 | | | SEL | MB1 |
| 44 | 0BD9 | 64 | E9 | | JMP | ENDSPN |
| 45 | | | | ;* | | |
| 46 | 0BDB | B8 | 33 | SPOK: | MOV | R0,#GENSTS |
| 47 | 0BDD | F0 | | | MOV | A,@R0 |
| 48 | 0BDE | 53 | FE | | ANL | A,#0FE |
| 49 | 0BE0 | A0 | | | MOV | @R0,A |
| 50 | 0BE1 | E5 | | | SEL | MB0 |
| 51 | 0BE2 | 94 | 3C | | CALL | CBUSY |
| 52 | 0BE4 | 94 | A0 | | CALL | READY |
| 53 | 0BE6 | F5 | | | SEL | MB1 |
| 54 | 0BE7 | 94 | 93 | FIXA: | CALL | NCOMP |
| 55 | 0BE9 | 04 | 79 | ENDSPN: | JMP | ENDTD |

TD CMDS - SEEK

```
                                  .SBTTL TD CMDS - SEEK
                              ;*
                              ; SEEK REQ'ED ?
                              ;*
    0BEB    84    09      FIX1:   JMP     NOSEEK
                              ;*
    0BED    B8    66      NOSPIN: MOV     R0,#SEEK
    0BEF    F0                    MOV     A,@R0
    0BF0    C6    EB              JZ      FIX1
    0BF2    B0    00              MOV     @R0,#0
                              ;*
    0BF4    E5                    SEL     M30
    0BF5    94    4A              CALL    DIRTST  ;NO SEEK IF A=0
    0BF7    F5                    SEL     M31
    0BF8    C6    E7              JZ      FIXA    ;DONSK FIX
                              ;*
    0BFA    E5                    SEL     M30
    0BFB    14    7A              CALL    MOVE    ;DO SEEK
    0BFD    F5                    SEL     M31
                              ;*
                              ; WAS SEEK ABORTED ?
                              ;*
    0BFE    B8    72              MOV     R0,#SKABRT
    0C00    F0                    MOV     A,@R0
    0C01    C6    05              JZ      DONSK
    0C03    84    81              JMP     BADSK
                              ;*
    0C05    94    93      DONSK:  CALL    NCOMP
    0C07    84    79              JMP     ENDTD
```

TD CMDS - LANDING ZONE

```
                                  .SBTTL TD CMDS - LANDING ZONE
                              ;*
                              ; LANDING ZONE REQ'ED ?
                              ;*
    0C09    B8    6A      NOSEEK: MOV     R0,#LNDFLG
    0C0B    F0                    MOV     A,@R0
    0C0C    C6    2E              JZ      NOLAND
    0C0E    B0    00              MOV     @R0,#0
                              ;*
                              ; ARE WE ALREADY THERE ?
                              ;*
    0C10    B8    70              MOV     R0,#INLAND
    0C12    F0                    MOV     A,@R0
    0C13    96    2A              JNZ     ENDLZ
                              ;*
    0C15    E5                    SEL     M30
    0C16    D4    BF              CALL    LNDZN1
    0C18    F5                    SEL     M31
    0C19    B8    72              MOV     R0,#SKABRT
    0C1B    F0                    MOV     A,@R0
    0C1C    96    81              JNZ     BADSK
                              ;*
    0C1E    E5                    SEL     M30
    0C1F    94    3C              CALL    CBUSY
    0C21    23    01              MOV     A,#1
    0C23    94    00              CALL    BERRON
    0C25    94    A0              CALL    READY
    0C27    94    BA              CALL    ATTNQ
    0C29    F5                    SEL     M31
    0C2A    94    93      ENDLZ:  CALL    NCOMP
    0C2C    84    79              JMP     ENDTD
```

TD CMDS - REZERO

```
                                  .SBTTL TD CMDS - REZERO
                              ;*
                              ; REZERO REQ'ED ?
                              ;*
```

| Line | Addr | B1 | B2 | Label | Op | Operand | Comment |
|---|---|---|---|---|---|---|---|
| 5 | 0C2E | B8 | 67 | NOLAND: | MOV | R0,#REZERO | ;HOME ROUTINE |
| 6 | 0C30 | F0 | | | MOV | A,@R0 | ;REQUIRED ? |
| 7 | 0C31 | C6 | 5D | | JZ | NOHM | |
| 8 | 0C33 | B0 | 00 | | MOV | @R0,#0 | |
| 9 | | | | ;* | | | |
| 10 | 0C35 | E5 | | | SEL | M30 | |
| 11 | 0C36 | 54 | 20 | | CALL | HOME | ;DO HOME |
| 12 | 0C38 | F5 | | | SEL | M31 | |
| 13 | 0C39 | B8 | 72 | | MOV | R0,#SKABRT | |
| 14 | 0C3B | F0 | | | MOV | A,@R0 | |
| 15 | 0C3C | 96 | 81 | | JNZ | BADSK | ;JMP IF BAD SK |
| 16 | | | | ;* | | | |
| 17 | | | | ; CLEAR "SEEK-ERROR" IN SENSE1 | | | |
| 18 | | | | ;* | | | |
| 19 | 0C3E | B8 | 33 | | MOV | R0,#GENSTS | |
| 20 | 0C40 | B9 | 34 | | MOV | R1,#SNS1 | |
| 21 | 0C42 | F1 | | | MOV | A,@R1 | |
| 22 | 0C43 | 53 | FE | | ANL | A,#0FE | ;SK ERR BIT |
| 23 | 0C45 | A1 | | | MOV | @R1,A | |
| 24 | | | | ;* | | | |
| 25 | | | | ; CHECK IF SNS1 IN GENSTS NEEDS | | | |
| 26 | | | | ; UPDATING | | | |
| 27 | | | | ;* | | | |
| 28 | 0C46 | 96 | 4C | | JNZ | NOL1 | |
| 29 | 0C48 | F0 | | | MOV | A,@R0 | |
| 30 | 0C49 | 53 | EF | | ANL | A,#0EF | ;CLR SNS1 BIT |
| 31 | 0C4B | A0 | | | MOV | @R0,A | |
| 32 | | | | ;* | | | |
| 33 | | | | ; CLEAR "NOT-READY" IF (FLTSTS)=0 | | | |
| 34 | | | | ;* | | | |
| 35 | 0C4C | B9 | 32 | NOL1: | MOV | R1,#FLTSTS | |
| 36 | 0C4E | F1 | | | MOV | A,@R1 | |
| 37 | 0C4F | 96 | 59 | | JNZ | NOL2 | |
| 38 | 0C51 | F0 | | | MOV | A,@R0 | |
| 39 | 0C52 | 53 | FE | | ANL | A,#0FE | ;NOT-RDY BIT |
| 40 | 0C54 | A0 | | | MOV | @R0,A | |
| 41 | 0C55 | E5 | | | SEL | M30 | |
| 42 | 0C56 | 94 | A0 | | CALL | READY | |
| 43 | 0C58 | F5 | | | SEL | M31 | |
| 44 | | | | ;* | | | |
| 45 | 0C59 | 94 | 93 | NOL2: | CALL | NCOMP | |
| 46 | 0C5B | 84 | 79 | | JMP | ENDTD | |

TD CMDS - PARTITION TRK

| Line | Addr | B1 | B2 | Label | Op | Operand | Comment |
|---|---|---|---|---|---|---|---|
| 1 | | | | | .SBTTL | TD CMDS - PARTITION TRK | |
| 2 | | | | ;* | | | |
| 3 | | | | ; PARTITION TRACK REQ'ED ? | | | |
| 4 | | | | ;* | | | |
| 5 | 0C5D | B8 | 6B | NOHM: | MOV | R0,#MATFLG | |
| 6 | 0C5F | F0 | | | MOV | A,@R0 | ;RE-FORMAT? |
| 7 | 0C60 | C6 | 7E | | JZ | NOFORM | |
| 8 | 0C62 | B0 | 00 | | MOV | @R0,#0 | |
| 9 | | | | ;* | | | |
| 10 | | | | | .IF GT | NEWALG | |
| 11 | 0C64 | 94 | A9 | | CALL | ALGOR1 | |
| 12 | | | | | .IFF | | |
| 13 | | | | | CALL | ALGOR | |
| 14 | | | | | .ENDC | | |
| 15 | 0C66 | E5 | | | SEL | M30 | |
| 16 | 0C67 | 94 | E1 | | CALL | INCNTR | |
| 17 | | | | ;* | | | |
| 18 | | | | ; WAIT A REVOLUTION | | | |
| 19 | | | | ;* | | | |
| 20 | 0C69 | B8 | 20 | | MOV | R0,#DELMLT | ;WAIT 20MS |
| 21 | 0C6B | B0 | 00 | | MOV | @R0,#0 | ;FOR NEXT |
| 22 | 0C6D | 18 | | | INC | R0 | ;INDEX |
| 23 | 0C6E | B0 | 14 | | MOV | @R0,#^D20 | |
| 24 | 0C70 | 94 | 79 | | CALL | DELAY | |
| 25 | | | | ;* | | | |
| 26 | | | | ; UP-DATE ATTRIBUTE TABLE | | | |
| 27 | | | | ;* | | | |

```
28   0C72   F5                    SEL    M31
29   0C73   54   57               CALL   CHK0E
30                         ;*
31   0C75   94   93               CALL   NCOMP
32   0C77   84   79               JMP    ENDTD
```

END OF TD CMDS, BADSK, ILL PARM & CMD

```
 1                                       .SBTTL END OF TD CMDS, BADSK, IL
 2                         ;*
 3                         ;*********************************
 4                         ;*
 5                         ; END OF TIME DEPENDENT CMDS
 6                         ;*
 7                         ;*********************************
 8                         ;*
 9   0C79   E5             ENDTD:  SEL    M30
10   0C7A   94   3C                CALL   CBUSY
11   0C7C   94   35                CALL   SATTN
12   0C7E   E5             NOFORM: SEL    M30
13   0C7F   C4   08                JMP    LOOP
14                         ;*
15                         ; BAD SEEK SETS APPROPRIATE STATUS
16                         ;   THEN REVERTS TO NORMAL FAULT
17                         ;   ROUTINE
18                         ;*
19   0C81   B0   00        BADSK:  MOV    @R0,#0    ;CLR SKABRT
20   0C83   94   9A                CALL   SKERR
21   0C85   84   7E                JMP    NOFORM
22                         ;*
23                         ;*********************************
24                         ;*
25                         ; ILLEGAL PARAMETER SERVICE
26                         ;*
27   0C87   23   08        ILLPAR: MOV    A,#8      ;ILLEG PARM
28   0C89   E5             ILLSRV: SEL    M30
29   0C8A   94   00                CALL   BERRON
30   0C8C   F5                     SEL    M31
31   0C8D   64   92                JMP    PAREND
32                         ;*
33                         ; ILLEGAL CMD SERVICE
34                         ;*
35   0C8F   23   04        ILLCMD: MOV    A,#4      ;ILLEG CMD
36   0C91   84   89                JMP    ILLSRV
37                         ;*
38                         ; NORMAL COMPLETE S/R
39                         ;*
40   0C93   B8   33        NCOMP:  MOV    R0,#GENSTS
41   0C95   F0                     MOV    A,@R0
42   0C96   43   80                ORL    A,#80
43   0C98   A0                     MOV    @R0,A
44   0C99   83                     RET
45                         ;*
46                         ; SET SEEK ERROR & CMD REJ BITS
47                         ;*
48   0C9A   E5             SKERR:  SEL    M30
49   0C9B   94   3C                CALL   CBUSY
50   0C9D   23   10                MOV    A,#10     ;SNS1
51   0C9F   94   00                CALL   BERRON
52   0CA1   F5                     SEL    M31
53   0CA2   B8   34                MOV    R0,#SNS1
54   0CA4   F0                     MOV    A,@R0
55   0CA5   43   21                ORL    A,#21     ;CMD RJ &
56   0CA7   A0                     MOV    @R0,A     ; SK ERR
57   0CA8   83                     RET
```

SECTOR ALGORITHMS (2)

```
 1                                       .SBTTL SECTOR ALGORITHMS (2)
 2                                       .IF GT NEWALG
 3                         ;*
 4                         ; THIS ALGOR IS TO BE USED FOR REV. 2.0
```

```
  5                              ;  AND BEYOND FIRMWARE WITH CARDS USING
  6                              ;  BYTE-CLK (NOT 2MHZ CLK) FOR SECTORS
  7                              ;*
  8    0CA9    B8    63          ALGOR1: MOV    R0,#DIVTBL
  9    0CAB    B9    52                  MOV    R1,#TRACK+1
 10    0CAD    F1                        MOV    A,@R1
 11    0CAE    A0                        MOV    @R0,A
 12    0CAF    18                        INC    R0
 13    0CB0    19                        INC    R1
 14    0CB1    F1                        MOV    A,@R1
 15    0CB2    A0                        MOV    @R0,A
 16    0CB3    83                        RET
 17                                      .IFTF
```

SECTOR ALGORITHMS (2)

```
                                         .IFF
                                 ;*
                                 ;  ALGOR PERFORMS THE FOLLOWING:
                                 ;*
                                 ;  (2710*BPS/123B)    BASE 16
                                 ;  (10000*BPS/4667)   BASE 10
                                 ;  (# BYTES/SECTOR -- HEX) =
                                 ;  # OF 0.5 MICROSECOND INTERVALS
                                 ;*
                                 ;  CLEAR (XTRA) -- JUST IN CASE
                                 ;*
                                 ALGOR:  MOV    R0,#XTRA
                                         MOV    @R0,#0
                                 ;*
                                 ;  STORE MULTIPLIER MINUS 1
                                 ;*
                                         MOV    R0,#MLTCNT
                                         MOV    @R0,#27
                                         INC    R0
                                         MOV    @R0,#0F
                                         CALL   MULT
                                 ;*
                                 ;  STORE 2'S COMP OF 123BH
                                 ;*
                                         MOV    R0,#DIVZOR+2
                                         MOV    @R0,#0ED
                                         INC    R0
                                         MOV    @R0,#0C5
                                         CALL   DIVID
                                 ;*
                                 ;  TRANSFER TO (DIVTBL)
                                 ;*
                                         MOV    R0,#DIVTBL
                                         MOV    R1,#DIVRES
                                         MOV    A,@R1
                                         MOV    @R0,A
                                         INC    R0
                                         INC    R1
                                         MOV    A,@R1
                                         MOV    @R0,A
                                 ;*
                                         RET                    ;DONE
                                         .IFTF
```

SECTOR ALGORITHMS (2)

```
                                         .IFF
                                         .IF LT .-0D00
                                         . = 0D00
                                         .IFF
                                 AAAPAG = 1
                                         .ENDC
                                 ;*
                                 ;  MULTIPLY 4 BYTE QUANTITY IN (XTRA)
                                 ;  (INCLUDES 3 BYTES OF BPS FROM HOST)
```

```
;  BY 2 BYTE QUANTITY IN (MLTCNT)
;*
MULT:   MOV     R2,#4    ;CLEAR 4 BYTES
        CLR     A
        MOV     R0,#RESULT
MULT1:  MOV     @R0,A
        INC     R0
        DJNZ    R2,MULT1
;*
; ADD 4 BYTE QUANTITY IN (XTRA)
;   TO (RESULT) 2710H TIMES
;*
MULT2:  MOV     R2,#4    ;BYTE COUNT
        MOV     R0,#RESULT+3  ;LS BYTE
        MOV     R1,#XTRA+3
        MOV     A,@R1
        MOV     R3,A
        MOV     A,@R0
;*
; PERFORM 4 BYTE ADDITION
;*
NOCY:   ADD     A,R3
        MOV     @R0,A    ;PARTIAL PRODUCT
        JMP     NOCY1
;*
YESCY:  ADDC    A,R3
        MOV     @R0,A
NOCY1:  DEC     R2
        MOV     A,R2
        JZ      ENDADD
        DEC     R0
        DEC     R1
        MOV     A,@R1
        MOV     R3,A
        MOV     A,@R0
        JNC     NOCY
        JMP     YESCY
;*
; DO 2710 ADDITIONS
;*
ENDADD: MOV     R2,#4    ;RESTORE COUNT
        MOV     R0,#MLTCNT+1
        MOV     A,@R0
        ADD     A,#0FF   ;MINUS ONE
        MOV     @R0,A
        JNC     BORROW
        JMP     ENDEC
BORROW: DEC     R0
        MOV     A,@R0
        JZ      MLTDUN
        ADD     A,#0FF   ;MINUS ONE
        MOV     @R0,A
ENDEC:  JMP     MULT2
MLTDUN: RET
        .PAGE
;*
; DIVIDE 4 BYTE QUANTITY IN (RESULT) BY
; 4 BYTE QUANTITY IN (DIVZOR) -- PLACE
; RESULT IN (DIVRES)
;*
DIVID:  MOV     R0,#DIVRES ;CLR (DIVRES)
        CLR     A
        MOV     @R0,A
        INC     R0
        MOV     @R0,A
;*
; STORE 2'S COMP OF HIGH ORDER
; DIVISOR BYTES
;*
        MOV     R1,#DIVZOR
        MOV     @R1,#0FF
        INC     R1
```

```
 82                                      MOV      @R1,#0FF
 83                              ;*
 84                              DIVID1:  MOV      R2,#4
 85                                       MOV      R0,#RESULT+3
 86                                       MOV      R1,#DIVZOR+3
 87                                       MOV      A,@R0
 88                                       MOV      R3,A
 89                                       MOV      A,@R1
 90                              ;*
 91                              NOCY2:   ADD      A,R3
 92                                       MOV      @R0,A      ;STORE PARTIAL
 93                                       JMP      NOCY3
 94                              YESCY1:  ADDC     A,R3
 95                                       MOV      @R0,A
 96                              NOCY3:   DEC      R2
 97                                       MOV      A,R2
 98                                       JZ       ENDSUB
 99                                       DEC      R0
100                                       DEC      R1
101                                       MOV      A,@R0
102                                       MOV      R3,A
103                                       MOV      A,@R1
104                                       JNC      NOCY2
105                                       JMP      YESCY1
106                              ;*
107                              ; TEST END-OFF CARRY
108                              ;*
109                              ENDSUB:  MOV      R2,#4
110                                       JNC      ENDIV
111                              ;*
112                              ; ELSE INCREMENT TALLY IN (DIVRES)
113                              ;*
114                              INC:     MOV      R0,#DIVRES+1
115                                       MOV      A,@R0
116                                       ADD      A,#1
117                                       MOV      @R0,A
118                                       JNC      INC1
119                                       DEC      R0
120                                       INC      @R0
121                              INC1:    JMP      DIVID1
122                              ;*
123                              ENDIV:   RET
124                                       .ENDC
125
126                              ;*
127                              ;*
128                              ;*
129                              ;*
130                              ;*
131  0CB4        00                       .BYTE    0  ;END-OF-PROG
132              0001                     .END
```

SYMBOL TABLE

| AAAPAG= | 0000 | DECNT | 0543 | FORMAT | 04CC | MORE | |
|---|---|---|---|---|---|---|---|
| ACCT | 00DE | DECSPS | 0359 | FORM1 | 04D4 | OTOR | |
| ACCTBL | 0345 | DELAY | 0479 | FOR1 | 0462 | OVDEL | M |
| ACLOOP | 00D3 | DELMLT | 0020 | FOUR | 0595 | OVE | M |
| ADCONV | 02B1 | DELUP | 0480 | FOURHD | 0AF0 | OVEND | M |
| AE | 0B3E | DIRT | 044C | GENSTS | 0033 | OVE1 | M |
| AE1 | 0B3A | DIRTST | 044A | GETOFF | 073C | OVE2 | M |
| ALGOR1 | 0CA9 | DIR1 | 0450 | GETOF1 | 0743 | OVFIN | M |

| | | | | | | |
|---|---|---|---|---|---|---|
| OVSIZ | ALIVE | 0525 | DIVRES | 005B | GS | 098A | M |
| OV1 | ATPNTR | 004F | DIVTBL | 0063 | GUDHED | 0AF7 | M |
| TRDEL | ATTCON | 0B2A | DIVZOR | 005F | GUDSPD | 0558 | M |
| UXSEL | ATTFLG | 006D | DLY1MS | 074F | HDTBL1 | 0ADC | M |
| COMP | ATTNQ | 04BA | DMDATA | 046F | HDTBL2 | 0ADE | N |
| EG | ATTOK | 0B31 | DMFLT | 0005 | HEDDIR | 0025 | N |
| EWALG= | AT0E | 0046 | DO | 0067 | HMCON | 0245 | N |
| EWOFF | BA | 066E | DOFF | 0714 | HOME | 0220 | N |
| IBLOC | BADAD | 08F9 | DOIT | 012B | HOME1 | 024D | N |
| IBTBL | BADAT | 0AC7 | DOIT1 | 0134 | HOMREQ | 0069 | N |
| O | BADFOR | 0A02 | DOMOVE | 0084 | ILCMDI | 06BA | N |
| OBOR | BADHED | 0B09 | DONSK | 0C85 | ILLCMD | 0C8F | N |
| OCAN | BADHM | 02AC | DORD | 01C0 | ILLCOM | 06B7 | N |
| OFORM | BADNUM | 0A20 | DOTIME | 0635 | ILLPAR | 0C87 | N |
| OHM | BADRPT | 09D3 | DSUB | 0465 | ILLSRV | 0C89 | N |
| OINIT | BADSK | 0C81 | DUMMY | 003F | IMPRT2 | 0043 | N |
| OINST | BADSPD | 0554 | ENDCF | 0954 | IMREG1 | 0044 | N |
| OLAND | BAK2 | 0B8D | ENDLY | 048C | INCNTR | 04E1 | N |
| OLOAD | BAK3 | 0B87 | ENDLZ | 0C2A | INITFG | 0068 | N |
| OLZ | BAK4 | 0B8E | ENDMOD | 0A53 | INLAND | 0070 | N |
| OL1 | BAK5 | 0B8B | ENDMOV | 014C | INTBL | 021F | N |
| OL2 | BEGIN | 0000 | ENDR | 04B9 | ISATE | 028B | N |
| OSEEK | BERRON | 0400 | ENDSPN | 0BE9 | ISATE1 | 02A3 | N |
| OSPD | BUSACK | 0668 | ENDST | 0603 | JMPDCL | 00ED | N |
| OSPIN | BUSER1 | 06AA | ENDSTP | 049F | JMPHOM | 0289 | N |
| OTNOM | BUSER2 | 06B0 | ENDTD | 0C79 | JMPLUP | 0116 | N |
| OTRDY | CARRY | 00BC | EQ | 0A1B | JT | 0871 | N |
| OT0E | CATN | 0956 | EQ1 | 0A19 | LAND | 01A5 | N |
| OWPS | CATN1 | 0966 | ERR | 08CD | LBPSHI | 0B5D | N |
| C | CATN2 | 096A | ERR0E | 0A61 | LBPSLO | 0B69 | O |
| FFCOD | CATTN | 0443 | ERR1 | 000F | LBPSMD | 0B63 | O |
| FFTBL | CBUSY | 043C | ERR2 | 0011 | LDAT | 0A38 | O |
| KINST | CFLT | 0901 | ERR3 | 0013 | LDATN | 0AC0 | O |
| KWRT | CFLT3 | 0936 | ERR4 | 0015 | LNDFLG | 006A | O |
| THER | CFLT5 | 0935 | ERR5 | 0017 | LNDZN1 | 06BF | O |
| UTCUR | CFLT6 | 0917 | ERR6 | 0028 | LNDZON | 09D5 | O |

|        |        |      |        |      |        |      |   |
|--------|--------|------|--------|------|--------|------|---|
| AD1    | CHKDON | 0A6F | EXIT   | 09C3 | LND1   | 09DE | P |
| AD2    | CHKSPN | 0510 | FAULT  | 0611 | LOCURR | 0428 | P |
| AMREQ  | CHK0E  | 0A57 | FIND   | 0734 | LOOP   | 0608 | P |
| AM1    | CLRFLT | 053A | FIXA   | 0BE7 | LOOP1  | 062A | P |
| AREND  | COMREQ | 0659 | FIXATT | 0324 | LOOP2  | 0618 | P |
| E      | COMSEQ | 006C | FIXED  | 09CC | LSPPTH | 0B6F | P |
| EMR    | CONDEL | 02C7 | FIX1   | 0BEB | LSPPTL | 0B7B | P |
| EMR1   | CUDBE  | 068E | FIX2   | 0A04 | LSPPTM | 0B75 | P |
| EMW    | DCLOOP | 00FA | FIX6   | 06BD | MATFLG | 006B | P |
| INTER  | DCTBL  | 035A | FIX7   | 09E4 | MAYBE  | 0AC9 | P |
| NTBL   | DEAD   | 0029 | FIX8   | 0AE2 | MLTCNT | 005D | P |
| ORT1   | DECDEL | 0118 | FLTRST | 0536 | MODE   | 0A4A | P |
| OUT2   | DECEL  | 00F7 | FLTSTS | 0032 | MORCNV | 02B8 | P |

|        |        |      |        |      |        |      |   |
|--------|--------|------|--------|------|--------|------|---|
| SKIP2  | 014B   |      | SRFLG  | 006E | TABLE  | 0870 | THERE |
| IME    | SK1    | 08EA | SRPH   | 0B51 | TBLADJ | 0201 | T |
| IMEND  | SK2    | 08F3 | SRPL   | 0B55 | TBLBOT | 0334 | T |
| IMER   | SLCA   | 0AD0 | SRTOVR | 051A | TBLTOP | 033B | T |
| MPCOD  | SLOW   | 023E | START1 | 055A | TCKDEM | 002C | T |
| MRFLG  | SMLDEL | 054D | START2 | 055E | TCKDIF | 0023 | T |
| OOSML  | SNS1   | 0034 | START3 | 059A | TCKNUM | 002E | T |
| RACK   | SNS2   | 0035 | STB    | 0B59 | TEMOFF | 075A | T |
| RANS   | SPABRT | 0071 | STEP   | 048C | TEMPC  | 0732 | T |
| STAGN  | SPDFLT | 005B | STLT   | 0A8E | TEMPER | 0030 | T |
| PDATE  | SPINON | 0AB8 | STPDEL | 048D | TEMP2  | 003B | U |
| ARATT  | SPNCON | 006F | STPLUP | 0499 | TEMP4  | 071F | V |
| ARDLY= | SPOK   | 0BDB | SWPH   | 0B43 | TEMP8  | 0728 | V |
| CON    | SPUP   | 0BCA | SWPH1  | 0B45 | TEMUP  | 070A | W |
|        | SRES   | 0976 | SWPL   | 0B4D | TEST   | 003A |   |

```
. ABS.   0CB5        00
         0000        01
ERRORS DETECTED:  0

VIRTUAL MEMORY USED:  348 WORDS ( 2 PAGES)
DYNAMIC MEMORY AVAILABLE FOR  73 PAGES
D1L22,D1L22=D1L22.ASM
```

What is claimed is:

1. For a stepper motor capable of being positioned at a plurality of positions, having a plurality of steps and an associated current state for each of said plurality of positions and each of said plurality of positions being associated with one of said plurality of steps, a method of moving said stepper motor from an initial position to a final position by means of sequentially stepping said stepper motor through said plurality of steps, comprising the sequential operations of:

determining the direction of movement from said initial position to said final position;

determining the number of steps from an initial step associated with said initial position to a final step associated with said final position;

only if said direction of movement is in a first direction, then incrementing said number of steps;

applying to said stepper motor the current state associated with the next of said plurality of steps in said direction of movement;

repeating the previous operation until said number of steps have been initiated;

if said direction of movement is in said first direction, then applying to said stepper motor the current state associated with said final step; and allowing said stepper motor to settle into said final position; whereby the magnetc hysteresis of said stepper motor is diminished by always electrically and magnetically approaching said final position from said second direction even though said direction of movement from said initial position to said final position may be in said first direction.

2. A method as in claim 1 wherein said incrementing is by one.

3. A method as in claim 2 wherein a shortened period of time is allowed between the operation of applying to said steppers motor the current state associated with the next of said plurality of steps in said direction of movement and the operation of applying to said stepper motor and the current state associated with said final step.

4. A method as in claim 3 wherein said first direction is reverse and said second direction is forward.

5. A method as in claim 1 wherein a plurality of said current states associated with said plurality of steps are applied to said stepper motor in an accelerating and decelerating time sequence.

* * * * *